(12) United States Patent
Narita et al.

(10) Patent No.: US 7,993,745 B2
(45) Date of Patent: Aug. 9, 2011

(54) POLYLACTIC ACID STRETCHED FILM

(75) Inventors: Junichi Narita, Koga (JP); Hiroyuki Wakaki, Koga (JP)

(73) Assignee: Tohcello Co., Ltd., Tokyo (JP)

( * ) Notice: Subject to any disclaimer, the term of this patent is extended or adjusted under 35 U.S.C. 154(b) by 0 days.

(21) Appl. No.: 12/375,170

(22) PCT Filed: Jul. 24, 2007

(86) PCT No.: PCT/JP2007/064834
§ 371 (c)(1),
(2), (4) Date: May 19, 2009

(87) PCT Pub. No.: WO2008/013295
PCT Pub. Date: Jan. 31, 2008

(65) Prior Publication Data
US 2009/0318631 A1    Dec. 24, 2009

(30) Foreign Application Priority Data
Jul. 25, 2006 (JP) .................. 2006-201427

(51) Int. Cl.
*B32B 17/10* (2006.01)
(52) U.S. Cl. ........ 428/339; 428/480; 428/910; 525/410; 525/411; 525/415; 525/418; 525/450
(58) Field of Classification Search ............ 525/450, 525/410, 411, 415, 418; 428/339, 480, 910
See application file for complete search history.

(56) References Cited

U.S. PATENT DOCUMENTS
2009/0035585 A1* 2/2009 Wakaki et al. ............. 428/446

FOREIGN PATENT DOCUMENTS
| JP | 2005-325286 | * | 11/2005 |
| JP | 2007-119553 A | | 5/2007 |
| JP | 2007-191550 A | | 8/2007 |
| WO | 2006/009285 A1 | | 1/2006 |
| WO | WO 2006/095923 | * | 9/2006 |

OTHER PUBLICATIONS

Machine translation of JP 2005-325286 [online], accessed via the Internet [retrieved on May 14, 2010], URL: <http://www4.ipdl.inpit.go.jp/Tokujitu/PAJdetail.ipdl?N0000=60&N0120=01&N2001=2&N3001=2005-325286>.*
International Search R0port of PCT/JP2007/064834, Mailing Date of Sep. 4, 2007.

* cited by examiner

*Primary Examiner* — David Wu
*Assistant Examiner* — Robert Jones
(74) *Attorney, Agent, or Firm* — Westerman, Hattori, Daniels & Adrian, LLP

(57) ABSTRACT

The object of the present invention is to provide a polylactic acid stretched film having biodegradability and excelling in transparency and heat resistance. The main feature is characterized in that a polylactic acid stretched film is composed of a polylactic acid composition containing poly-L-lactic acid and poly-D-lactic acid in which a peak ratio (peak 1/peak 2) of a peak height (peak 1) of a maximum endothermic peak of endothermic peaks within a range of 150 to 200° C. to a peak height (peak 2) of a maximum endothermic peak of endothermic peaks within a range of 205 to 240° C. in DSC measurements is equal to or less than 0.2.

11 Claims, 66 Drawing Sheets

Fig. 4 DSC

Fig.5 DSC

DSC

Fig. 7 DSC

Fig. 8 DSC

Fig. 9 DSC

DSC

DSC

Fig. 17 DSC

DSC

DSC

Fig.24 DSC

Fig.31 DSC

Fig. 32 DSC

Fig.36 DSC

DSC

DSC

Fig. 43 DSC

Fig. 44 DSC

Fig. 46 DSC

Fig. 47 DSC

DSC

Fig.50 DSC

Fig. 52 DSC

Fig. 53 DSC

Fig. 54 DSC

Fig. 55 DSC

DSC

POLYLACTIC ACID STRETCHED FILM

TECHNICAL FIELD

The present invention relates to a polylactic acid stretched film having biodegradability and excelling in transparency and heat resistance.

BACKGROUND

Biodegradable films have attracted attention as a means for facilitating waste processing of plastic films, and a variety of biodegradable films have been developed. Biodegradable films are subjected to hydrolysis or biodegradation in soil or water, the films are gradually destructed or decomposed, and eventually they are converted by action of microorganisms into nonhazardous decomposition products. Films molded from aromatic polyester resins, aliphatic polyester resins such as polylactic acid and polybutylene succinate, polyvinyl alcohol, acetate cellulose, starch, and the like are known as such films.

Because biaxially stretched films comprising polylactic acid, which is a biodegradable resin, excel in transparency, they started finding application as films for packaging, but such films have poor heat resistance.

A large number of methods comprising blending poly-L-lactic acid (PLLA) with poly-D-lactic acid (PDLA) and forming a stereocomplex have been suggested (for example, Japanese Patent Application Laid-open No. H9-25400 and Japanese Patent Application Laid-open 2000-17164; and Macromolecules, 20, 904 (1987)).

However, even when a composition obtained by simple melt kneading of PLLA and PDLA is molded into a film, a stereocomplex is not easily formed and although the film formed is improved in heat resistance, the film is brittle and difficult to use as a film for packaging or the like.

DISCLOSURE OF THE INVENTION

It is an object of the present invention to develop a polylactic acid stretched film having biodegradability and excelling in transparency and heat resistance.

The present invention provides a polylactic acid stretched film comprising a polylactic acid composition containing poly-L-lactic acid and poly-D-lactic acid, wherein a peak ratio (peak 1/peak 2) of a peak height (peak 1) of a maximum endothermic peak of endothermic peaks within a range of 150 to 200° C. to a peak height (peak 2) of a maximum endothermic peak of endothermic peaks within a range of 205 to 240° C. in DSC measurements is equal to or less than 0.2.

Figure 1:
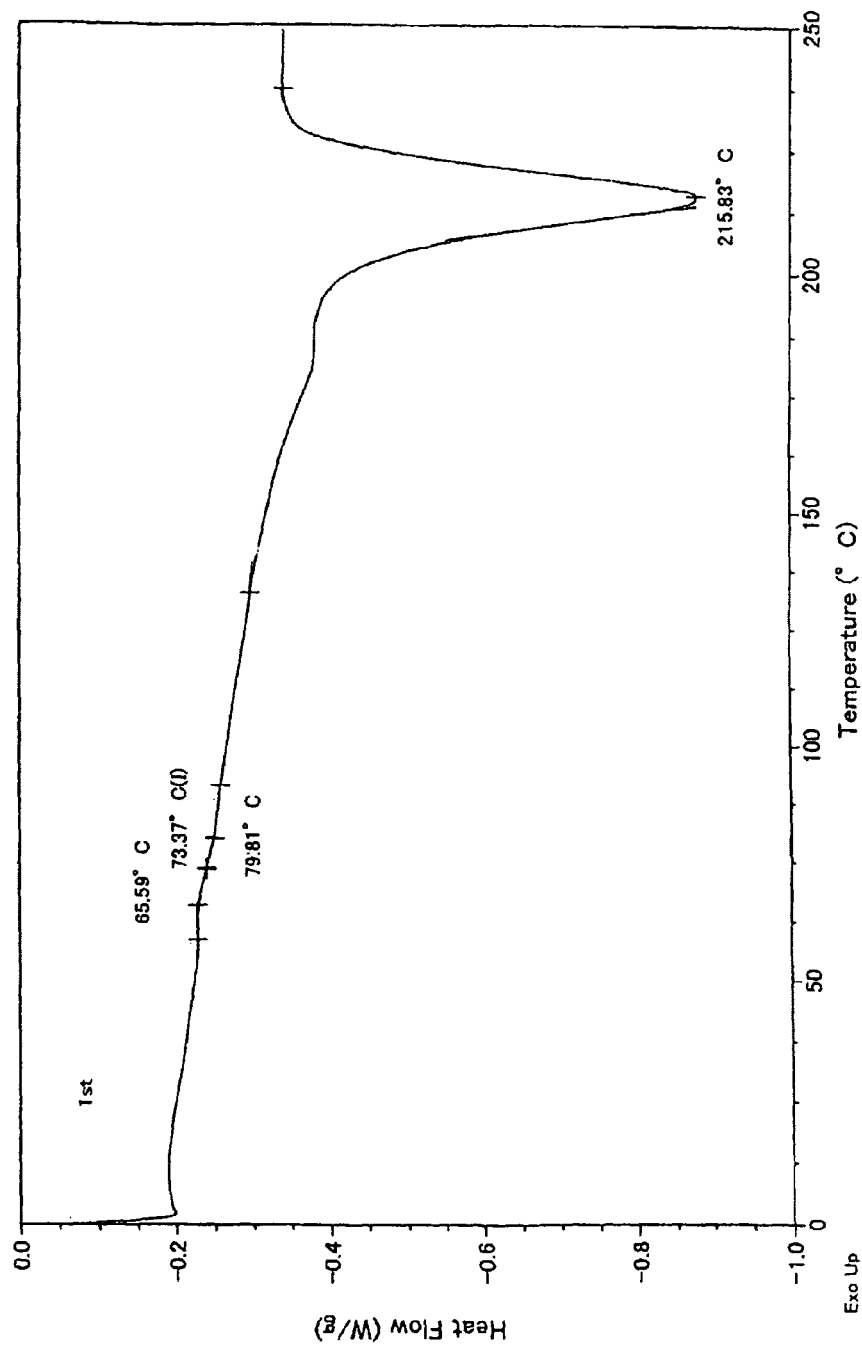
FIG. 1 is a diagram showing the first heating DSC measurement chart of the stretched film of Example 1.

By contrast with the conventional polylactic acid biaxially stretched films for which usability temperature is not more than 140° C., the polylactic acid stretched film in accordance with the present invention can be used at a temperature up to 180° C., still has biodegradability, and also excels in transparency.

BEST MODE FOR CARRYING OUT THE INVENTION

Poly-L-lactic Acid

Poly-L-lactic acid (PLLA) that is one component of the polylactic acid composition in accordance with the present invention is a polymer comprising a structural component based on L-lactic acid at a ratio preferably equal to or greater than 95 mol %. A polymer with a L-lactic acid content of less than 95 mol % can degrade heat resistance of a stretched film obtained by stretching a polylactic acid composition obtained by melt kneading with the below-described poly-D-lactic acid (PDLA).

A molecular weight of PLLA is not particularly limited, provided that a polylactic acid composition obtained by mixing with the below-described poly-D-lactic acid can be molded into a layer such as a film, but poly-L-lactic acid with a weight-average molecular weight (Mw) within a range of 6,000 to 3,000,000, preferably 6,000 to 2,000,000 is usually preferred.

A stretched film obtained when the weight-average molecular weight of PLLA is less than 6,000 can have poor strength. Meanwhile, when the molecular weight exceeds 3,000,000, melt viscosity is high and film processability can deteriorate.

Poly-D-lactic Acid

Poly-D-lactic acid (PDLA) that is one component of the polylactic acid composition in accordance with the present invention is a polymer comprising a structural component based on D-lactic acid at a ratio preferably equal to or greater than 95 mol %. A polymer with a D-lactic acid content of less than 95 mol % can degrade heat resistance of a stretched film obtained by stretching a polylactic acid composition obtained by melt kneading with the above-described poly-L-lactic acid.

A molecular weight of PDLA is not particularly limited, provided that a polylactic acid composition obtained by mixing with the above-described poly-L-lactic acid can be molded into a layer such as a film, but poly-D-lactic acid with a weight-average molecular weight (Mw) within a range of 6,000 to 3,000,000, preferably 6,000 to 2,000,000 is usually preferred. A stretched film obtained when the weight-average molecular weight of PDLA is less than 6,000 can have poor strength. Meanwhile, when the molecular weight exceeds 3,000,000, melt viscosity is high and film processability can deteriorate.

Small amounts of other copolymer components such as polycarboxylic acids or esters thereof, polyhydric alcohols, hydroxycarboxylic acids, and lactones may be copolymerized with the PLLA and PDLA of the present invention within ranges such that the object of the present invention is not hindered.

Specific examples of polycarboxylic acids include aliphatic dicarboxylic acids such as succinic acid, glutaric acid, adipic acid, pimelic acid, azelaic acid, suberic acid, decanedicarboxylic acid, dodecanedicarboxylic acid, sebacic acid, diglycolic acid, ketopimelic acid, malonic acid, and methylmalonic acid, and also aromatic dicarboxylic acids such as terephthalic acid, isophthalic acid, and 2,6-naphthalenedicarboxylic acid.

Specific examples of polycarboxylic acid esters include aliphatic dicarboxylic acid diesters such as dimethyl succinate, diethyl succinate, dimethyl glutarate, diethyl glutarate, dimethyl adipate, diethyl adipate, dimethyl pimelate, diethyl azelate, dimethyl suberate, diethyl suberate, dimethyl sebacate, diethyl sebacate, dimethyl decanedicarboxylate, dimethyl dodecanedicarboxylate, dimethyl diglycolate, dimethyl ketopimelate, dimethyl malonate, and dimethyl methylmalonate, and also aromatic dicarboxylic acid diesters such as dimethyl terephthalate and dimethyl isophthalate.

Specific examples of polyhydric alcohols include ethylene glycol, 1,3-propanediol, 1,2-propanediol, 1,3-butanediol, 2-methyl-propanediol, 1,4-butanediol, neopentyl glycol, pentamethylene glycol, hexamethylene glycol, octamethylene glycol, decamethylene glycol, dodecamethylene glycol, 1,4-cyclohexanediol, 1,4-cyclohexanedimethanol, diethylene glycol, dipropylene glycol, triethylene glycol, tetraethylene glycol, pentaethylene glycol, and polyethylene glycols with a molecular weight of equal to or lower than 1,000.

Specific examples of hydroxycarboxylic acids include glycolic acid, 2-methyl lactic acid, 3-hydroxybutyric acid, 4-hydroxybutyric acid, 2-hydroxy-n-butyric acid, 2-hydroxy-3,3-dimethylbutyric acid, 2-hydroxy-2-methylbutyric acid, 2-hydroxy-3-methylbutyric acid, hydroxypivalic acid, hydroxyisocaproic acid, and hydroxycaproic acid.

Specific examples of lactones include methylated caprolactones of various types such as β-propiolactone, β-butyrolactone, γ-butyrolactone, β or γ-valerolactone, δ-valerolactone, δ-caprolactone, ε-caprolactone, 4-methylcaprolactone, 3,5,5-trimethylcaprolactone, and 3,3,5-trimethylcaprolactone; cyclic monomer esters of hydroxycarboxylic acids, such as β-methyl-δ-valerolactone, enantholactone, and laurolactone; and cyclic dimer esters of the hydroxycarboxylic acids such as glycolide, L-lactide, and D-lactide.

Furthermore, the PLLA and PDLA of the present invention may also include a small amount of D-lactic acid or L-lactic acid, respectively, provided that this amount does not exceed the aforementioned range.

Polylactic Acid Stretched Film

The polylactic acid stretched film in accordance with the present invention comprises a polylactic acid composition comprising the poly-L-lactic acid and poly-D-lactic acid, wherein a peak ratio (peak 1/peak 2) of a peak height (peak 1) of a maximum endothermic peak of endothermic peaks within a range of 150 to 200° C. to a peak height (peak 2) of a maximum endothermic peak of endothermic peaks within a range of 205 to 240° C. in DSC measurements is equal to or lower than 0.2, preferably equal to or lower than 0.1.

In addition to the above-described properties, the polylactic acid stretched film in accordance with the present invention has the following properties: an endothermic amount $\Delta Hm$ of an endothermic peak within a range of 205 to 240° C. is equal to or greater than 40 J/g, more preferably equal to or greater than 50 J/g, and an exothermic amount $\Delta Hc$ during cooling after endothermic peak measurements in DSC measurements is equal to or greater than 40 J/g, more preferably equal to or greater than 50 J/g.

In addition to the above-described properties, the polylactic acid stretched film in accordance with the present invention has the following properties: a sum total ($S_{SC}$) of area of peaks (2θ) in the vicinity of 12 degrees, 21 degrees, and 24 degrees in wide-angle X-ray measurements is equal to or greater than 20%, preferably equal to or greater than 25% based on the entire area, and a sum total ($S_{PL}$) of area of peaks (2θ) in the vicinity of 17 degrees and 19 degrees is equal to or less than 5%, preferably equal to or less than 3% based on the entire area.

The peaks (2θ) in the vicinity of 17 degrees and 19 degrees in wide-angle X-ray measurements are peaks ($P_{PL}$) based on PLLA and PDLA crystals, and the peaks in the vicinity of 12 degrees, 21 degrees, and 24 degrees are peaks ($P_{SC}$) based on crystals of the so-called stereocomplex produced by co-crystallization of PLLA and PDLA.

The wide-angle X-ray diffraction peak (2θ) in the present invention is the angle (degree) of the diffraction peak detected by measurements using an X-ray diffraction device (automated X-ray diffraction device RINT-2200 or RINT-2500 manufactured by Rigaku Corp.). Each diffraction peak area based on crystals was calculated by cutting out an area of each diffraction peak (2θ) in the vicinity of 17 degrees and 19 degrees for ($S_{PL}$) and in the vicinity of 12 degrees, 21 degrees, and 24 degrees for ($S_{SC}$) from a recording paper and measuring the weight thereof, wherein a total area (entire area) for a diffraction angle (2θ) of 10 to 30 degrees surrounded by the base line (intensity; 0 cps) of the recording paper and the X-ray diffraction intensity curve was taken as 100%. A broad portion originating in a non-crystalline portion was taken as "amorphous portion". When ($S_{PL}$) and ($S_{SC}$) were measured, the diffraction curve (background) associated with the amorphous portion was taken as a baseline, and a portion above it was measured.

As for thermal melting properties of the polylactic acid stretched film in accordance with the present invention, Q100 manufactured by TA Instrument was used as a DSC (differential scanning calorimeter), about 5 mg of a sample was accurately measured, the sample was heated from 0° C. to 250° C. at a heating rate of 10° C./min under a nitrogen gas inflow rate of 50 ml/min in conformance with JIS K 7121 and JIS K 7122, a DSC curve during heating was obtained, a melting point Tm of the stretched film, an endothermic amount (ΔHm) of an endothermic peak within a range of 205 to 240° C., and a peak ratio (peak 1/peak 2) of a peak height (peak 1) of a maximum endothermic peak of endothermic peaks within a range of 150 to 200° C. to a peak height (peak 2) of a maximum endothermic peak of endothermic peaks within a range of 205 to 240° C. were found from the obtained DSC curve, the temperature was maintained at 250° C. for 10 min, the sample was then cooled to 0° C. at a cooling rate of 10° C./min and crystallized, a DSC curve during cooling was obtained, and an exothermic amount (Hc) during crystallization of the stretched film was found from the obtained DSC curve.

The peak height was found as a height from a baseline obtained by connecting a baseline in the vicinity of 65° C. to 75° C. and a baseline in the vicinity of 240° C. to 250° C.

The thickness of the polylactic acid stretched film in accordance with the present invention is usually within a range of 5 to 500 μm, preferably 10 to 100 μm.

If necessary, the polylactic acid stretched film in accordance with the present invention can be subjected to primer coating, corona treatment, plasma treatment, flame treatment, or the like to improve adhesion to another layer or printed layer.

The polylactic acid stretched film in accordance with the present invention may be laminated on another base material according to application. Examples of other base materials include films, sheets, cups, and trays made from thermoplastic resins such as polyolefins such as polyethylene, polypropylene, polybutene, and polymethylpentene, polyesters such as polyethylene terephthalate and polycarbonates, and also nylon, polystyrene, polyvinyl chloride, polyvinylidene chloride, polyvinyl alcohol, ethylene-vinyl alcohol copolymer, polymethyl methacrylate, ethylene-vinyl acetate copolymer, polylactic acid, and aliphatic polyesters and other biodegradable polyesters, as well as foamed products thereof, and glass, metals, aluminum foil, paper, and the like. Films made from thermoplastic resins may be unstretched, or may be uniaxially or biaxially stretched films. It goes without saying, that one layer, or two or more layers of the base material may be used.

Polylactic Acid Composition

In order to obtain a polylactic acid stretched film having the above-described properties in accordance with the present invention, it is preferred that a polylactic acid composition having the below-described thermal melting properties be prepared as a polylactic acid composition comprising poly-L-lactic acid and poly-D-lactic acid and stretched.

The polylactic acid composition in accordance with the present invention desirably has thermal properties such that an exothermic amount ΔHc during cooling after the polylactic acid composition has been melted for 10 min at 250° C. (during first cooling) in DSC measurements preferably be equal to or greater than 20 J/g.

Furthermore, the polylactic acid composition in accordance with the present invention desirably has thermal properties such that a peak ratio (peak 10/peak 20) of a peak height (peak 10) of a maximum endothermic peak of endothermic peaks within a range of 150 to 200° C. of a DSC curve obtained in the DSC measurements of the composition during second heating (cooling is performed at 10° C./min after 10 min at 250° C. and then heating is carried out again at 10° C./min from 0° C.) to a peak height (peak 20) of a maximum endothermic peak of endothermic peaks within a range of 205 to 240° C. is preferably equal to or less than 0.5, more preferably equal to or less than 0.3, and even more preferably equal to or less than 0.2. This is apparently because this composition has selectively formed stereocomplex crystals.

When the peak ratio (peak 10/peak 20) is larger than 0.5, the amount of individual crystals of PLLA and PDLA after crystallization can be large and kneading of poly-L-lactic acid and poly-D-lactic acid can be insufficient.

Because the composition with the peak ratio (peak 10/peak 20) larger than 0.5 has a large amount of formed α crystals (individual crystals of PLLA or PDLA) after crystallization, the heat resistance can be poor even after stretching.

Furthermore, in the polylactic acid composition in accordance with the present invention, an endothermic amount (ΔHm) of an endothermic peak of 205 to 240° C. during second heating in DSC is preferably equal to or greater than 35 J/g.

Thermal melting properties of the polylactic acid composition in accordance with the present invention were found in conformance with JIS K 7121 and JIS K 7122 by using Q100 manufactured by TA Instrument as a DSC (differential scanning calorimeter) and accurately weighing about 5 mg of a sample by a method identical to the above-described method for finding thermal melting properties of the polylactic acid stretched film. Properties during cooling and second heating were found as thermal melting properties of the polylactic acid composition.

The polylactic acid composition in accordance with the present invention is composed of or prepared with preferably 25 to 75 parts by weight, more preferably 35 to 65 parts by weight, still more preferably 45 to 55 parts by weight, and even more preferably 47 to 53 parts by weight of the aforementioned PLLA and preferably of 75 to 25 parts by weight, more preferably 65 to 35 parts by weight, still more preferably 55 to 45 parts by weight, and even more preferably 53 to 47 parts by weight of PDLA (PLLA+PDLA=100 parts by weight).

The polylactic acid composition in accordance with the present invention is desirably prepared by kneading from poly-L-lactic acid and poly-D-lactic acid such that the weight-average molecular weight of either of the poly-L-lactic acid and the poly-D-lactic acid is within a range of 6,000 to 3,000,000 and the weight-average molecular weight of either the poly-L-lactic acid or the poly-D-lactic acid is within a range of 30,000 to 2,000,000.

Furthermore, the polylactic acid composition in accordance with the present invention can be obtained by melt kneading these PLLA and PDLA at 230 to 260° C. with a twin-screw extruder, a twin-screw kneader, a Banbury mixer, a blast mill, or the like.

When the composition has a PLLA amount outside the aforementioned range, a film produced by stretching the composition obtained includes α-crystal crystalline substance and can have insufficient heat resistance even when the composition is kneaded by the above-described method.

The polylactic acid composition in accordance with the present invention excels in heat resistance apparently because the aforementioned composition forms a stereocomplex structure and the stereocomplex structure is composed of equal amounts of PLLA and PDLA.

The temperature during melt kneading of PLLA and PDLA performed for obtaining the polylactic acid composition in accordance with the present invention is preferably 230 to 260° C., more preferably 235 to 255° C. Where the temperature of melt kneading is below 230° C., the stereocomplex structure can be present in an unmelted state, and where the temperature is higher than 260° C., the polylactic acid can decompose.

Furthermore, it is desirable that PLLA and PDLA be sufficiently melt kneaded during preparation of the polylactic acid composition in accordance with the present invention. The melt kneading time depends on the melt kneader used, but usually may be equal to or longer than 10 min.

In the polylactic acid composition in accordance with the present invention, crystallization of stereocomplexes proceeds rapidly and a region in which stereocomplex crystallization is possible is large. This is apparently why the formation of individual crystals of PLLA or PDLA (α crystals) is difficult.

As mentioned hereinabove, where a peak caused by crystallization (exothermic amount ΔHc) in DSC measurements (10° C./min) during cooling after 10 min at 250° C. is equal to or greater than 20 J/g in the polylactic acid composition in accordance with the present invention, crystallization of the polylactic acid composition will occur rapidly.

Furthermore, where the exothermic amount caused by crystallization is less than 20 J/g, the crystallization rate is low and the kneading can be insufficient.

The weight-average molecular weight of the polylactic acid composition in accordance with the present invention is not particularly limited. However, the polylactic acid composition in accordance with the present invention preferably has a weight-average molecular weight of 10,000 to 1,500,000, more preferably a weight-average molecular weight of 50,000 to 500,000. Where the weight-average molecular weight is outside this range on a high-molecular side, the formation of stereocomplex is insufficient and it is possible that heat resistance will not be attained. Where the weight-average molecular weight is outside this range on a low-molecular side, the strength of a polylactic acid composition layer obtained can be insufficient.

Method for Manufacturing a Polylactic Acid Stretched Film

A polylactic acid stretched film in accordance with the present invention, which excels in heat resistance and transparency, is obtained by using a polylactic acid composition comprising the poly-L-lactic acid and poly-D-lactic acid, extrusion molding, and stretching the film or sheet obtained, preferably by a factor of two or more, more preferably by a factor of 2 to 12, and even more preferably by a factor of 3 to 6 in one direction. The upper limit of stretching factor is not particularly limited, provided that stretching can be performed, but the film is usually ruptured and stable stretching cannot be performed when the stretching factor exceeds 12.

A stretched film (biaxially stretched film) that excels in heat resistance and transparency can be also obtained by stretching a film or sheet obtained by extrusion molding, preferably by a factor of two or more in the longitudinal direction and by a factor of two or more in the transverse direction, more preferably by a factor of 2 to 7 in the longitudinal direction and by a factor of 2 to 7 in the transverse direction, and even more preferably by a factor of 2.5 to 5 in the longitudinal direction and by a factor of 2.5 to 5 in the transverse direction. The upper limit of stretching factor is not particularly limited, provided that stretching can be performed, but the film is usually ruptured and stable stretching cannot be performed when the stretching factor exceeds 7.

Heat resistance of the polylactic acid stretched film in accordance with the present invention can be further improved by heat treating the film, preferably for 1 sec or longer, more preferably for 3 to 60 sec at a temperature preferably of 140 to 220° C., more preferably 150 to 200° C.

EXAMPLES

The present invention will be explained below in greater detail with reference to examples thereof, but the present invention is not limited to the examples, provided that changes are within the scope of the invention.

The polylactic acids used in the example, comparative examples, and reference examples are shown below.

(a) Poly-L-lactic acid (PLLA-1):
Amount of D isomer: 1.9%, Mw: 222,000 (g/mol), Tm: 163° C.

(b) Poly-L-lactic acid (PLLA-2, manufactured by PURAC Co., Ltd.):
Amount of D isomer: 0.0%, Mw: 395,000 (g/mol), Tm: 184° C.
Inherent viscosity (chloroform, 25° C., 0.1 g/dl): 3.10 (dl/g).

(c) Poly-L-lactic acid (PLLA-3, manufactured by PURAC Co., Ltd.):
Amount of D isomer: 0.0%, Mw: 1,430,000 (g/mol), Tm: 186° C.
Inherent viscosity (chloroform, 25° C., 0.1 g/dl): 7.11 (dl/g).

(d) Poly-D-lactic acid (PDLA-1, manufactured by PURAC Co., Ltd.):
Amount of D isomer: 100.0%, Mw: 298,000 (g/mol), Tm: 176° C.
Inherent viscosity (chloroform, 25° C., 0.1 g/dl): 2.46 (dl/g).

(e) Poly-D-lactic acid (PDLA-2, manufactured by PURAC Co., Ltd.):
Amount of D isomer: 100.0%, Mw: 1,350,000 (g/mol), Tm: 180° C.
Inherent viscosity (chloroform, 25° C., 0.1 g/dl): 7.04 (dl/g).

The measurement methods of the present invention are described below.

(1-1) Weight-Average Molecular Weight (Mw)

Measurements for the poly-L-lactic acid and poly-D-lactic acid of (a) to (e) were carried out by the following method.

A total of 10 ml of GPC eluent was added to 20 mg of a sample, and after setting overnight, the composition was slowly stirred by hand.

The solution was filtered with an amphiphilic 0.45 μm-PTFE filter (ADVANTEC DISMIC-25HP045AN) to obtain a GPC sample solution.

Measurement device: Shodex GPC SYSTEM-21
Analyzer: data analysis program: SIC480 Data Station II.
Detector: differential refraction detector (RI).
Column: Shodex GPC K-G+K-806L+K-806L.
Column temperature: 40° C.
Eluent: chloroform.
Flow rate: 1.0 ml/min.
Injection amount: 200 μL.
Molecular weight calibration: monodispersed polystyrene.

(1-2) Weight-Average Molecular Weight (Mw)

The weight-average molecular weight of a polylactic acid composition obtained by melt kneading poly-L-lactic acid and poly-D-lactic acid was measured by the following method.

A total of 20 mg of sample was dissolved in a mobile phase (concentration 0.5%) and filtered with a 0.45 μm hydrophilic PTFE filter (Millex-LH; Japan Millipore) to obtain a GPC sample solution.

Column: PL HFIP gel (300×7.5 mm)×2 (Polymer Laboratories).
Column temperature: 40° C.
Mobile phase: HFIP+5 mM TFANa.
Flow rate: 1.0 mL/min.
Detection: RI.
Injection amount: 50 μL.

Measurement device: 510 high-pressure pump, U6K water injection unit, 410 differential refractometer (Japan Waters).

Molecular weight correction: monodispersed PMMA (Easi Cal PM-1; Polymer Laboratories).

(2) DSC Measurements

Measurements were carried out by the above-described method.

(3) Transparency

The haze (HZ) and parallel beam transmissivity (PT) of the film were measured using a haze meter 300A manufactured by Nippon Denshoku Industries Co., Ltd.

(4) Surface Roughness

The central-plate surface roughness (SRa) of the film surface was measured using a three-dimensional surface roughness measuring device SE-30K manufactured by Kosaka Laboratory, Ltd.).

(5) Tensile Test

Strip-like test pieces (length: 50 mm, width: 15 mm) were sampled from the film in the MD direction and TD direction, a tensile test was carried out using a tensile tester (Tensilon Universal Tester RTC-1225 manufactured by Orientec Co., Ltd.) at a chuck spacing of 20 mm or 100 mm and a crosshead speed of 300 mm/min (however, Young's modulus was measured at 5 mm/min), and the tensile strength (MPa), elongation (%), and Young's modulus (MPa) were found. In Example 1 and Comparative Example 1, the measurements were carried out at a chuck spacing of 100 mm, but in Examples 2 to 6 and Comparative Examples 2 to 6, the measurements were carried out at a chuck spacing of 20 mm.

(6) Heat Resistance

A thermal analyzer (Device for Measuring Heat, Stress, and Strains TMA/SS120, manufactured by Seiko Instruments Co., Ltd.) was used, a test piece with a width of 4 mm was cut out of the film, a load of 0.25 MPa was applied to the test piece at a chuck spacing of 5 mm, the temperature was raised for 100° C. (starting temperature) at a rate of 5° C./min, and deformation (elongation and shrinkage) of the test piece at each temperature was measured.

(7) Wide-Angle X-Ray Measurement (1) Example 1 and Comparative Example 1

Measurement device: X-ray diffraction device (automated X-ray diffraction device RINT-2200 manufactured by Rigaku Corp.).
Reflection Method
X-ray target: Cu K-α.
Output: 40 kV×40 mA.
Rotation angle: 4.0 degrees/min.
Step: 0.02 degree.
Scanning range: 10 to 30 degrees.

(2) Examples 2 to 6 and Comparative Examples 2 to 5

Measurement device: X-ray diffraction device (automated X-ray diffraction device RINT-2500 manufactured by Rigaku Corp.).
Transmission Method
X-ray target: Cu K-α.
Output: 50 kV×300 mA.
Rotation angle: 2.0 degrees/min.
Step: 0.01 degree.
Scanning range: 5 to 30 degrees.

(8) Moisture Permeability (Water Vapor Permeability)

Moisture permeability was found in conformance with JIS Z0208. A sample was taken from the film, a bag with a surface area of about 100 cm$^2$ was produced, an appropriate amount of calcium chloride was introduced into the bag, and the bag was sealed. The bag was allowed to stay for three days in an atmosphere at 40° C. and 90% RH (relative humidity), and moisture permeability (water vapor permeability) was found from the increase in weight.

(9) Oxygen Permeability

Oxygen permeability was measured using an oxygen permeability meter (OXTRAN 2/21 mL manufactured by MOCON) at 20° C. and 0% RH (relative humidity) in conformance with JIS K7126.

Example 1

A polylactic acid composition was obtained by weighing PLLA-1 and PDLA-2 at a ratio of 50:50 (parts by weight), using a twin-screw kneading extruder, and melt kneading at a melt temperature of 250° C. for a kneading time of 1 min. Then, a sheet of the polylactic acid composition with a thickness of about 300 μm was obtained with a T-die sheet molding machine.

The twin-screw kneading extruder has a capacity of 40 kg/h, but the extrusion amount thereof is produced in about 10 sec.

Because kneading in such an interval was insufficient, the kneading time was extended to 1 min by reducing the extrusion amount to 7 kg/h.

Thermal melting properties of the polylactic acid composition were measured by the above-described method.

Figure 2:
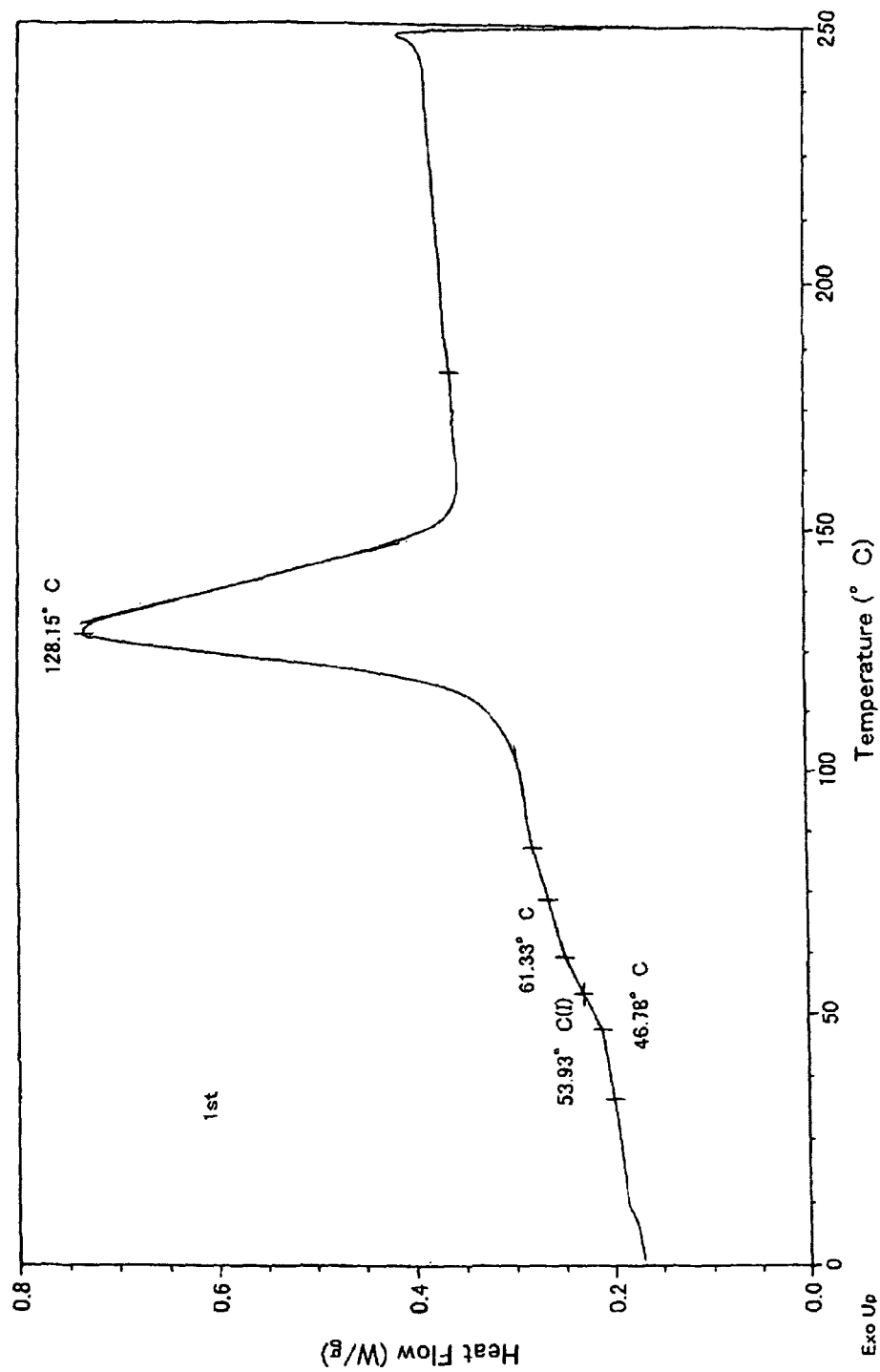
FIG. 2 is a diagram showing the first cooling DSC measurement chart of the stretched film of Example 1.

A polylactic acid stretched film was then obtained by stretching the sheet by a factor of three at a stretching temperature of 65° C. in the longitudinal direction and stretching by a factor of three at a stretching temperature of 70° C. in the transverse direction in a biaxial stretching machine manufactured by Bruckner and performing heat setting for about 40 sec at 180° C. in a tenter. Physical properties of the obtained polylactic acid stretched film were measured by the above-described methods. The results obtained are shown in Table 1 and thermal melting properties are shown in FIG. 1 and FIG. 2.

Comparative Example 1

Figure 3:
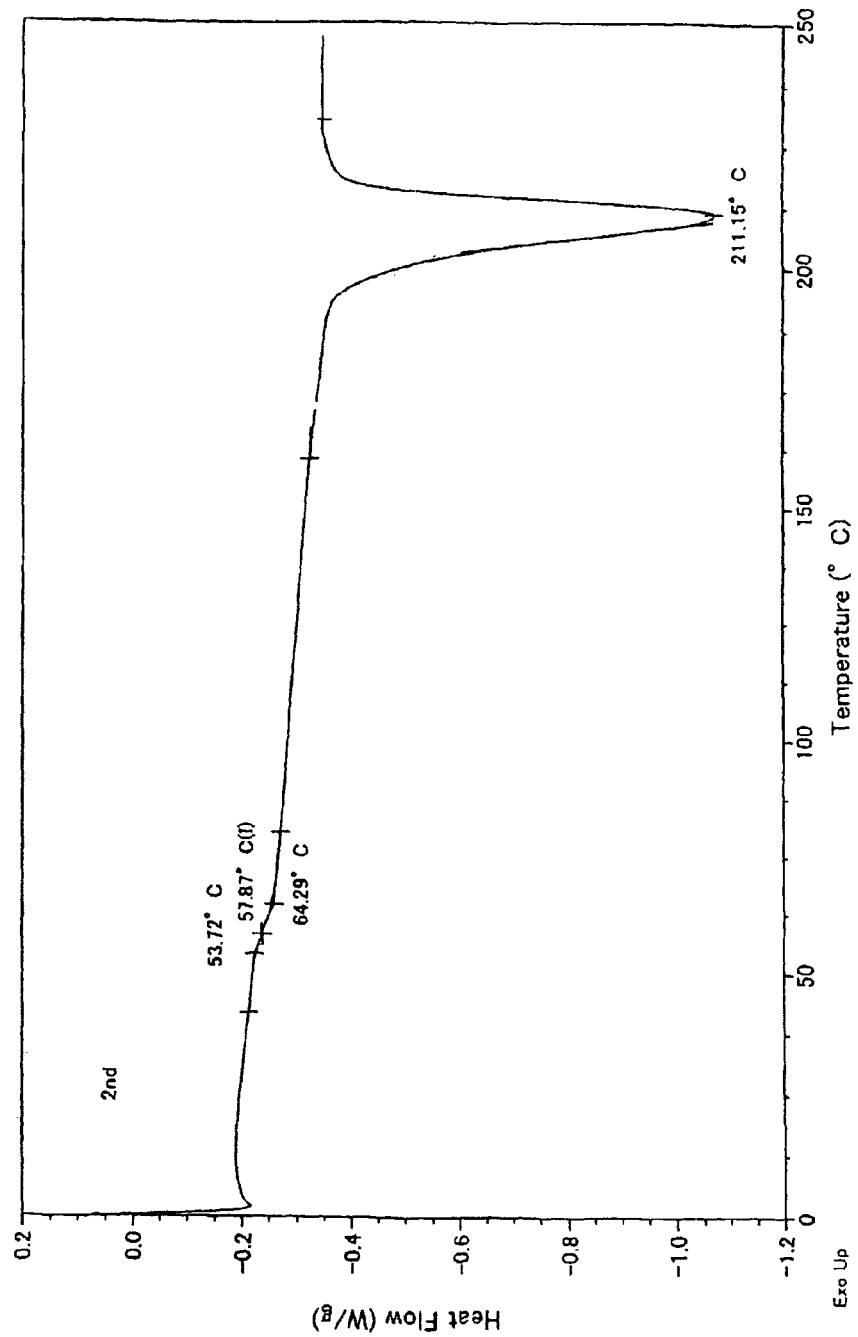
FIG. 3 is a diagram showing the second heating DSC measurement chart of the stretched film of Example 1.
Figure 4:
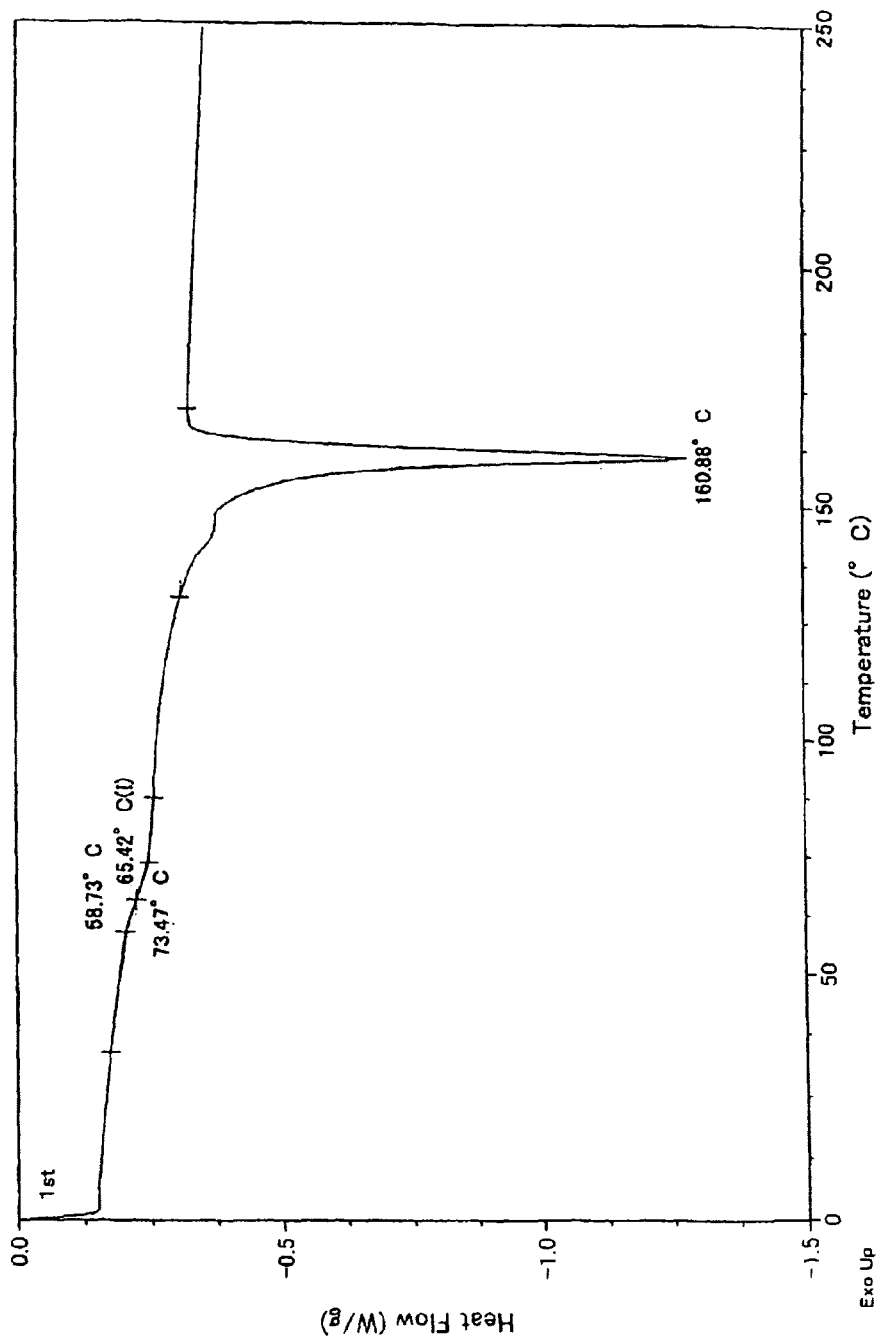
FIG. 4 is a diagram showing the first heating DSC measurement chart of the stretched film of Comparative Example 1.

Operations were performed in the same manner as Example 1, except that PLLA-1 was used alone instead of the PLLA-1 and PDLA-1 used in Example 1 and heat setting of the biaxially stretched film was carried out for about 40 sec at 150° C., and a sheet and biaxially stretched film of PLLA-1 were obtained. The measurement results are shown in Table 1 and thermal melting properties are shown in FIG. 3 and FIG. 4.

TABLE 1

Figure 7:
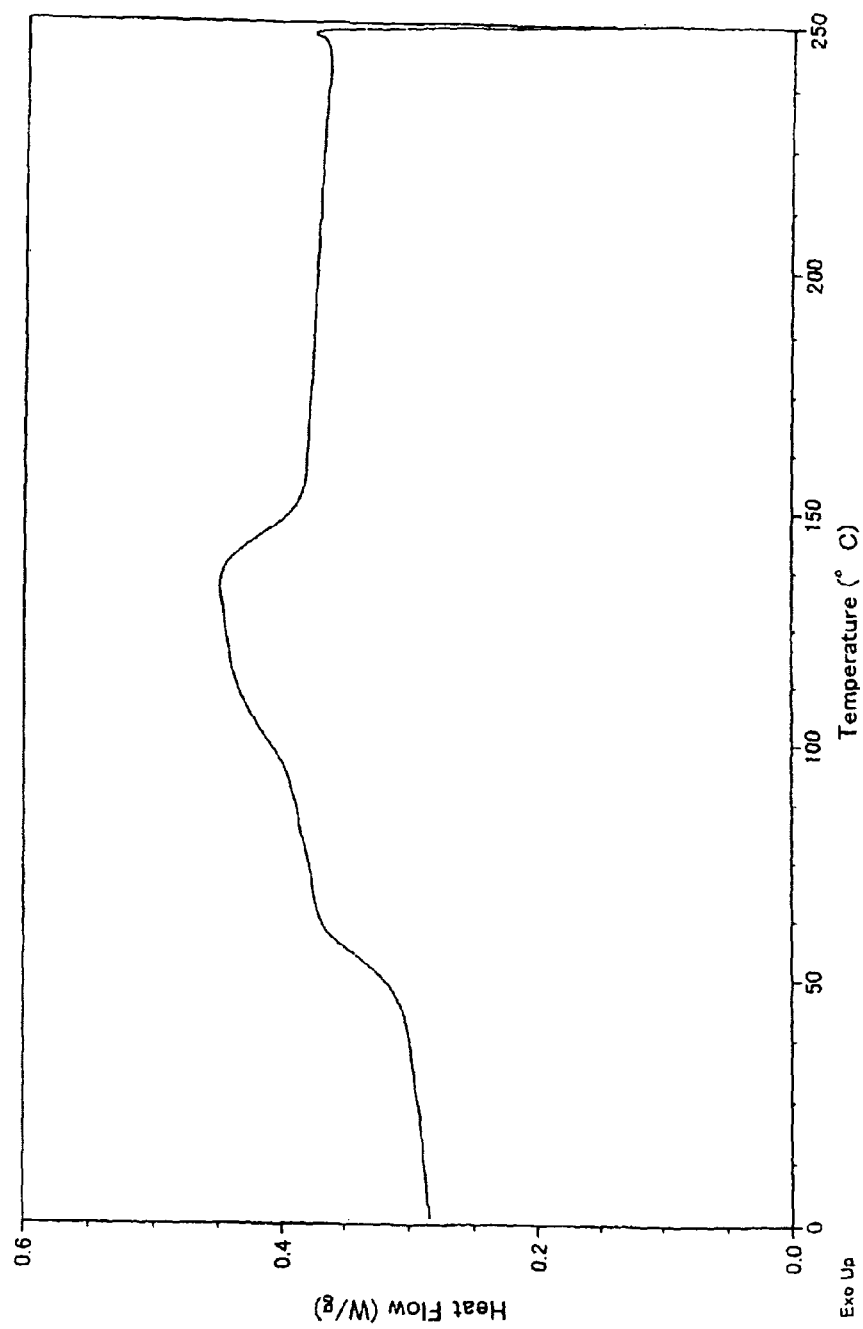
FIG. 7 is a diagram showing the first cooling DSC measurement chart of a sheet (unstretched) comprising the polylactic acid composition of Example 1.
Figure 8:
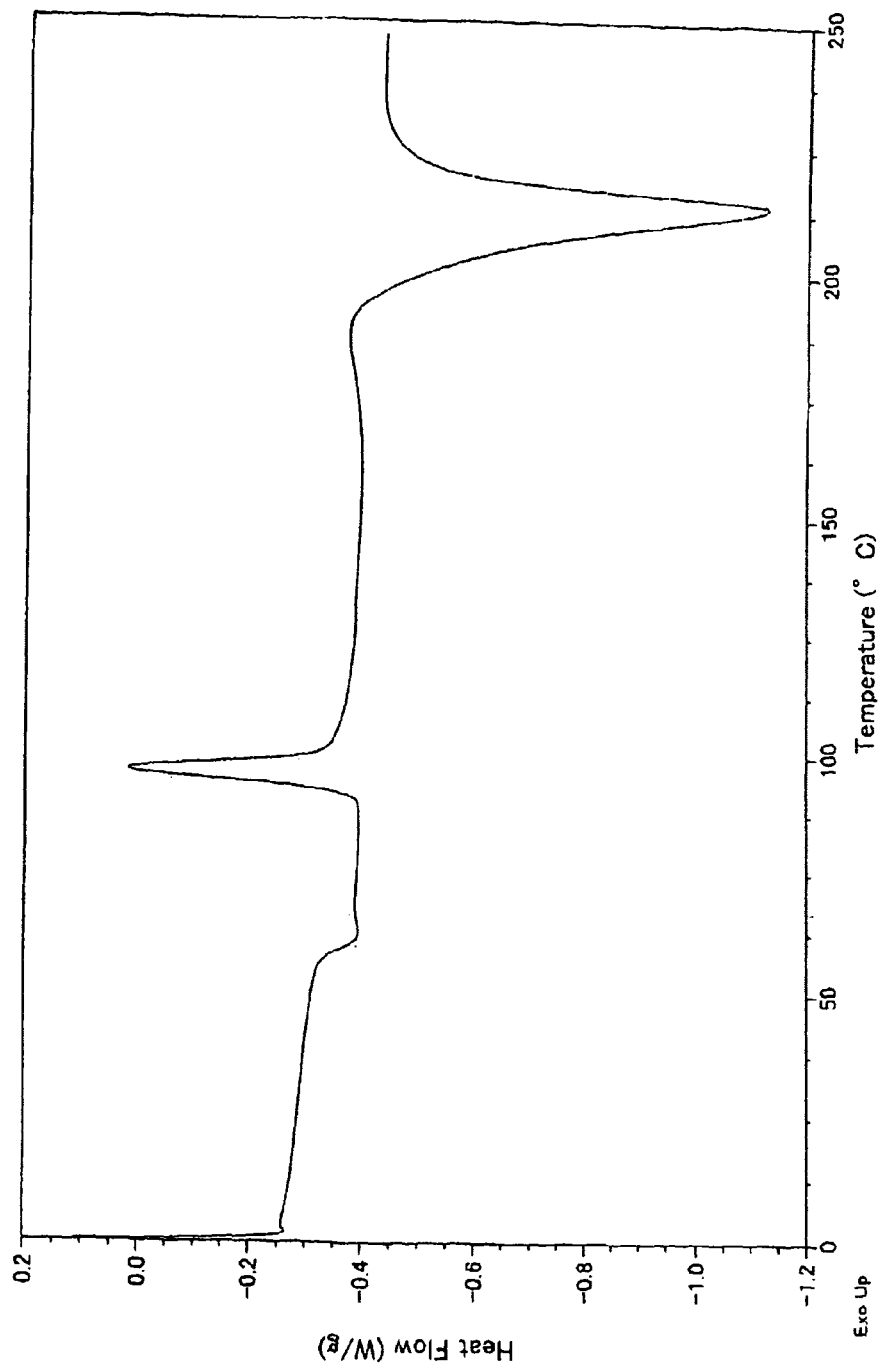
FIG. 8 is a diagram showing the second heating DSC measurement chart of a sheet (unstretched) comprising the polylactic acid composition of Example 1.
Figure 9:
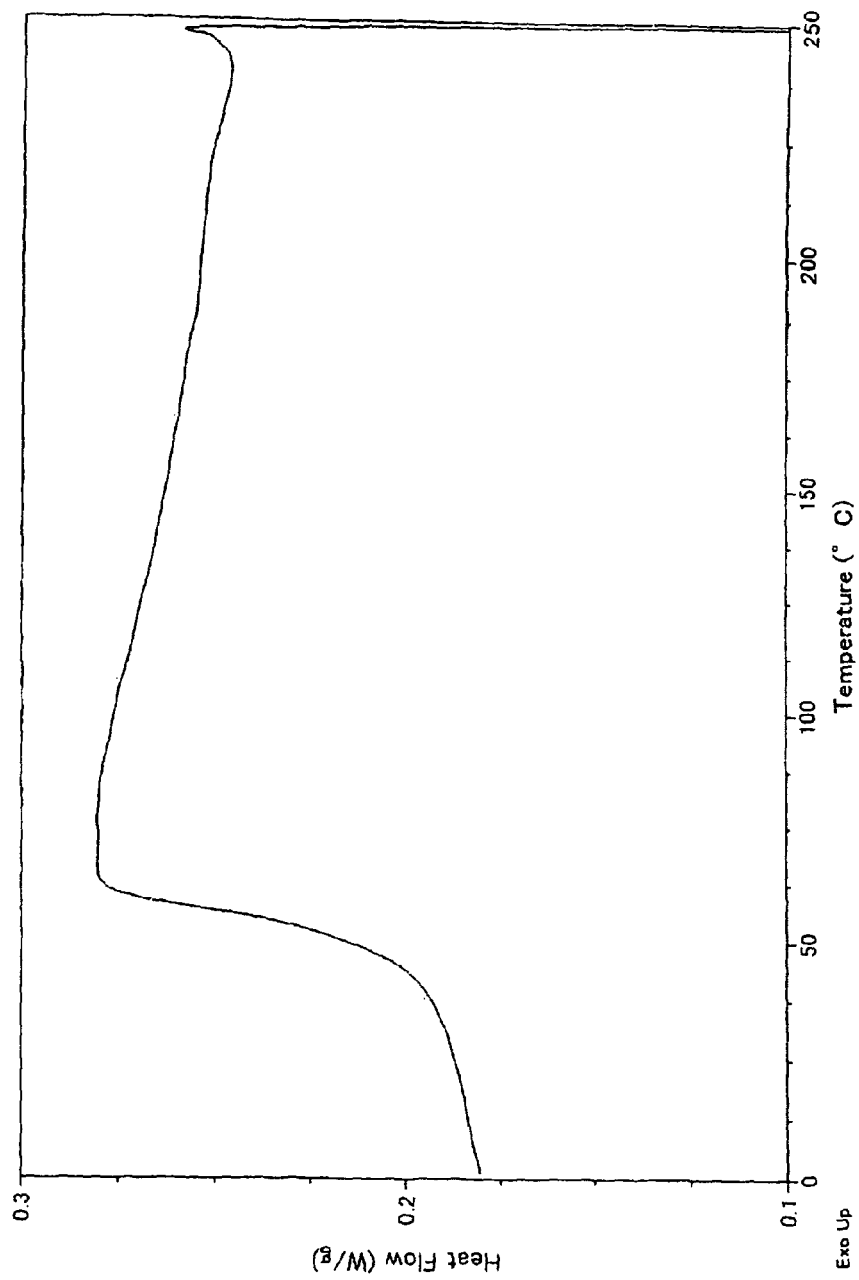
FIG. 9 is a diagram showing the first cooling DSC measurement chart of a sheet (unstretched) comprising the polylactic acid composition of Comparative Example 1.
Figure 10:
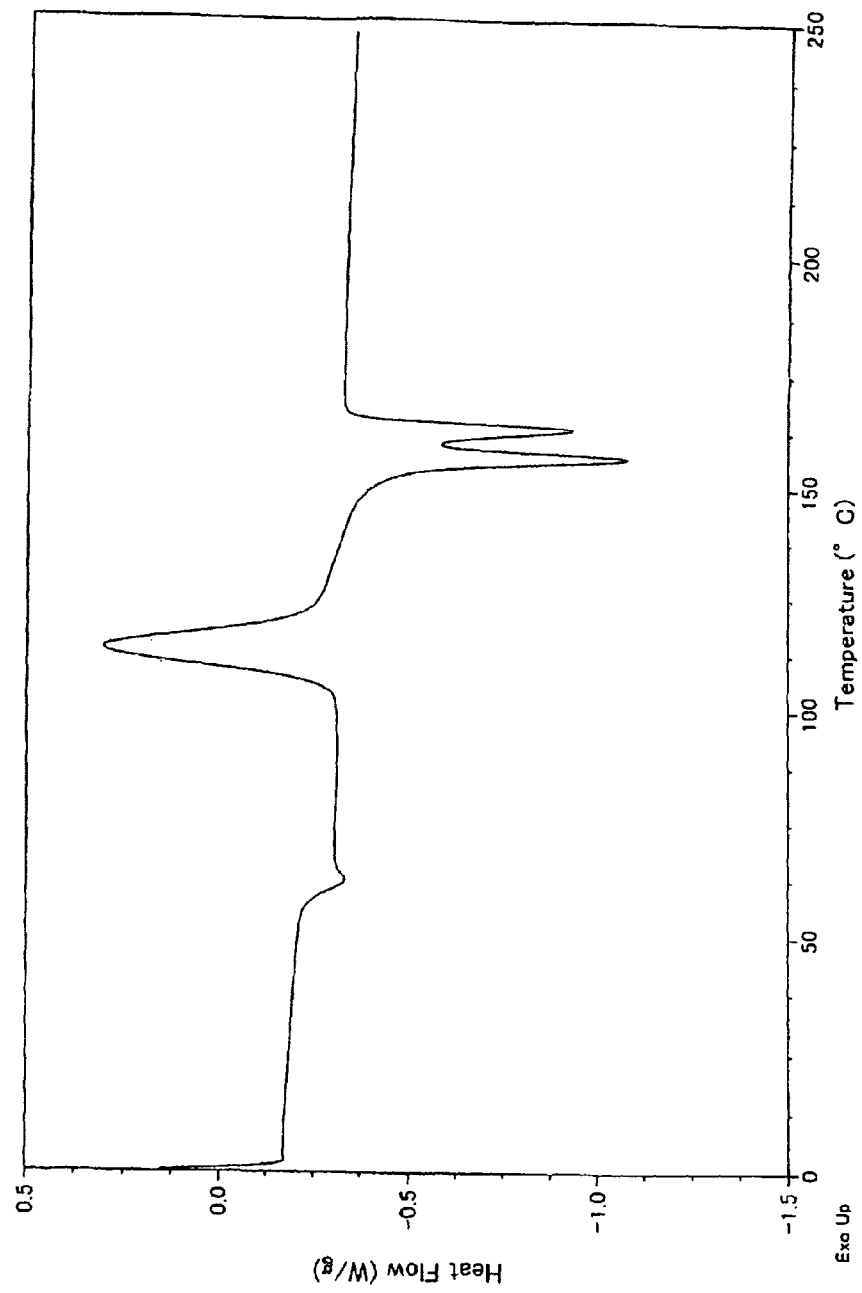
FIG. 10 is a diagram showing the second heating DSC measurement chart of a sheet (unstretched) comprising the polylactic acid composition of Comparative Example 1.

| Item | Units | Example 1 | Comparative Example 1 |
|---|---|---|---|
| Starting material | | | |
| PLLA-1 | (%) | 50 | 100 |
| PDLA-1 | (%) | 50 | |
| 1. Evaluation of composition | | | |
| 1st cooling | | FIG. 7 | FIG. 9 |
| ΔHc | (J/g) | 20.3 | 0 |
| 2nd heating | | FIG. 8 | FIG. 10 |
| ΔHm 150 to 200° C. | (J/g) | 0.0 | 32.1 |
| ΔHm 205 to 240° C. | (J/g) | 51.0 | 0 |

TABLE 1-continued

Figure 5:
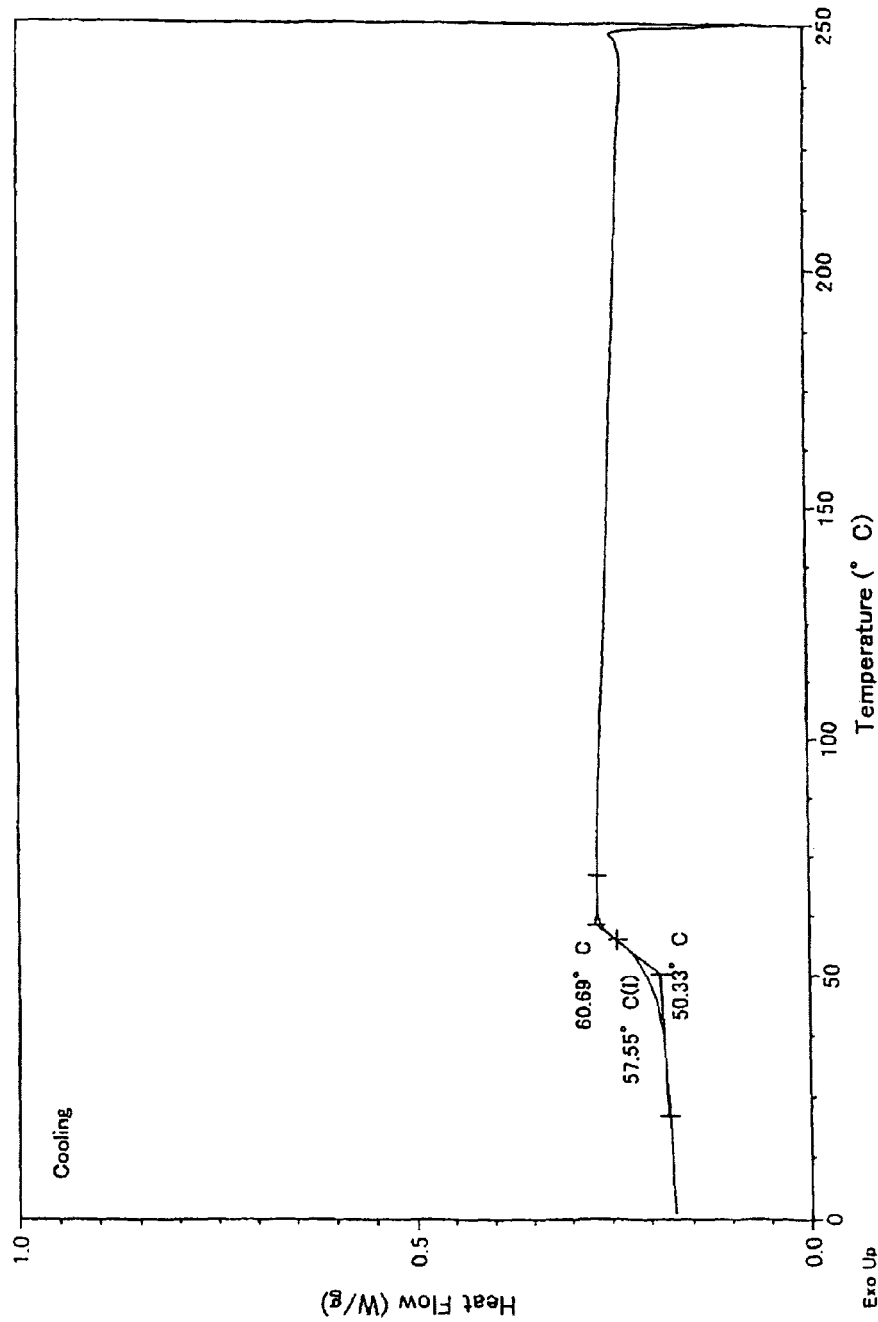
FIG. 5 is a diagram showing the first cooling DSC measurement chart of the stretched film of Comparative Example 1.
Figure 6:
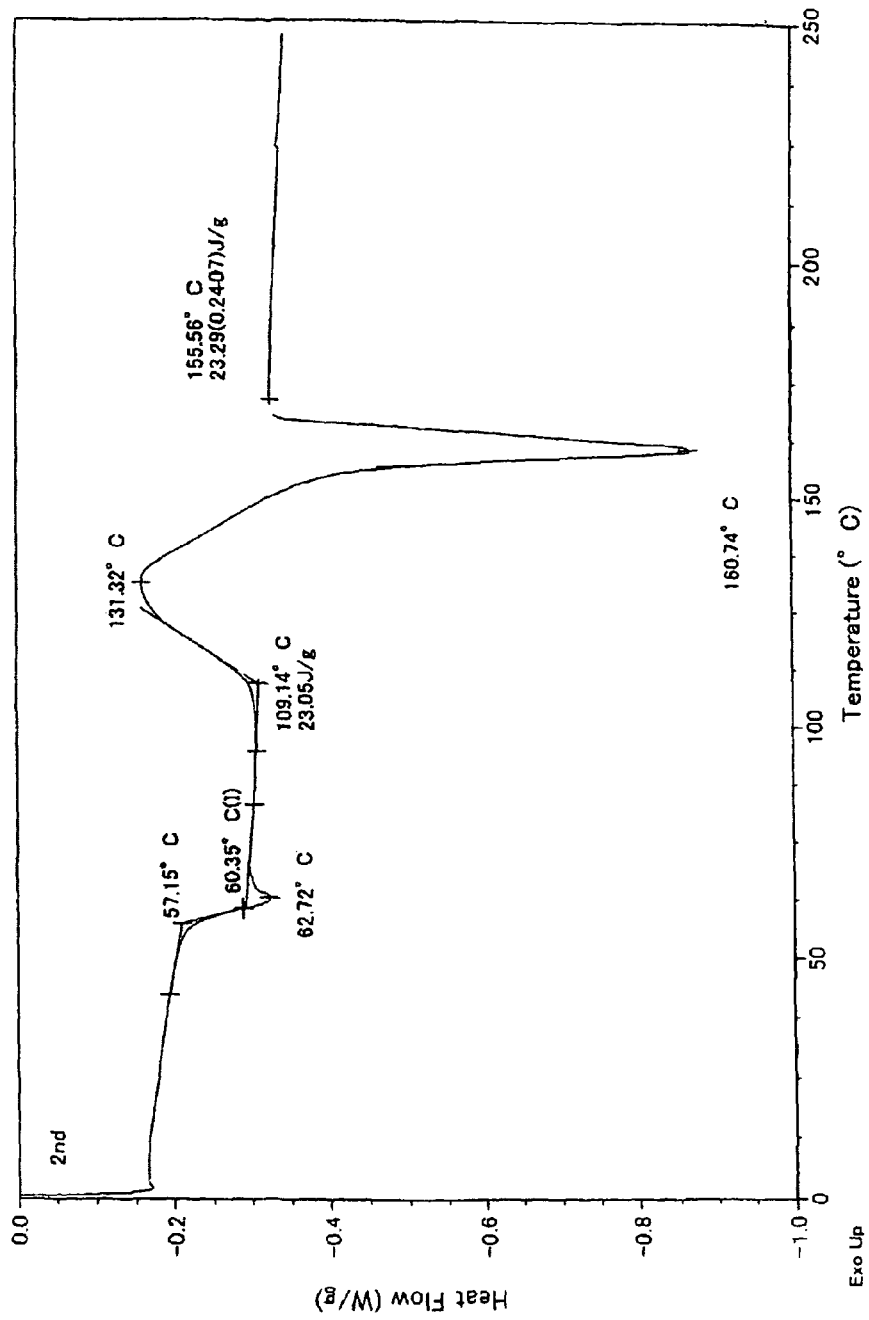
FIG. 6 is a diagram showing the second heating DSC measurement chart of the stretched film of Comparative Example 1.
Figure 11:
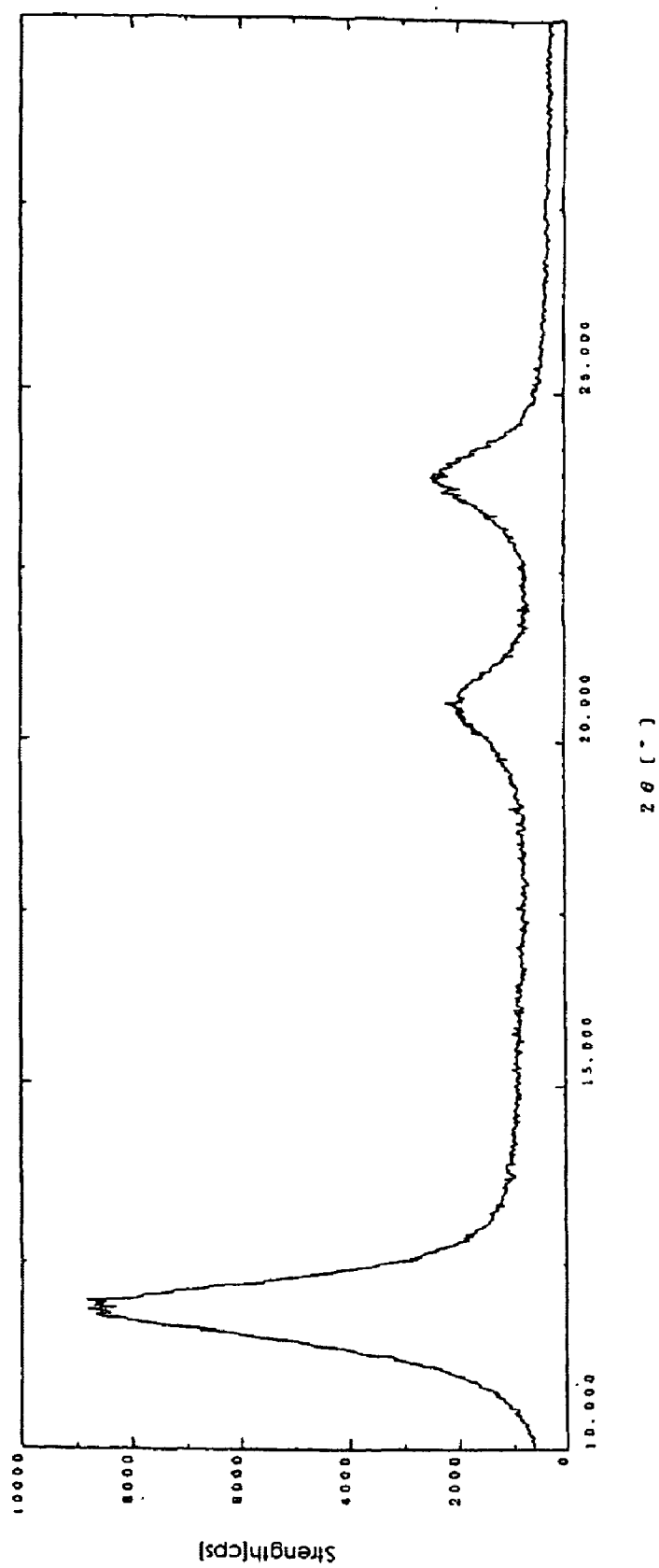
FIG. 11 is a diagram showing the wide-angle X-ray diffraction measurement results obtained for the stretched film of Example 1.
Figure 12:
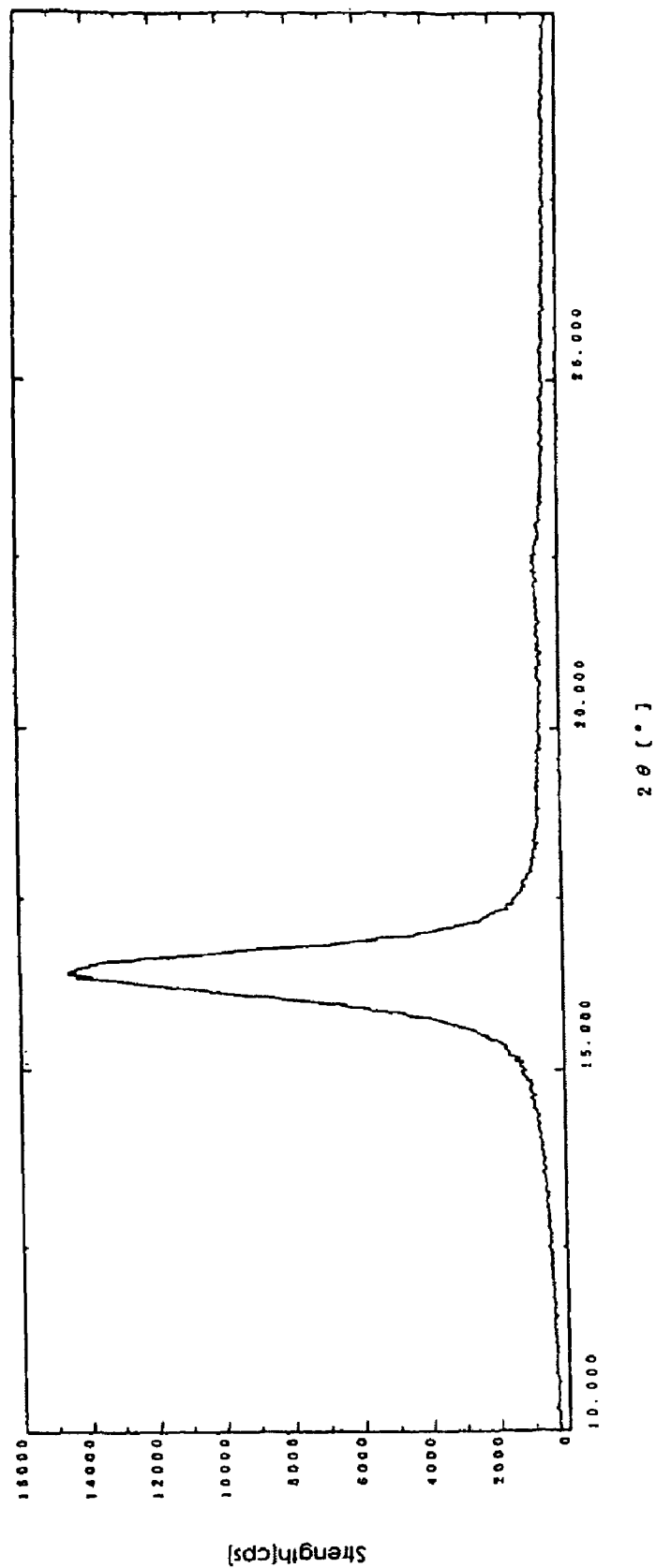
FIG. 12 is a diagram showing the wide-angle X-ray diffraction measurement results obtained for the stretched film of Comparative Example 1.

| Item | Units | Example 1 | Comparative Example 1 |
|---|---|---|---|
| Peak height in 2nd heating | (W/g) | | |
| 150 to 200° C. | | 0.00 | 0.55 |
| 205 to 250° C. | | 0.70 | 0 |
| Peak ratio | (—) | 0.00 | Calculation impossible |
| 2. Evaluation of stretched film | | | |
| 1st heating | | FIG. 1 | FIG. 4 |
| ΔHm 150 to 200° C. | (J/g) | 0.0 | 36.2 |
| ΔHm 205 to 240° C. | (J/g) | 66.1 | 0.00 |
| Peak height in 1st heating | (W/g) | | |
| 150 to 200° C. | | 0.00 | 0.94 |
| 205 to 240° C. | | 0.55 | 0.00 |
| Peak ratio | (—) | 0.00 | Calculation impossible |
| 1st cooling | | FIG. 2 | FIG. 5 |
| ΔHc | (J/g) | 49.7 | 0.4 |
| 2nd heating | | FIG. 3 | FIG. 6 |
| ΔHm 150 to 200° C. | (J/g) | 0.0 | 23.3 |
| ΔHm 205 to 240° C. | (J/g) | 51.9 | 0.0 |
| Peak height in 2nd heating | (W/g) | | |
| 150 to 180° C. | | 0.00 | 0.54 |
| 200 to 250° C. | | 0.52 | 0.00 |
| Peak ratio | (—) | 0.00 | Calculation impossible |
| 2. Film properties Transparency | | | |
| HZ | (%) | 0.4 | 1.0 |
| PT | (%) | 92.7 | 90.1 |
| Surface roughness (SRa) | (μ) | 0.03 | 0.04 |
| Tensile test MD direction | | | |
| Breaking strength | (MPa) | 150 | 100 |
| Elongation at break | (%) | 120 | 110 |
| Young's modulus | (MPa) | 2800 | 2800 |
| TD direction | | | |
| Breaking strength | (MPa) | 170 | 120 |
| Elongation at break | (%) | 80 | 90 |
| Young's modulus | (MPa) | 2800 | 2800 |
| Heat resistance | | | |
| MD direction | 100° C. | -0.7 | -0.4 |
| | 120° C. | -0.8 | -3.1 |
| | 140° C. | -1.2 | -7.0 |
| | 160° C. | -2.6 | -11.6 |
| | 180° C. | -5.9 | Melted |
| | 200° C. | -8.7 | |
| | 220° C. | Melted | |
| TD direction | 100° C. | 0.3 | 0.8 |
| | 120° C. | 0.1 | 0.6 |
| | 140° C. | -0.5 | -1.3 |
| | 160° C. | -2.8 | -4.5 |
| | 180° C. | -7.3 | Melted |
| | 200° C. | -12.0 | |
| | 220° C. | Melted | |
| Wide-angle X-ray diffraction | | FIG. 11 | FIG. 12 |
| (1) Measurement result | Ssc (mg) | 88 | 0 |
| | PPL (mg) | 0 | 59 |
| Amorphous portion | (mg) | 85 | 44 |
| (2) Ratio | Ssc (%) | 50.9 | 0.0 |
| | PPL (%) | 0.0 | 57.3 |
| Amorphous portion | (%) | 49.1 | 42.7 |
| Barrier performance | | | |
| Moisture permeability (30 μm) | (g/m² · d) | 123 | 301 |
| Oxygen permeability (30 μm) | (cc/m² · d · atm) | 55 | 742 |

As follows from Table 1, in the thermal melting properties of the biaxially stretched film composed of the polylactic acid composition obtained in Example 1, an endothermic peak (amount of absorbed heat) within a range of 150 to 200° C. is very small, an endothermic peak within a range of 205 to 240° C. is large, the endothermic amount (ΔHm) is as large as 66.1 J/g, and the exothermic amount (ΔHc) during cooling is 49.7 J/g. Furthermore, in the thermal melting properties of the polylactic acid composition (sheet) serving as a base material for the biaxially stretched film, the exothermic amount (ΔHc) during first cooling is 20.3 J/g, and during second heating, no endothermic peak is observed in a range of 150 to 200° C. and the endothermic amount (ΔHm) of the endothermic peak in a range of 205 to 240° C. is 51.0 J/g. Furthermore, the biaxially stretched film composed of the polylactic acid composition obtained in Example 1 excels in transparency and heat resistance, has low moisture permeability and oxygen permeability, has barrier ability, and also has a peak area ($S_{SC}$) in the vicinity of 12 degrees, 21 degrees, and 24 degrees in wide-angle X-ray measurements of 50.9%, that is, more than 20%, based on the entire area and a peak area ($S_{PL}$) in the vicinity of 20 of 17 degrees and 19 degrees of 0.0%, that is, less than 5%, based on the entire area. Therefore, it is clear that the crystallized portion is a stereocomplex structure and the fraction ratio thereof is large.

By contrast, in the biaxially stretched film composed of PLLA-1 that was obtained in Comparative Example 1, only an endothermic peak of a range of 150 to 200° C. is present, no endothermic peak is present in a range of 205 to 240° C., and the exothermic amount (ΔHc) during cooling is 0.4 J/g and less than that of the biaxially stretched film composed of the polylactic acid composition obtained in Example 1. Furthermore, in the thermal melting properties of the PLLA-1 (sheet) serving as a base material for the biaxially stretched film, the exothermic amount (ΔHc) during first cooling is 0, and during second heating, no endothermic peak is present in a range of 205 to 240° C., only a peak of a range of 150 to 200° C. is present, and the endothermic amount (ΔHm) is 32.1 J/g. Furthermore, the biaxially stretched film composed of PLLA-1 obtained in Comparative Example 1 excels in transparency, but has poor heat resistance and barrier capacity and also has a peak area ($S_{SC}$) in the vicinity of 12 degrees, 21 degrees, and 24 degrees in wide-angle X-ray measurements of 0.0% based on the entire area and a peak area ($S_{PL}$) in the vicinity of 20 of 17 degrees and 19 degrees of 57.3% based on the entire area. Therefore, it is clear that the crystallized portion does not include a stereocomplex structure.

Example 2

Manufacture of Press Sheet Comprising Polylactic Acid Composition

A polylactic acid composition was obtained by weighing 80 g of PLLA-1 and PDLA-2 at a ratio of 50:50 (parts by weight) and melt kneading for 20 min under conditions of 250° C. and 120 rpm by using a Laboplast mill C model (twin-screw kneader) manufactured by Toyo Seiki Co. The polylactic acid composition was then press molded to obtain a press sheet composed of a polylactic acid composition and having a thickness of 500 μm.

<Manufacture of Biaxially Stretched Film>

The press sheet was preheated for 60 sec with hot air at 75° C. and then stretched in the longitudinal and transverse directions by a factor of 3.0 (simultaneous biaxial stretching) at a rate of 2.1 m/min by using a batch biaxial stretching device of a pantograph type (manufactured by Bruckner) and a biaxially stretched film with a thickness of about 50 μm was obtained. The obtained biaxially stretched film was fixed with clips to a metal frame and subjected to heat setting (heat treatment) under conditions of 200° C.×15 min and then sufficiently cooled at room temperature to obtain a polylactic acid biaxially stretched film.

The press sheet composed of the polylactic acid composition and the polylactic acid biaxially stretched film thus obtained were measured by the above-described methods. The measurement results are shown in Table 2.

Example 3

A polylactic acid composition and a polylactic acid biaxially stretched film were obtained in the same manner as in Example 2, except that PLLA-3 was used instead of PLLA-1 used in Example 2.

The press sheet composed of the polylactic acid composition and the polylactic acid biaxially stretched film thus obtained were measured by the above-described methods. The measurement results are shown in Table 2.

Example 4

A polylactic acid composition and a polylactic acid biaxially stretched film were obtained in the same manner as in Example 2, except that PLLA-3 was used instead of PLLA-1 used in Example 2 and was used instead of PDLA-2 used in Example 2.

The press sheet composed of the polylactic acid composition and the polylactic acid biaxially stretched film thus obtained were measured by the above-described methods. The measurement results are shown in Table 2.

Example 5

A polylactic acid composition and a polylactic acid biaxially stretched film were obtained in the same manner as in Example 2, except that PLLA-2 was used instead of PLLA-1 used in Example 2.

The press sheet composed of the polylactic acid composition and the polylactic acid biaxially stretched film thus obtained were measured by the above-described methods. The measurement results are shown in Table 2.

Example 6

A polylactic acid composition and a polylactic acid biaxially stretched film were obtained in the same manner as in Example 2, except that PLLA-2 was used instead of PLLA-1 used in Example 2 and was used instead of PDLA-2 used in Example 2.

The press sheet composed of the polylactic acid composition and the polylactic acid biaxially stretched film thus obtained were measured by the above-described methods. The measurement results are shown in Table 2.

Comparative Example 2

A composition and a biaxially stretched film were obtained in the same manner as in Example 2, except that a mixture obtained by setting the kneading time in the Laboplast mill to 3 min was used instead of the polylactic acid composition used in Example 2.

The press sheet and biaxially stretched film thus obtained were measured by the above-described methods. The measurement results are shown in Table 2.

Comparative Example 3

A composition and a biaxially stretched film were obtained in the same manner as in Example 2, except that a mixture obtained by setting the kneading time in the Laboplast mill to 3 min was used instead of the polylactic acid composition used in Example 4.

The press sheet and biaxially stretched film thus obtained were measured by the above-described methods. The measurement results are shown in Table 2.

Comparative Example 4

A composition and a biaxially stretched film were obtained in the same manner as in Example 2, except that a mixture obtained by setting the kneading time in the Laboplast mill to 3 min was used instead of the polylactic acid composition used in Example 6.

The press sheet and biaxially stretched film thus obtained were measured by the above-described methods. The measurement results are shown in Table 2.

TABLE 2

Figure 16:
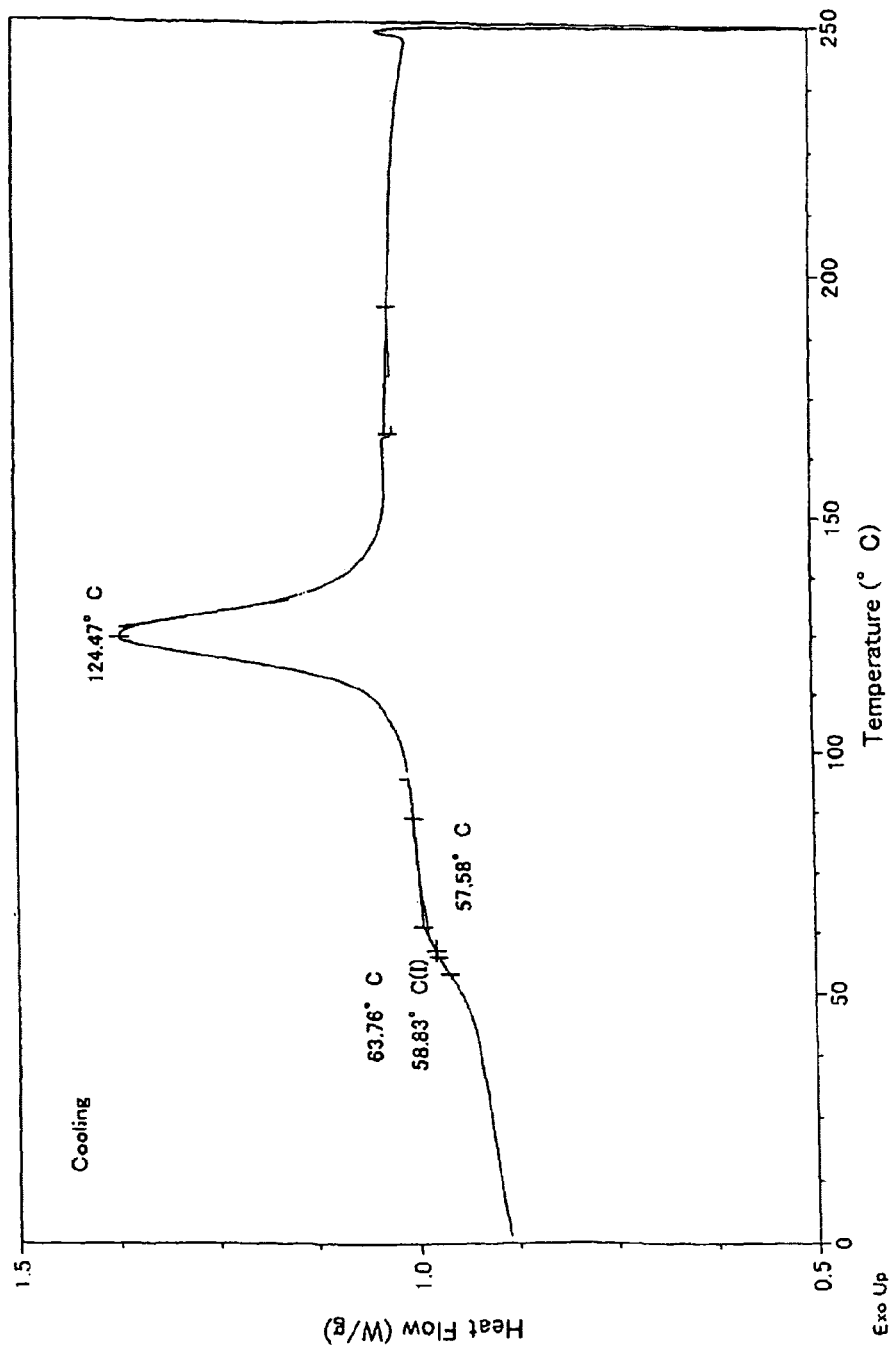
FIG. 16 is a diagram showing the first cooling DSC measurement chart of a sheet (unstretched) comprising the polylactic acid composition of Example 2.
Figure 17:
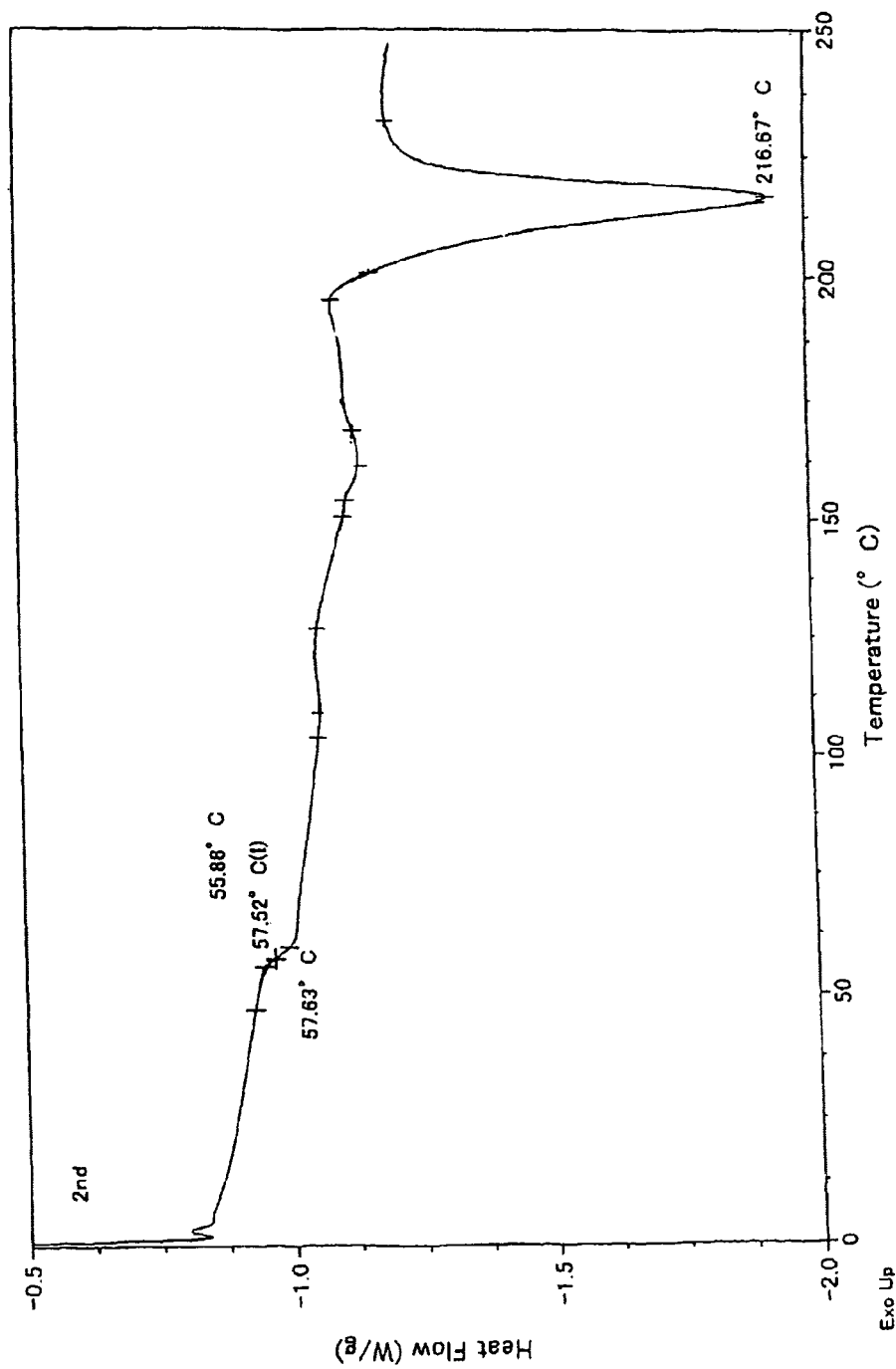
FIG. 17 is a diagram showing the second heating DSC measurement chart of a sheet (unstretched) comprising the polylactic acid composition of Example 2.
Figure 21:
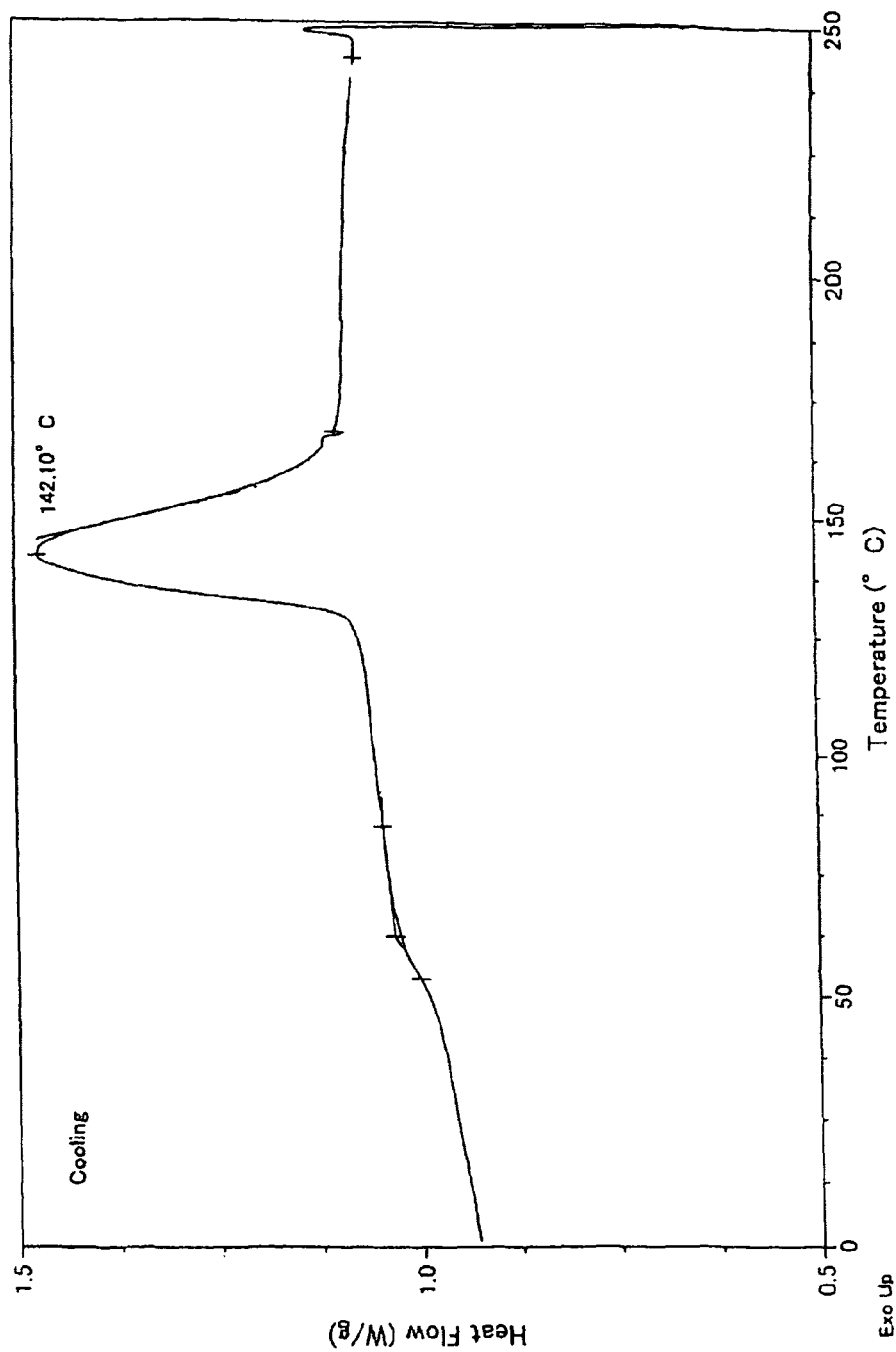
FIG. 21 is a diagram showing the first cooling DSC measurement chart of a sheet (unstretched) comprising the polylactic acid composition of Example 3.
Figure 22:
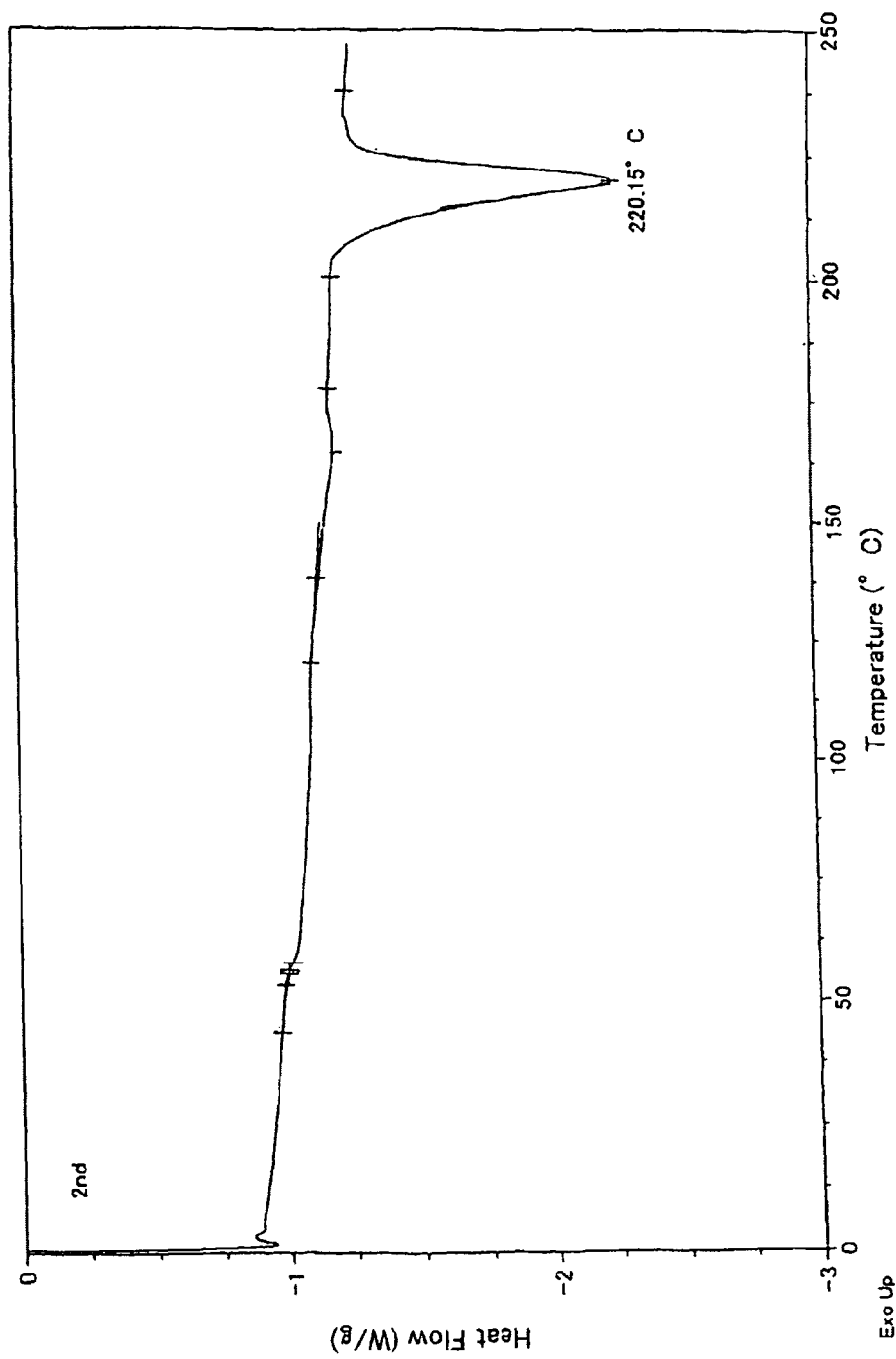
FIG. 22 is a diagram showing the second heating DSC measurement chart of a sheet (unstretched) comprising the polylactic acid composition of Example 3.
Figure 26:
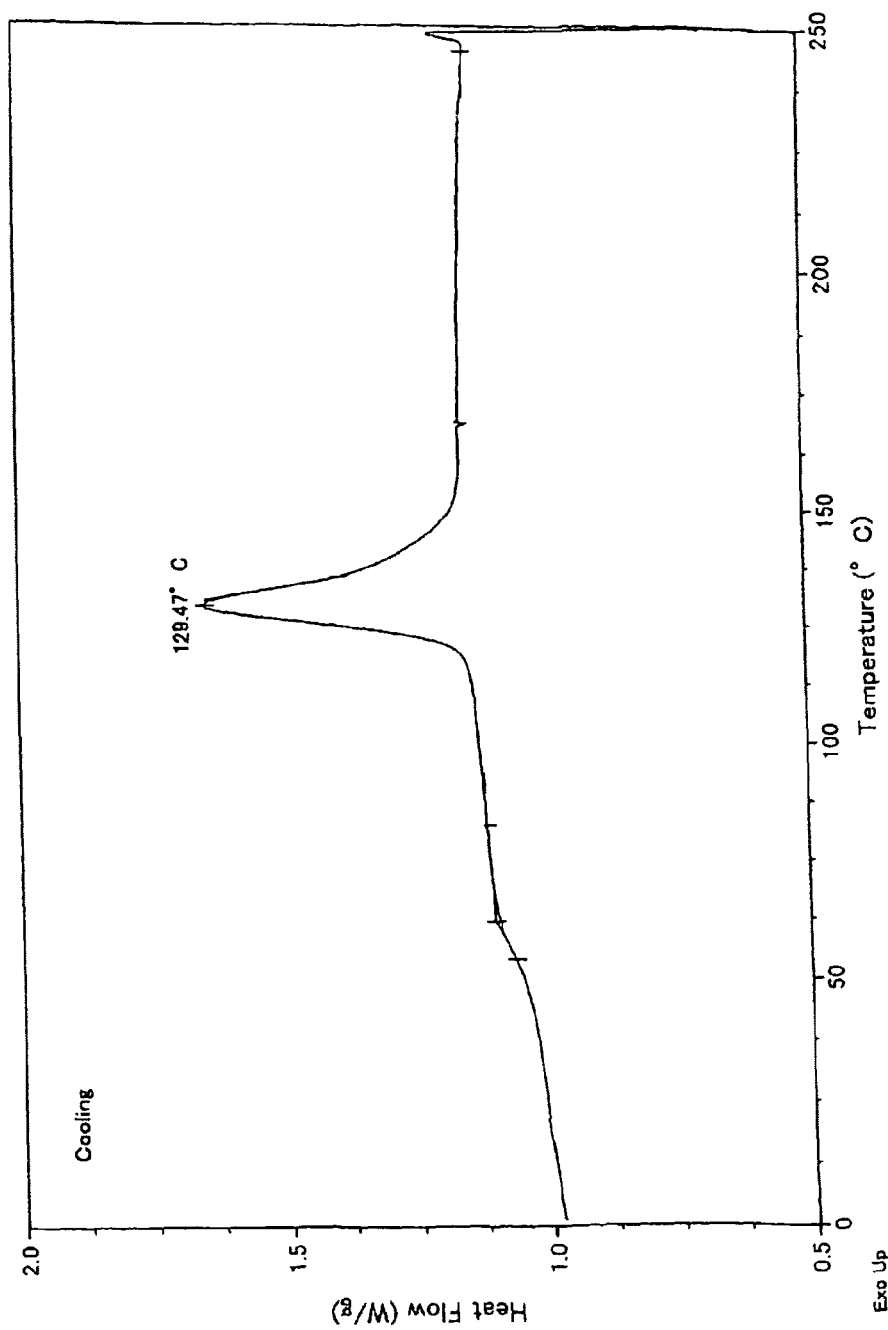
FIG. 26 is a diagram showing the first cooling DSC measurement chart of a sheet (unstretched) comprising the polylactic acid composition of Example 4.
Figure 27:
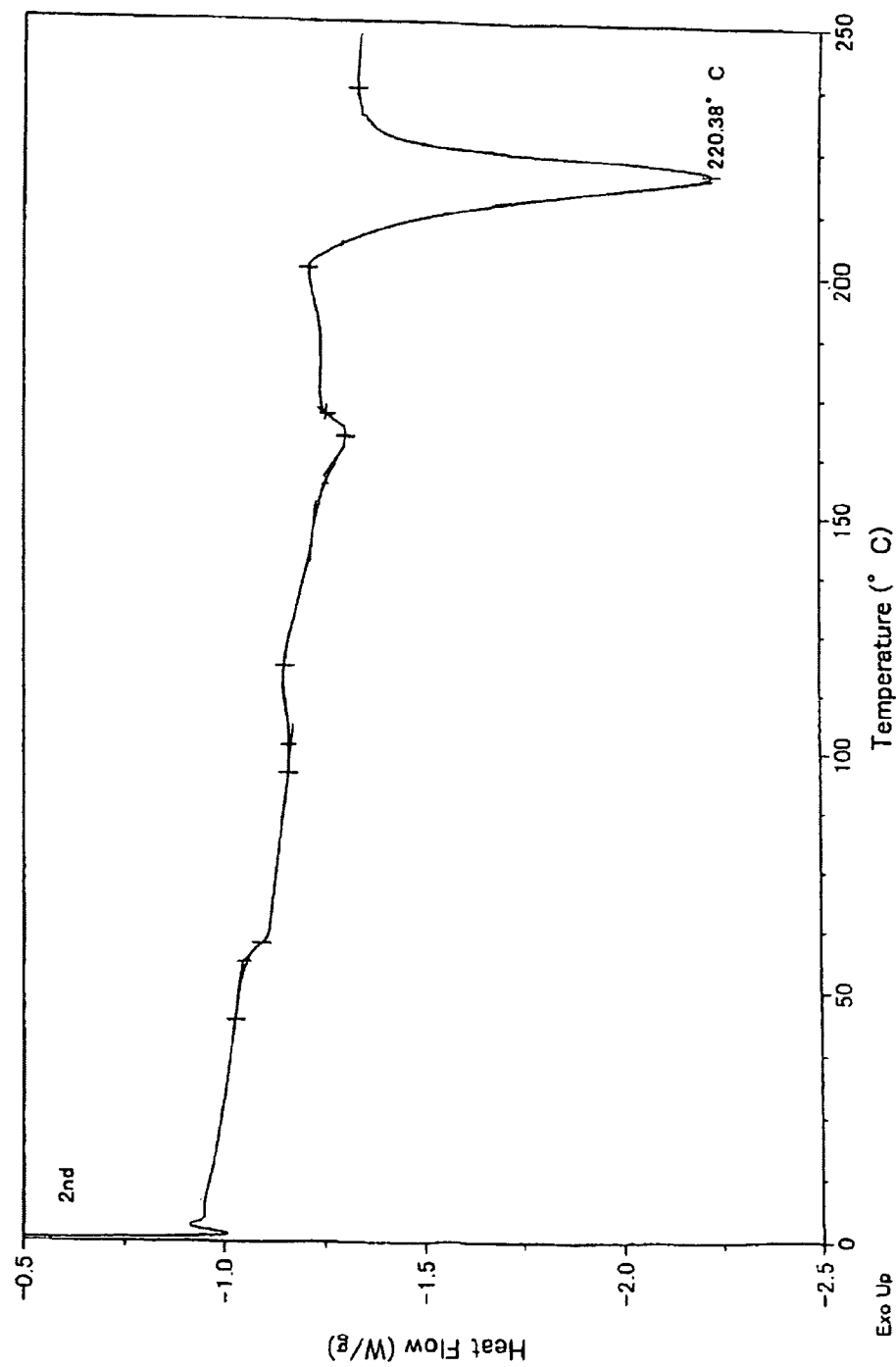
FIG. 27 is a diagram showing the second heating DSC measurement chart of a sheet (unstretched) comprising the polylactic acid composition of Example 4.
Figure 31:
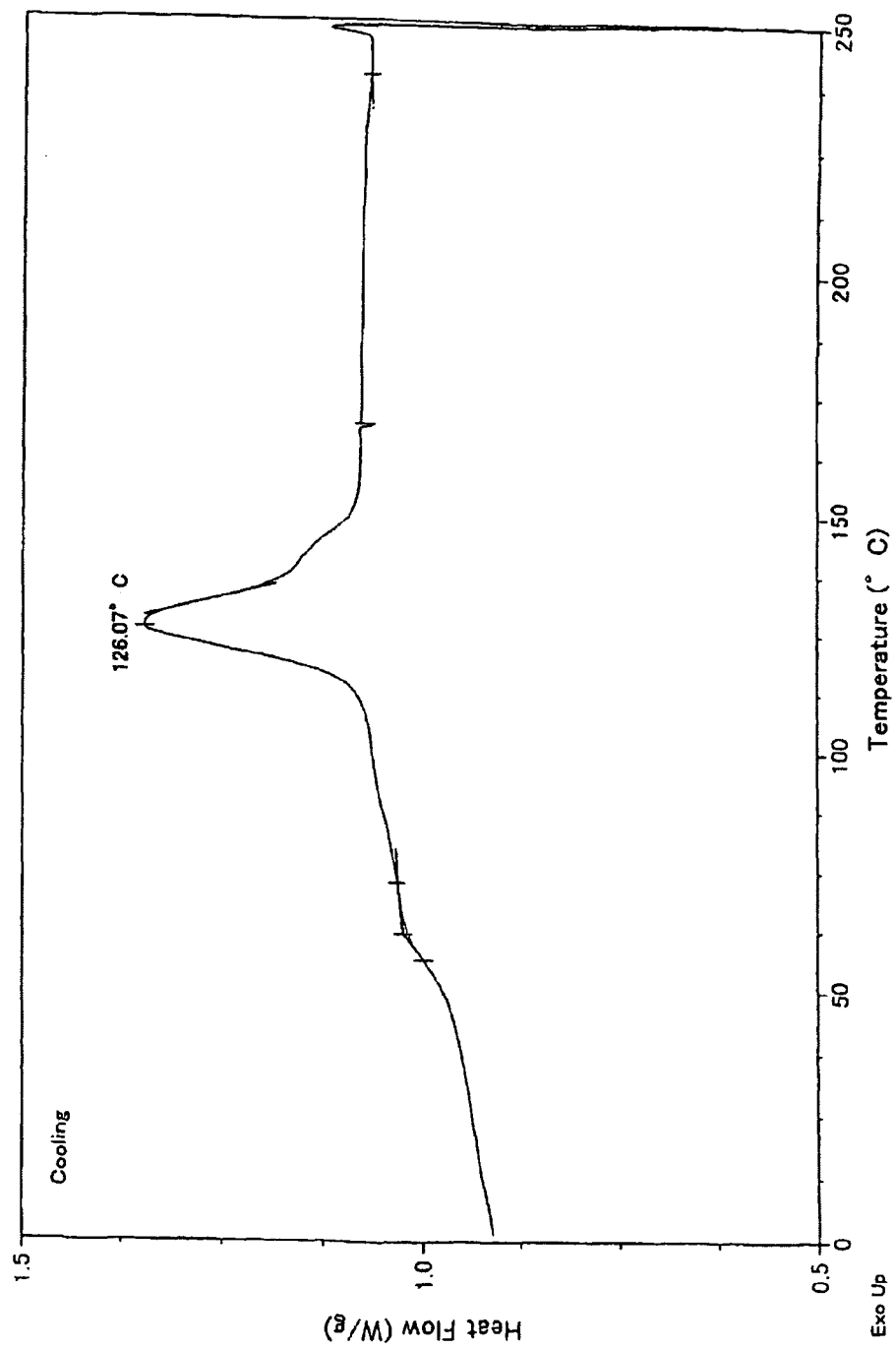
FIG. 31 is a diagram showing the first cooling DSC measurement chart of a sheet (unstretched) comprising the polylactic acid composition of Example 5.
Figure 32:
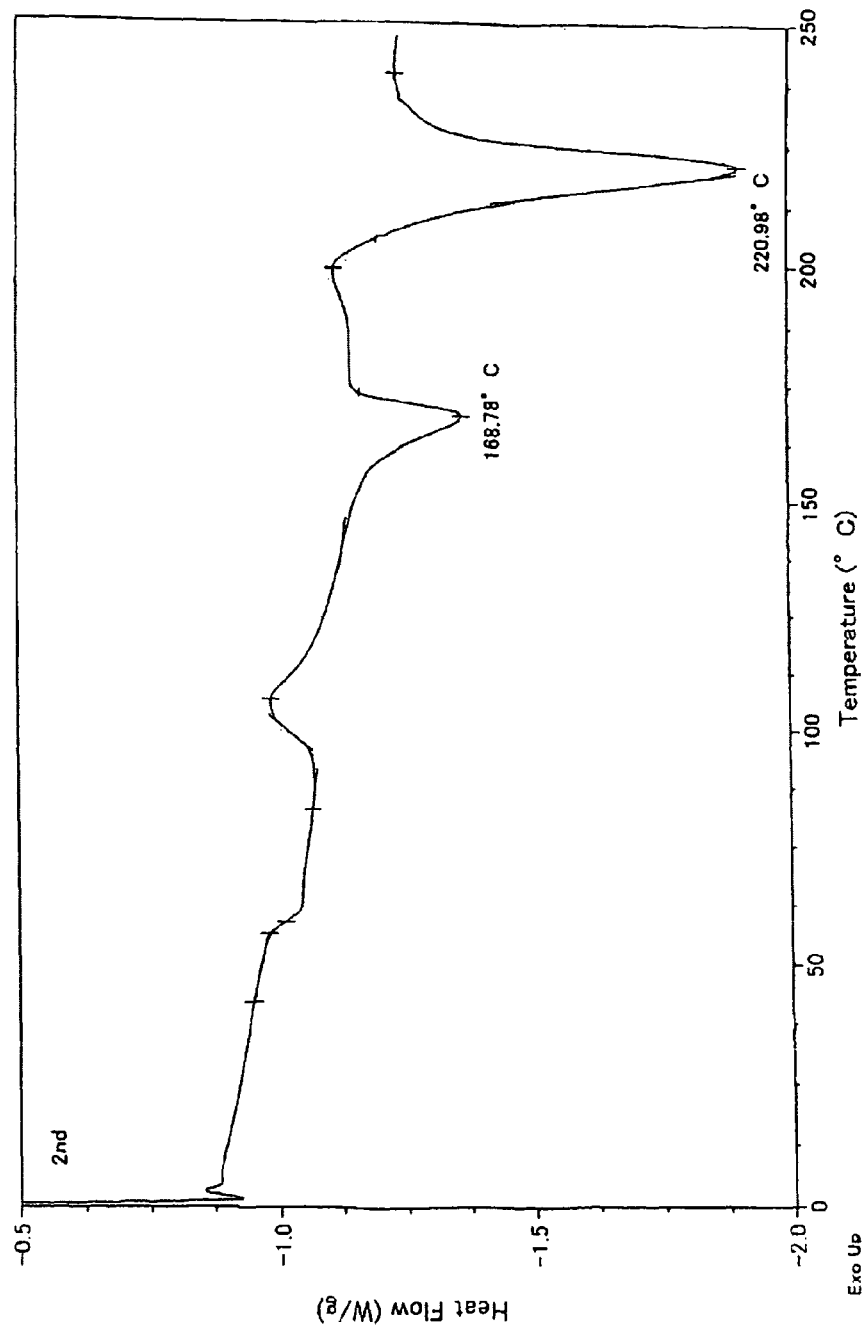
FIG. 32 is a diagram showing the second heating DSC measurement chart of a sheet (unstretched) comprising the polylactic acid composition of Example 5.
Figure 36:
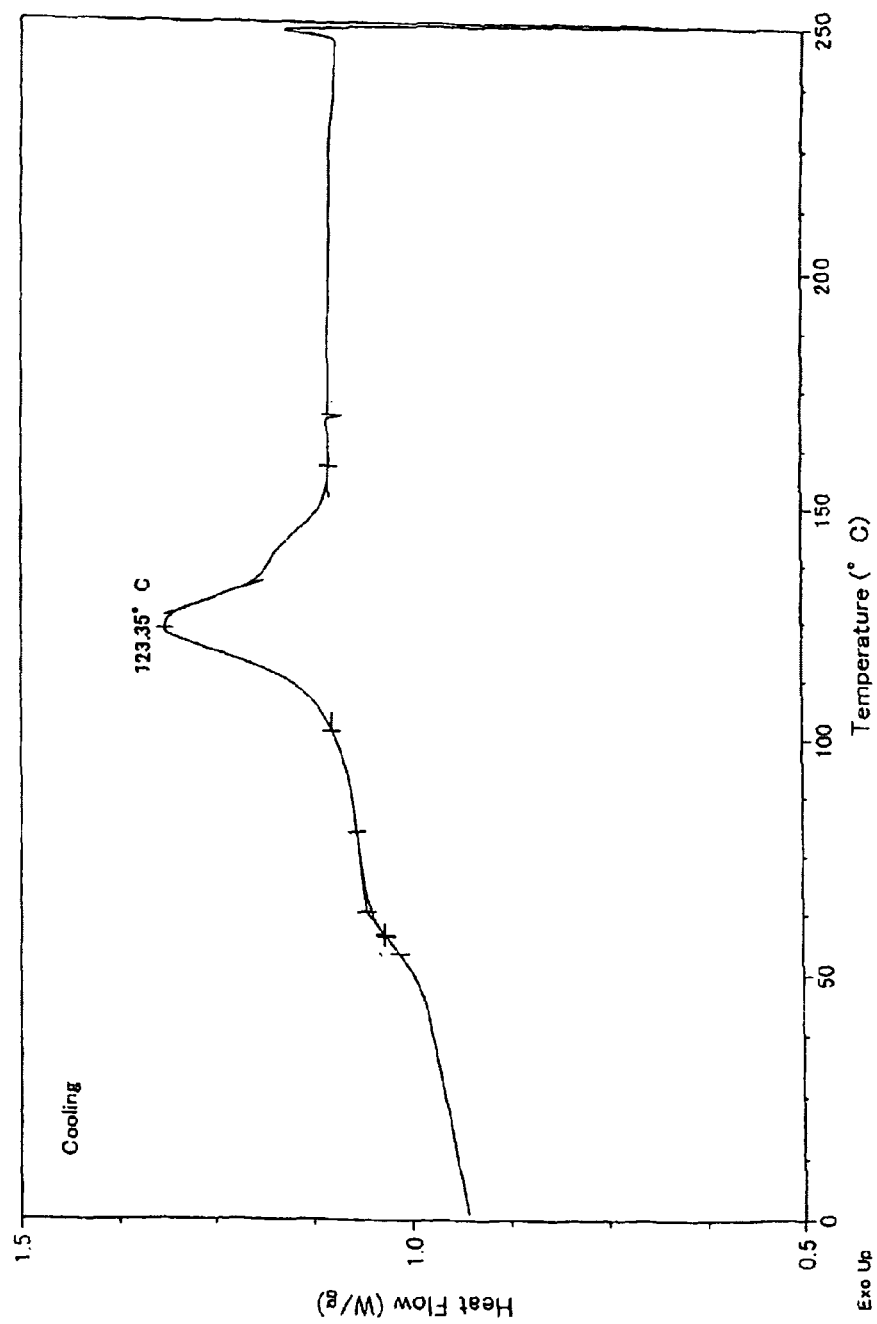
FIG. 36 is a diagram showing the first cooling DSC measurement chart of a sheet (unstretched) comprising the polylactic acid composition of Example 6.
Figure 37:
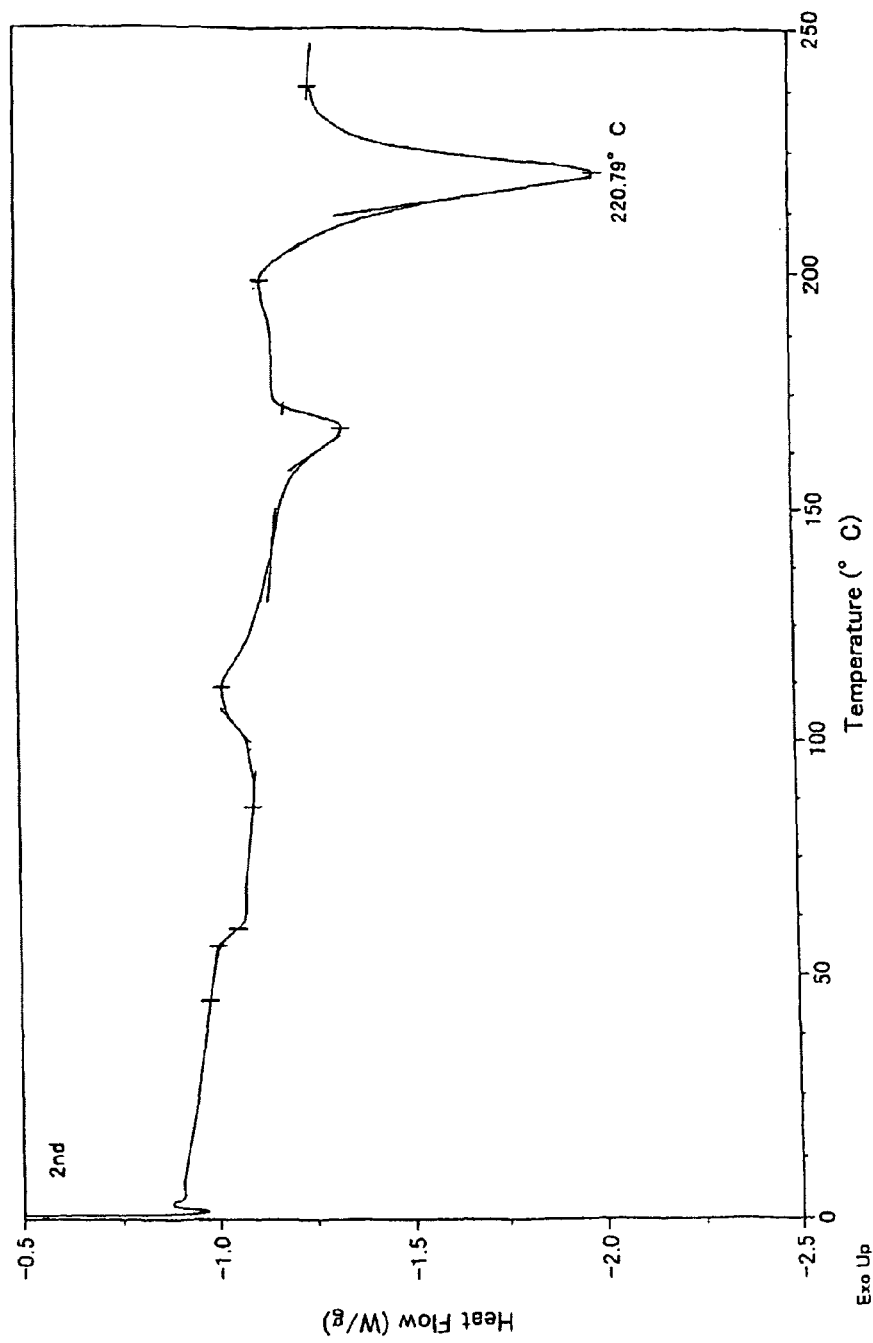
FIG. 37 is a diagram showing the second heating DSC measurement chart of a sheet (unstretched) comprising the polylactic acid composition of Example 6.

| Item | Units | Example 2 | Example 3 | Example 4 | Example 5 | Example 6 |
|---|---|---|---|---|---|---|
| Starting material | | | | | | |
| PLLA-1 | (%) | 50 | | | | |
| PLLA-2 | (%) | | | | 50 | 50 |
| PLLA-3 | (%) | | 50 | 50 | | |
| PDLA-1 | (%) | | | 50 | | 50 |
| PDLA-2 | (%) | 50 | 50 | | 50 | |
| Kneading time | (min) | 20 | 20 | 20 | 20 | 20 |
| 1. Evaluation of composition | | | | | | |
| 1st cooling | | | | | | |
| ΔHc | (J/g) | FIG. 16 | FIG. 21 | FIG. 26 | FIG. 31 | FIG. 36 |
|  | | 36.0 | 63.8 | 56.0 | 48.7 | 26.4 |
| 2nd heating | | FIG. 17 | FIG. 22 | FIG. 27 | FIG. 32 | FIG. 37 |
| ΔHm 150 to 200° C. | (J/g) | 1.0 | 5.1 | 3.8 | 12.6 | 9.8 |
| ΔHm 205 to 240° C. | (J/g) | 47.0 | 56.7 | 55.5 | 46.8 | 51.1 |
| Peak height in 2nd heating | (W/g) | | | | | |
| 150 to 200° C. | | 0.025 | 0.025 | 0.068 | 0.203 | 0.136 |

TABLE 2-continued

Figure 13:
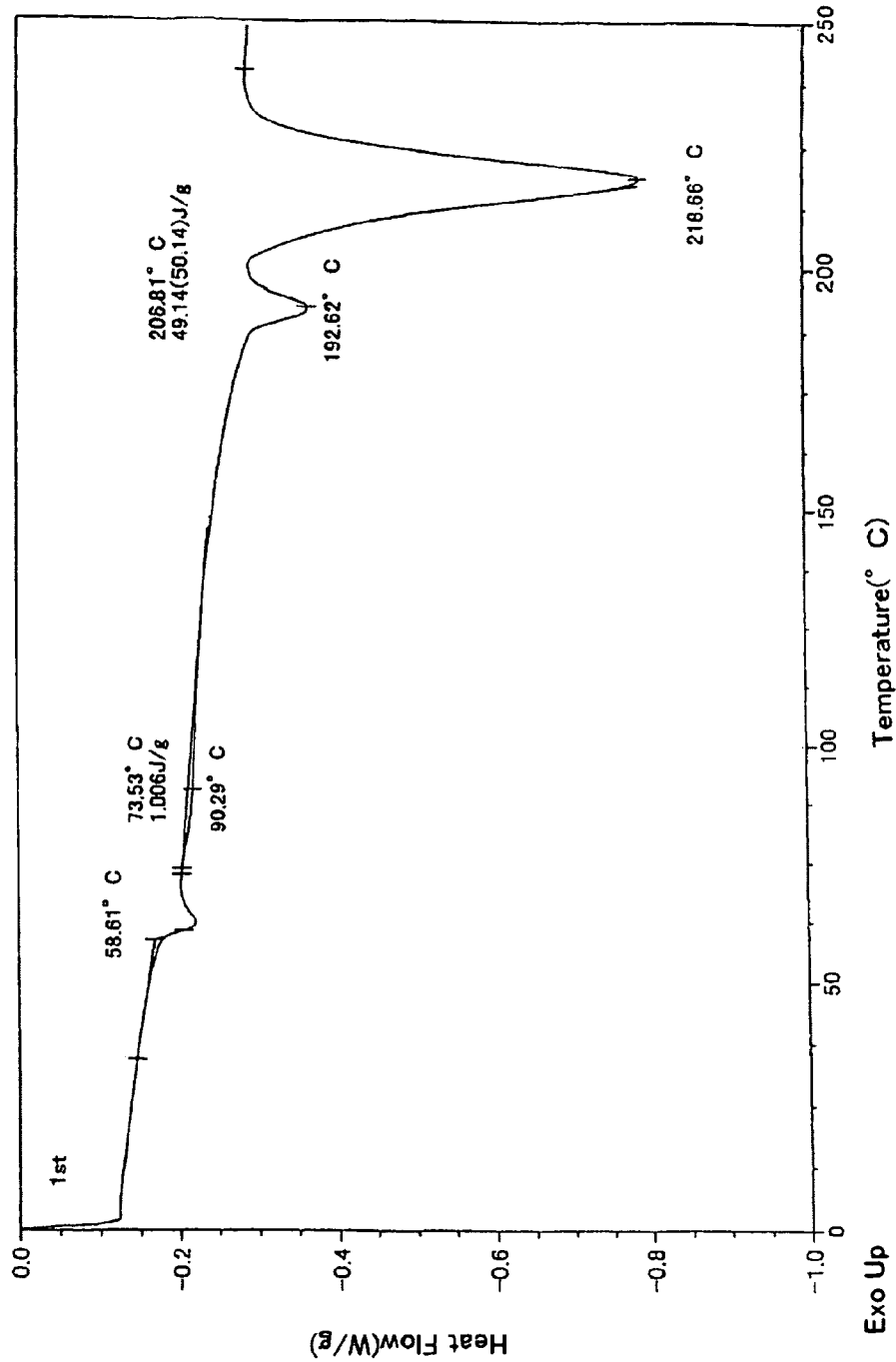
FIG. 13 is a diagram showing the first heating DSC measurement chart of the stretched film of Example 2.
Figure 14:
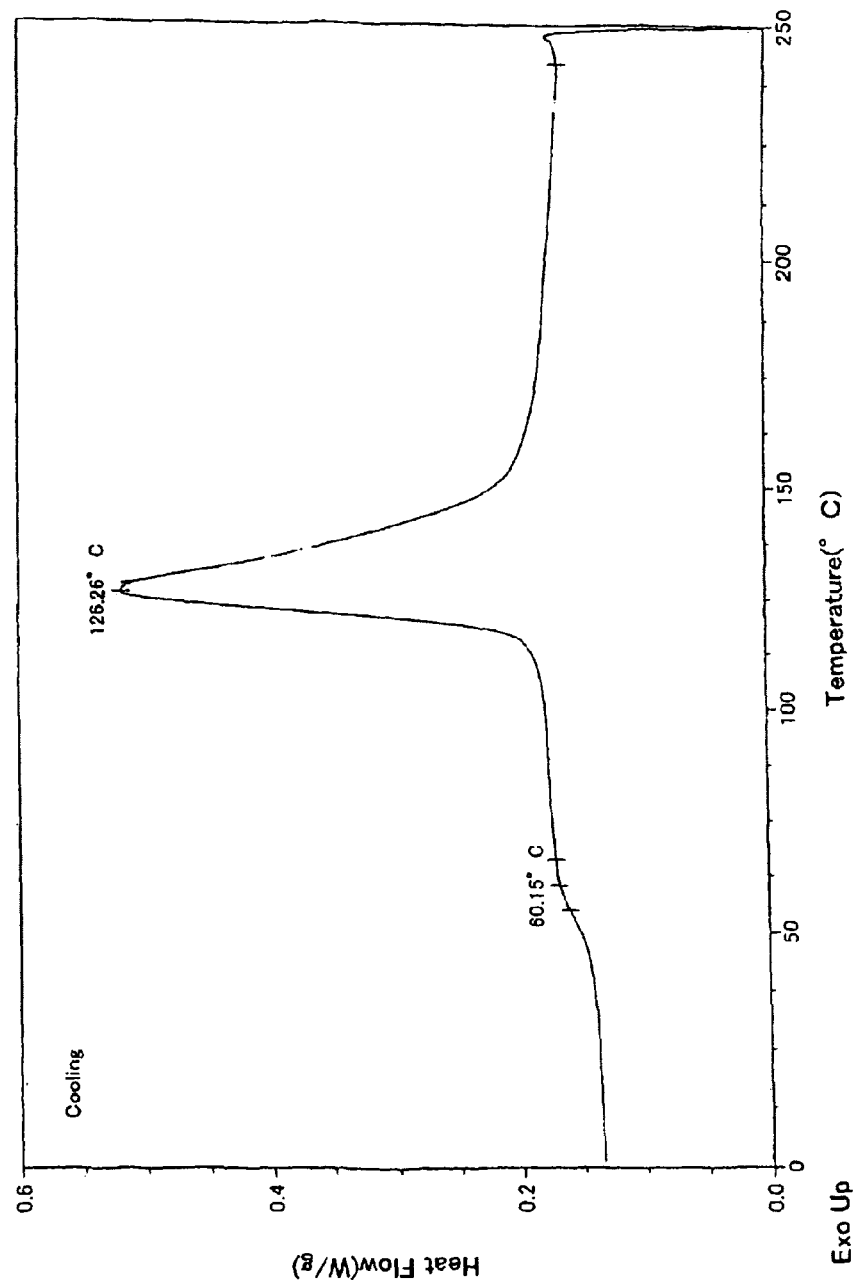
FIG. 14 is a diagram showing the first cooling DSC measurement chart of the stretched film of Example 2.
Figure 15:
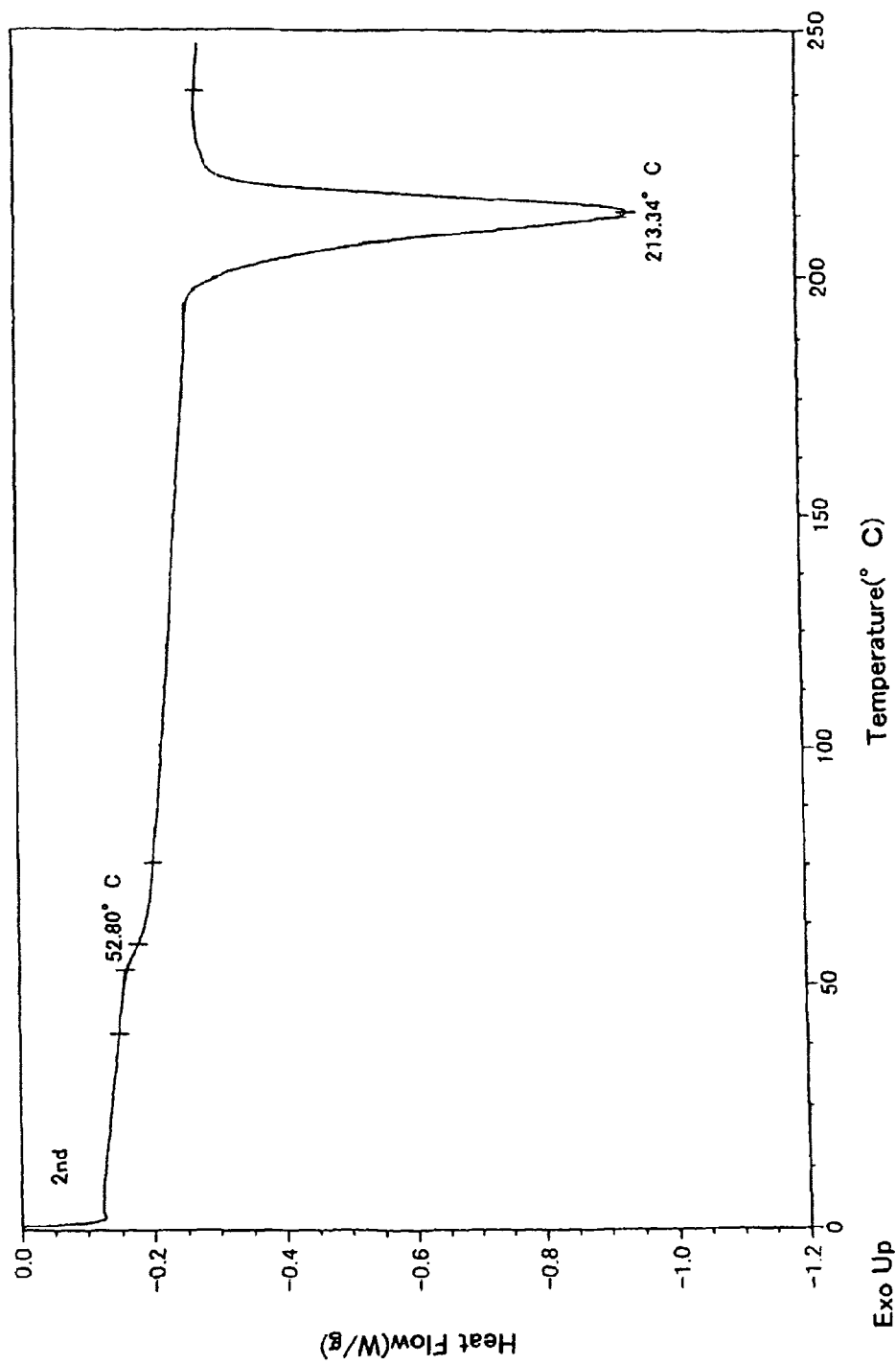
FIG. 15 is a diagram showing the second heating DSC measurement chart of the stretched film of Example 2.
Figure 18:
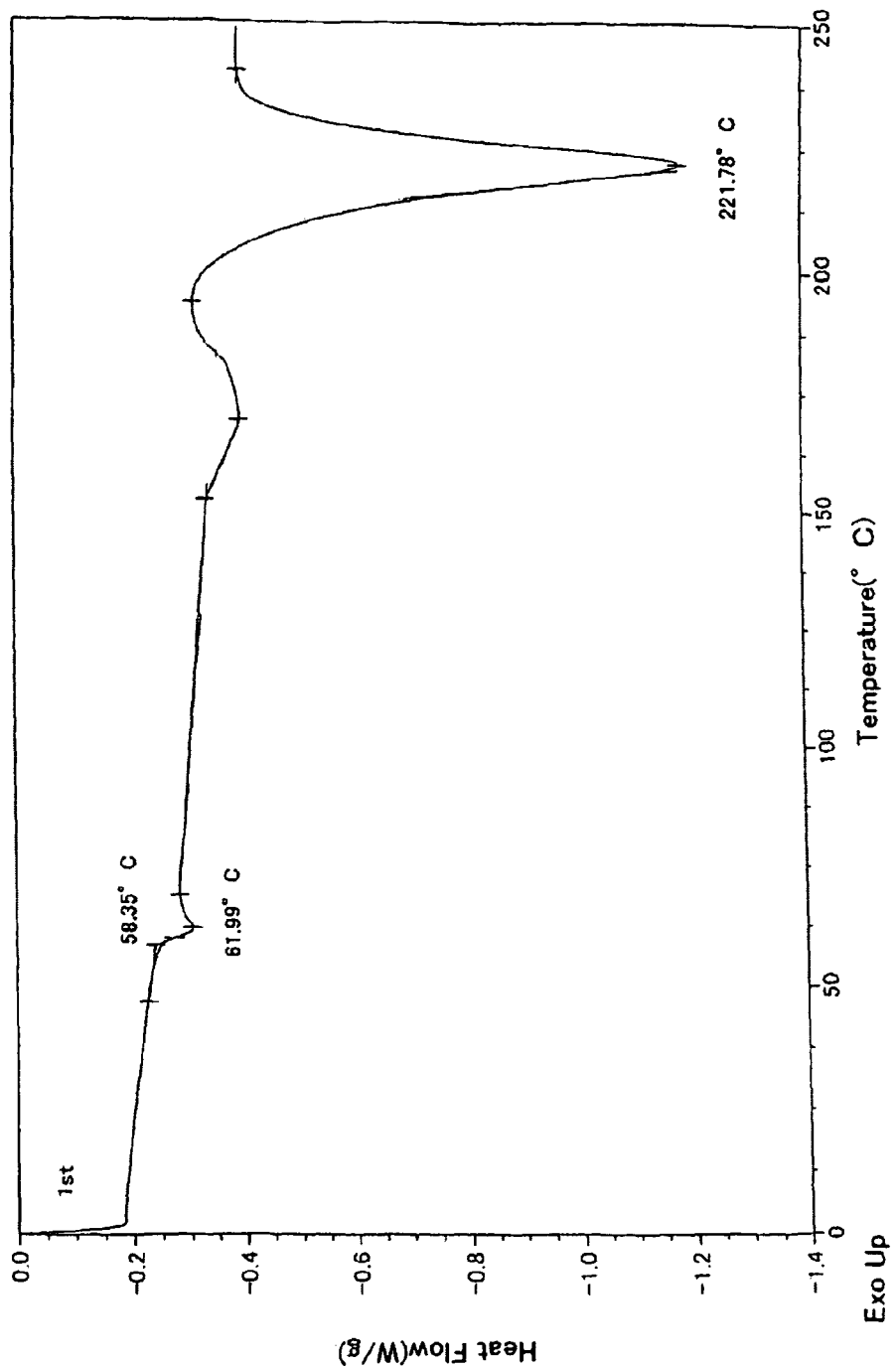
FIG. 18 is a diagram showing the first heating DSC measurement chart of the stretched film of Example 3.
Figure 19:
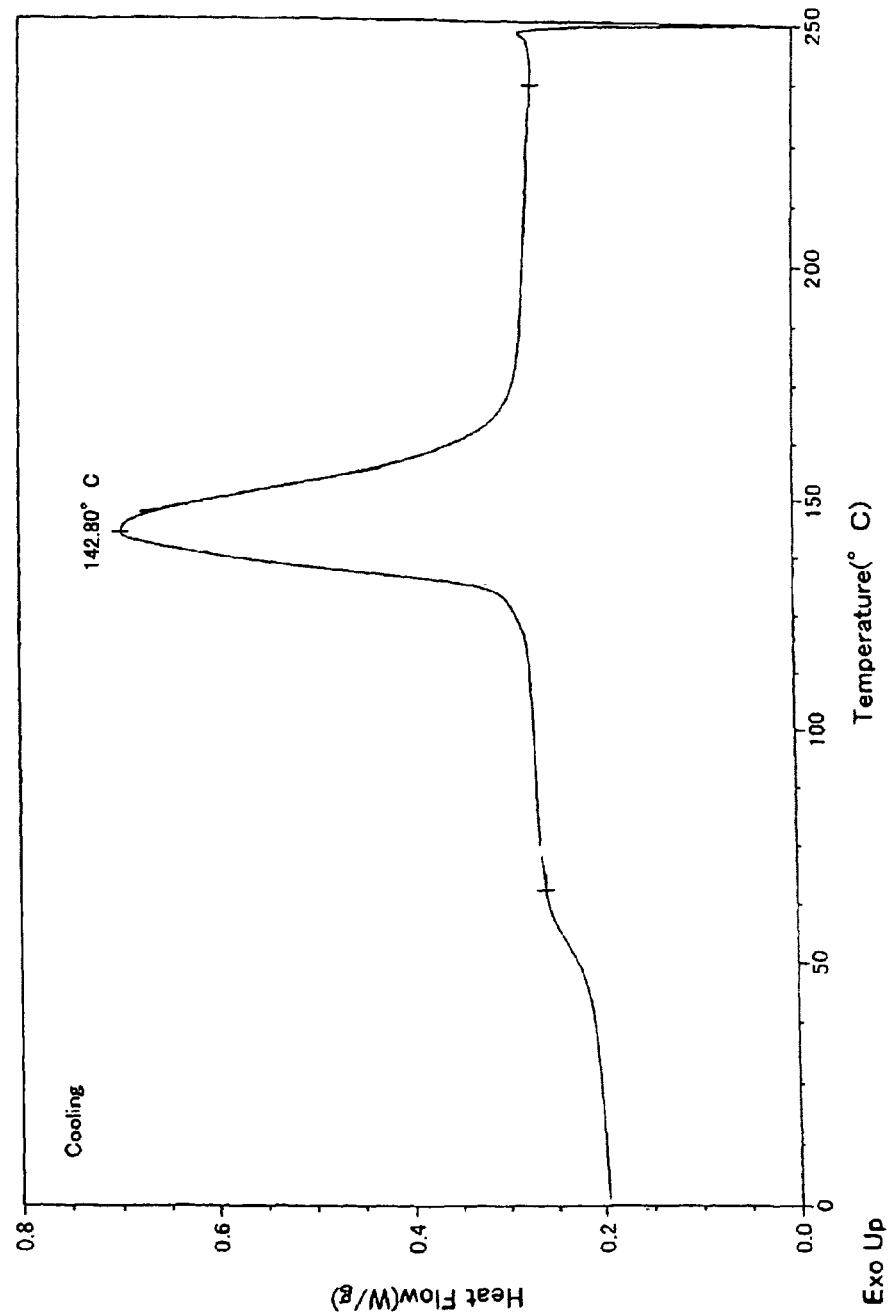
FIG. 19 is a diagram showing the first cooling DSC measurement chart of the stretched film of Example 3.
Figure 20:
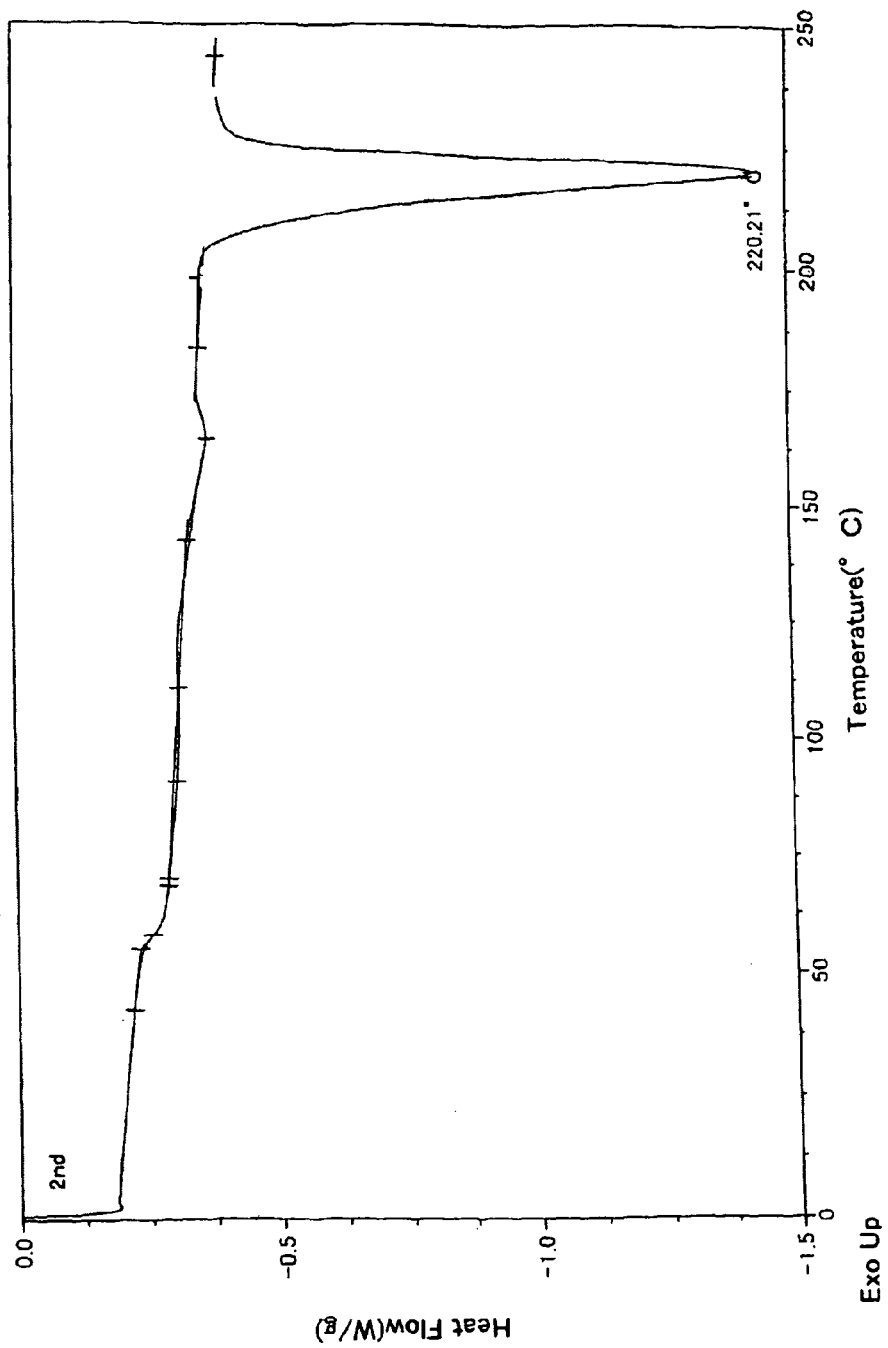
FIG. 20 is a diagram showing the second heating DSC measurement chart of the stretched film of Example 3.
Figure 23:
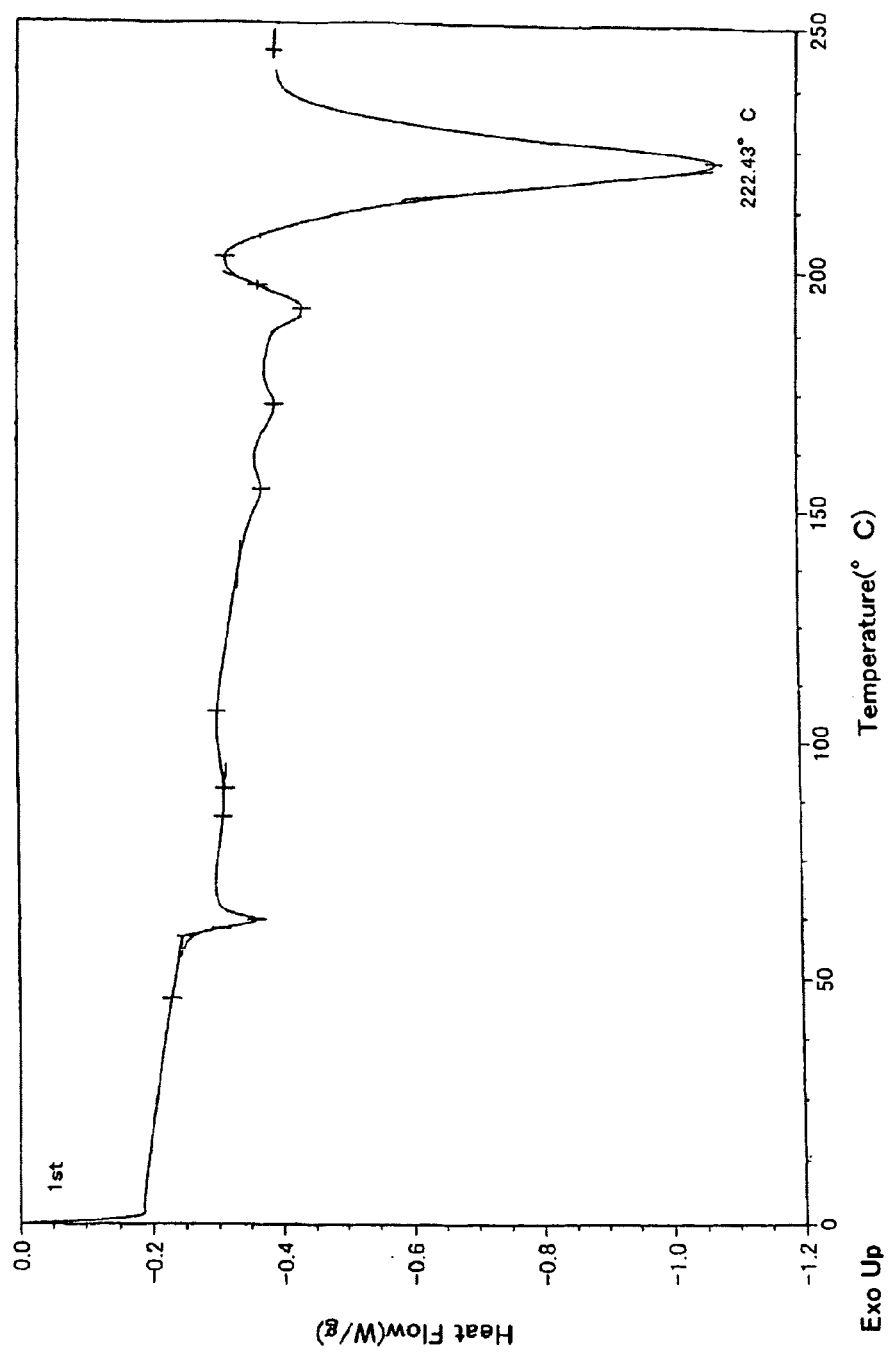
FIG. 23 is a diagram showing the first heating DSC measurement chart of the stretched film of Example 4.
Figure 24:
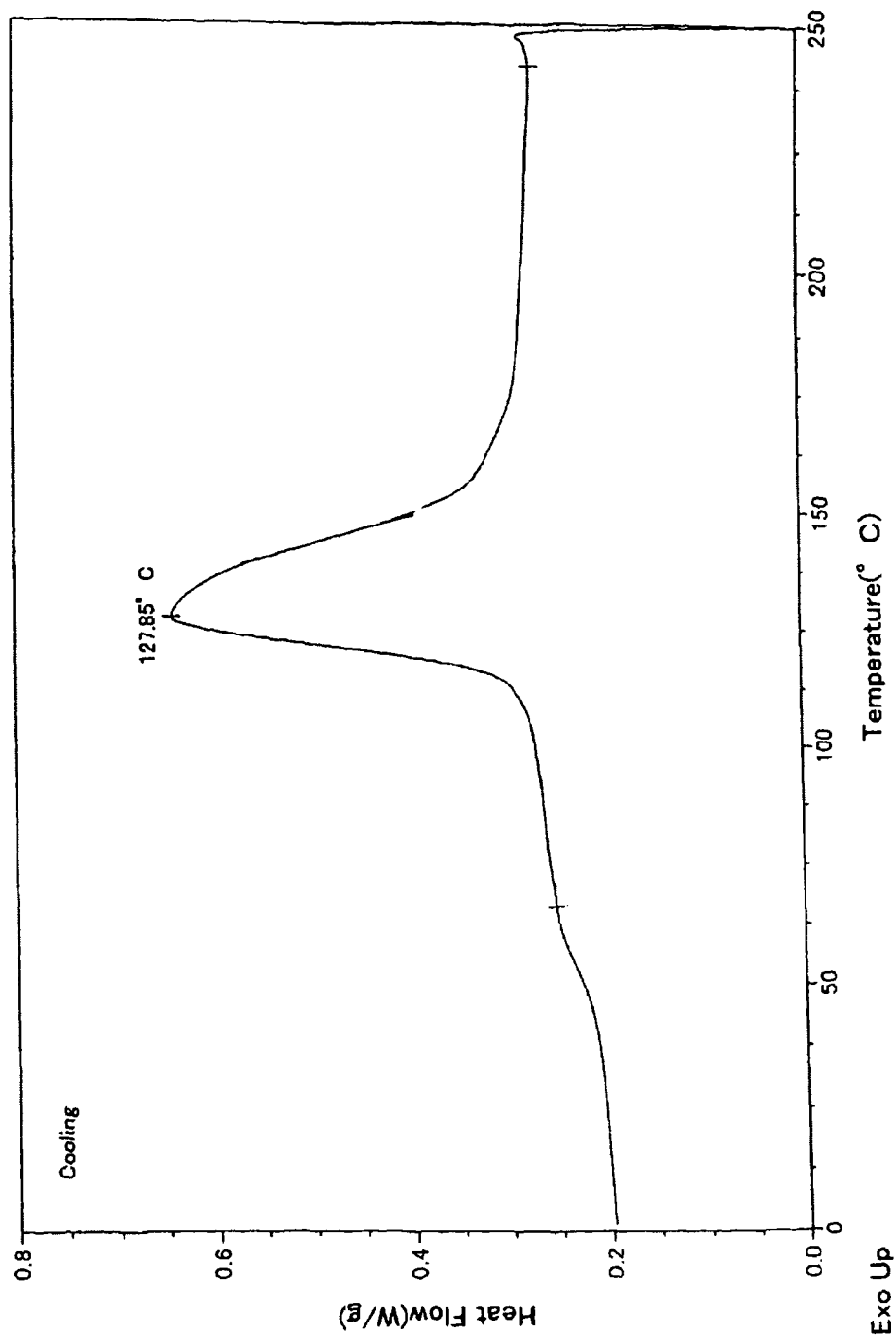
FIG. 24 is a diagram showing the first cooling DSC measurement chart of the stretched film of Example 4.
Figure 25:
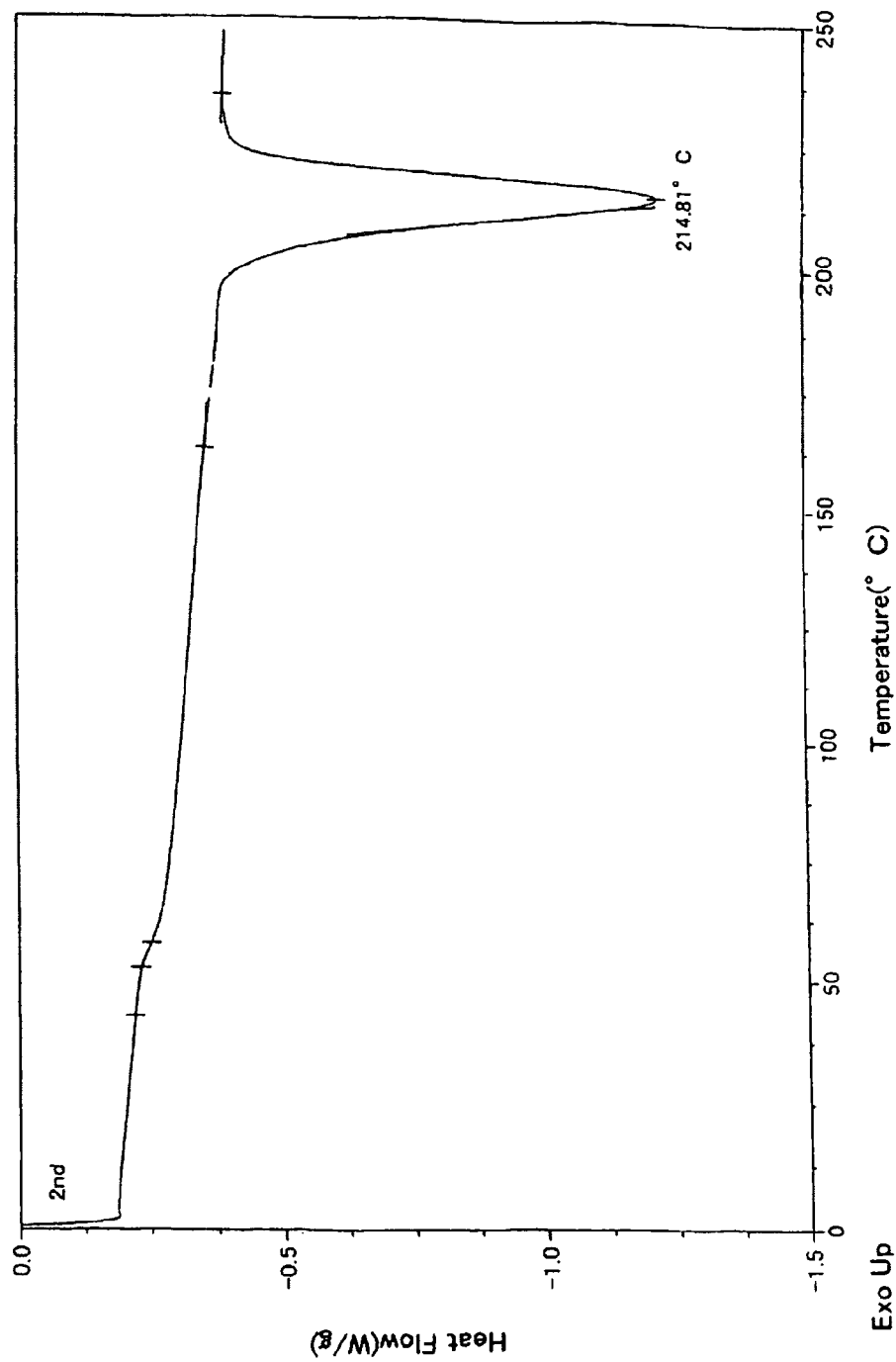
FIG. 25 is a diagram showing the second heating DSC measurement chart of the stretched film of Example 4.
Figure 28:
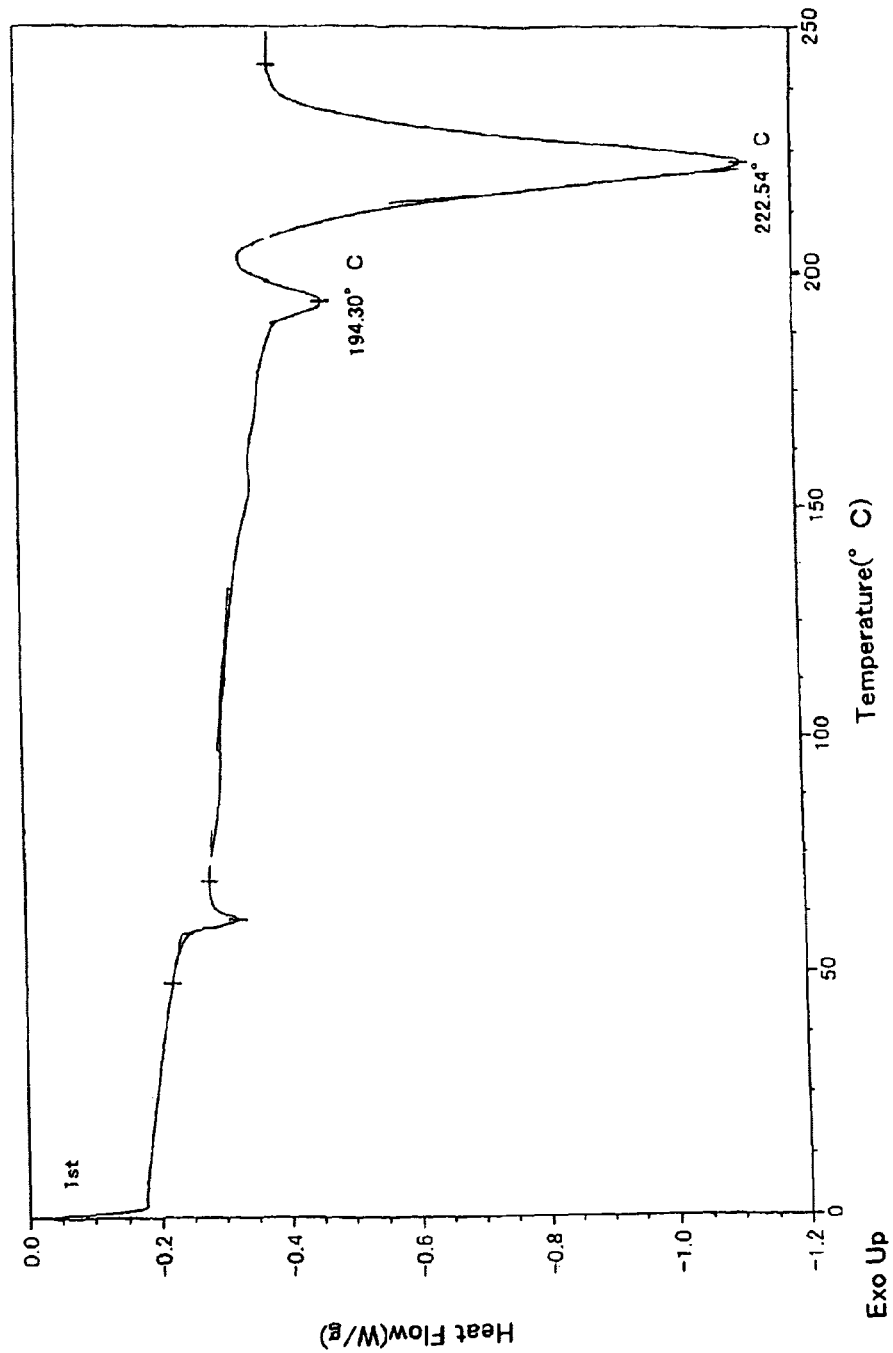
FIG. 28 is a diagram showing the first heating DSC measurement chart of the stretched film of Example 5.
Figure 29:
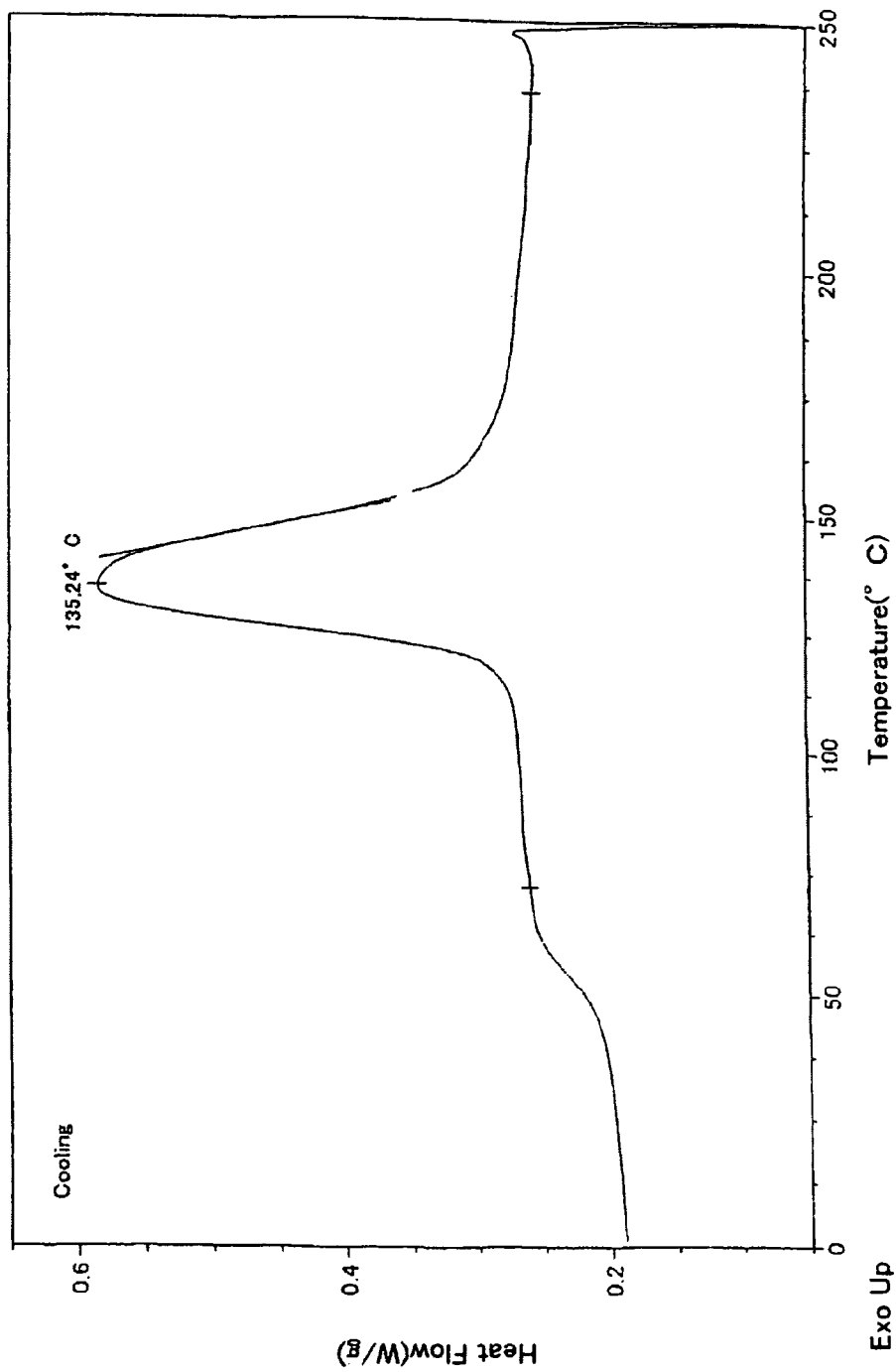
FIG. 29 is a diagram showing the first cooling DSC measurement chart of the stretched film of Example 5.
Figure 30:
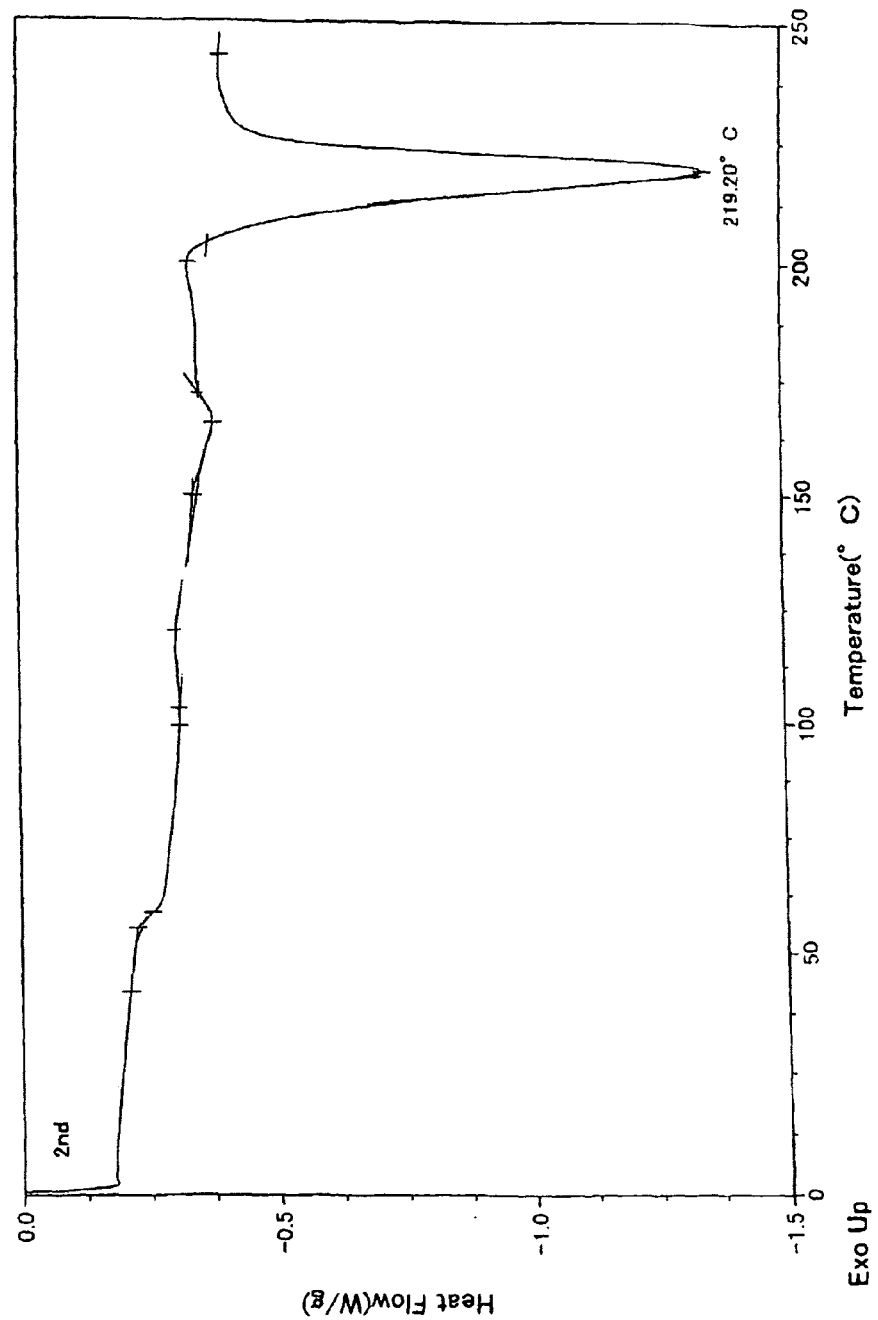
FIG. 30 is a diagram showing the second heating DSC measurement chart of the stretched film of Example 5.
Figure 33:
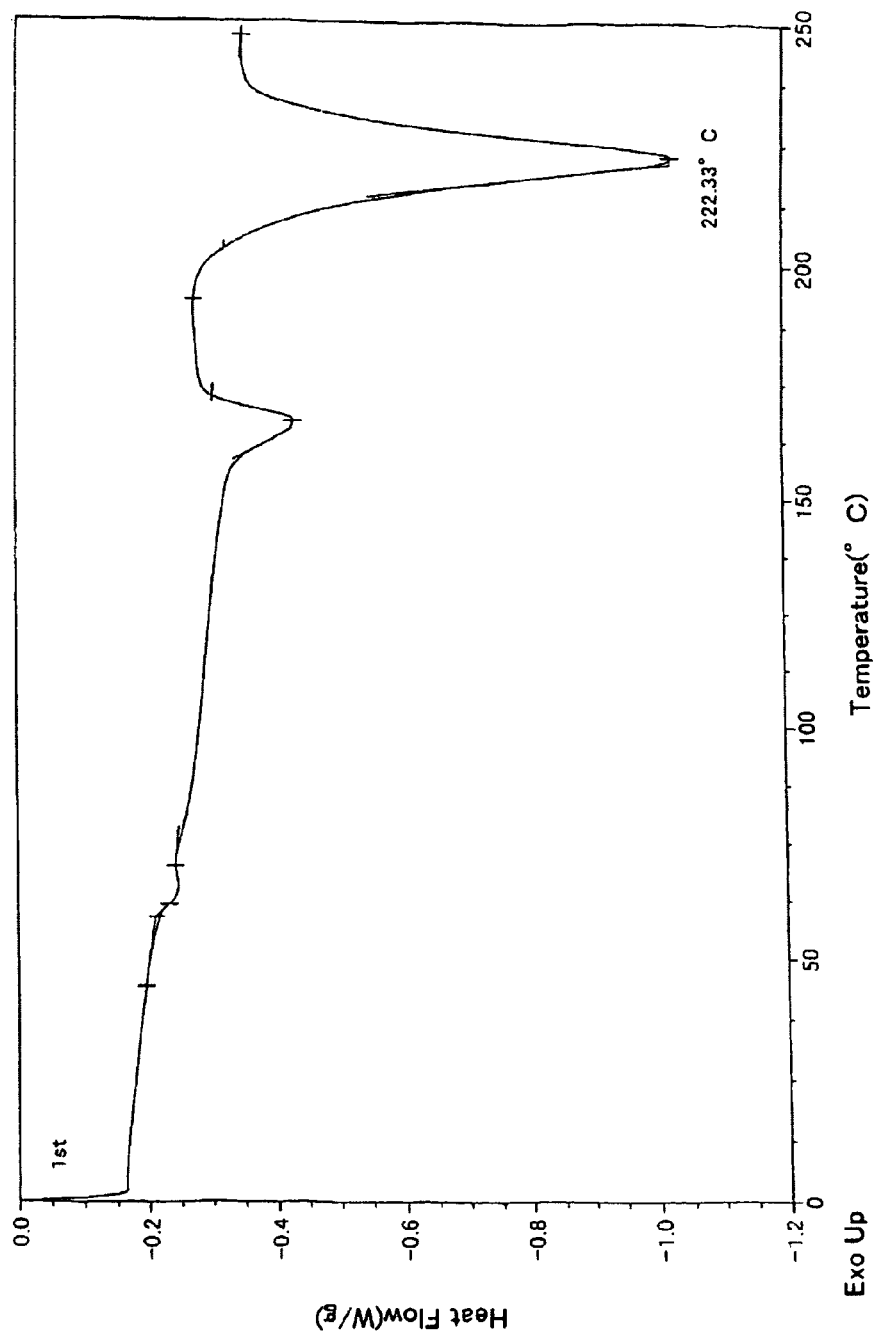
FIG. 33 is a diagram showing the first heating DSC measurement chart of the stretched film of Example 6.
Figure 34:
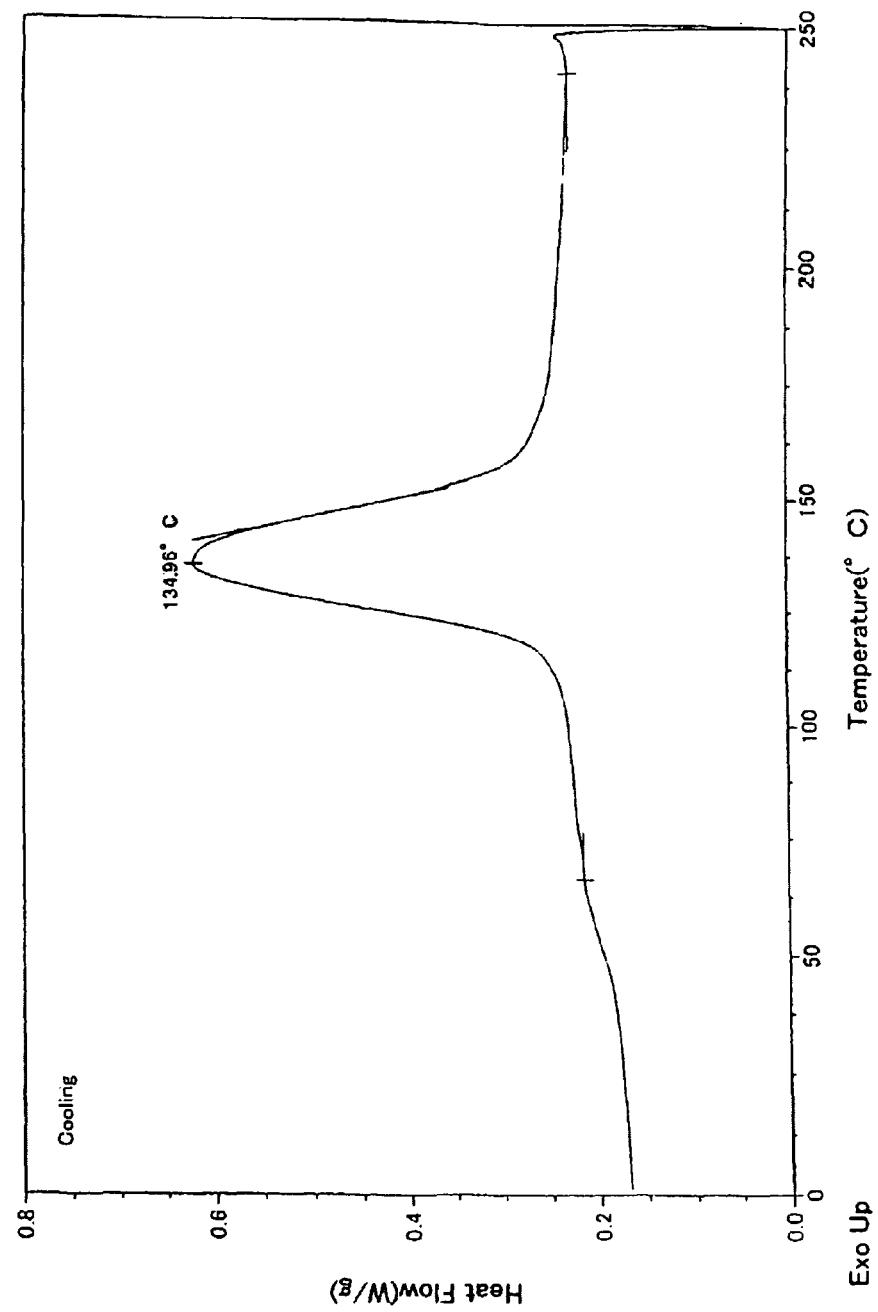
FIG. 34 is a diagram showing the first cooling DSC measurement chart of the stretched film of Example 6.
Figure 35:
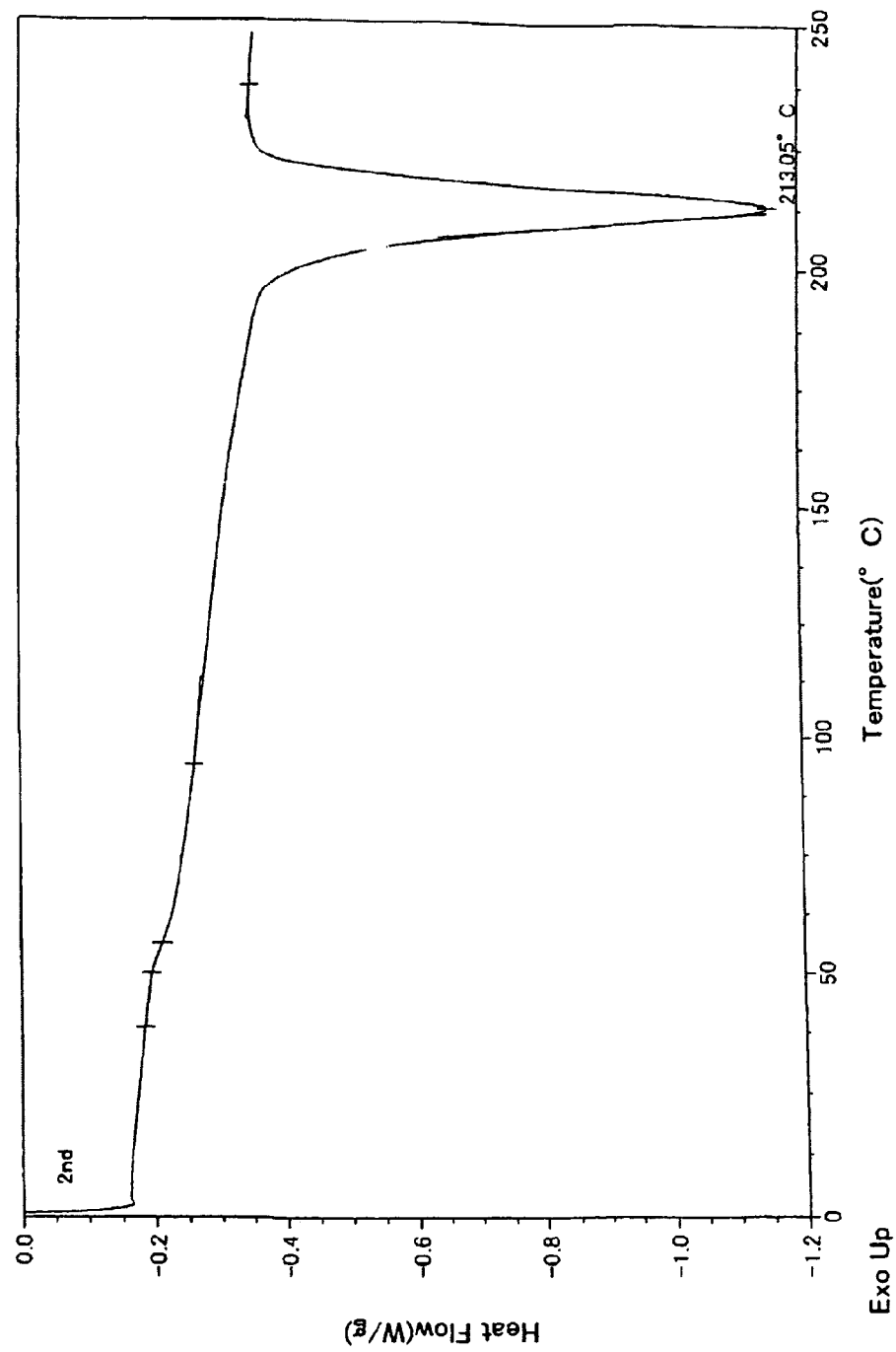
FIG. 35 is a diagram showing the second heating DSC measurement chart of the stretched film of Example 6.
Figure 58:
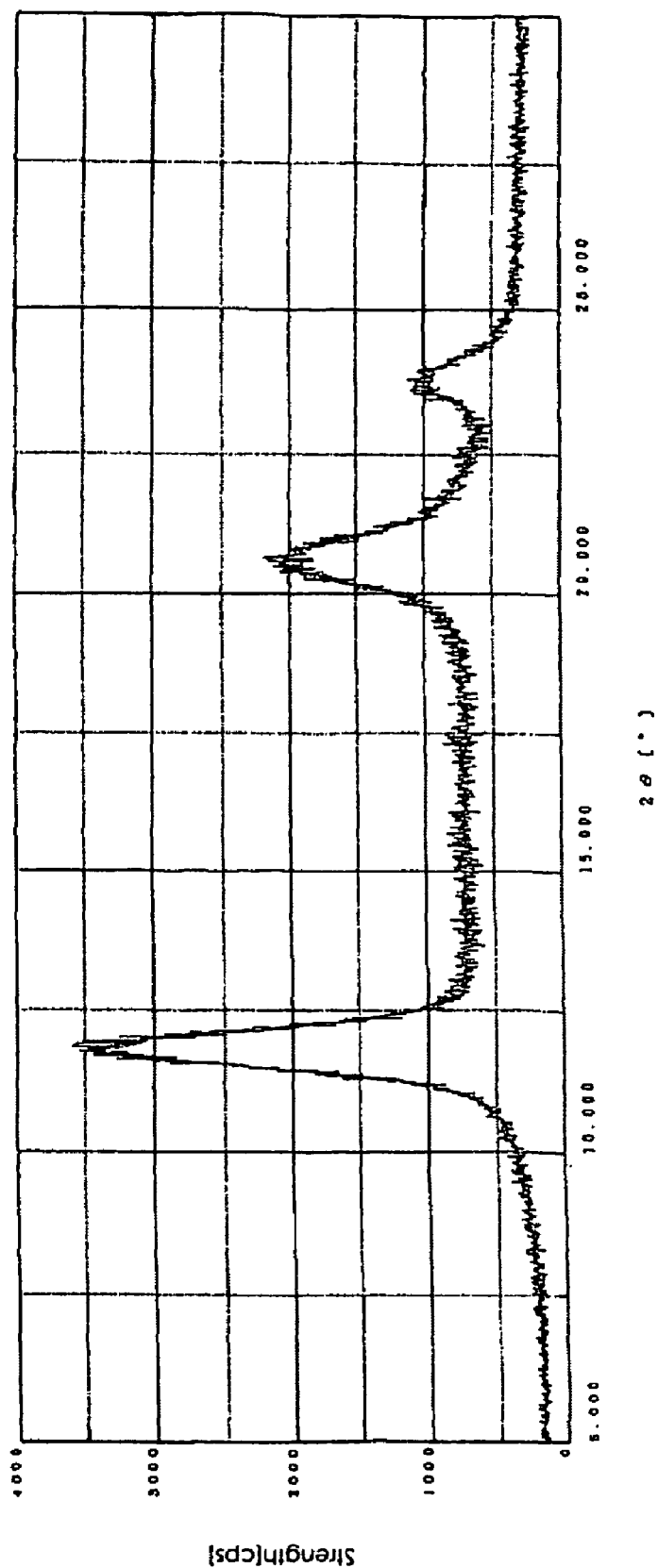
FIG. 58 is a diagram showing the wide-angle X-ray diffraction measurement results obtained for the stretched film of Example 2.
Figure 59:
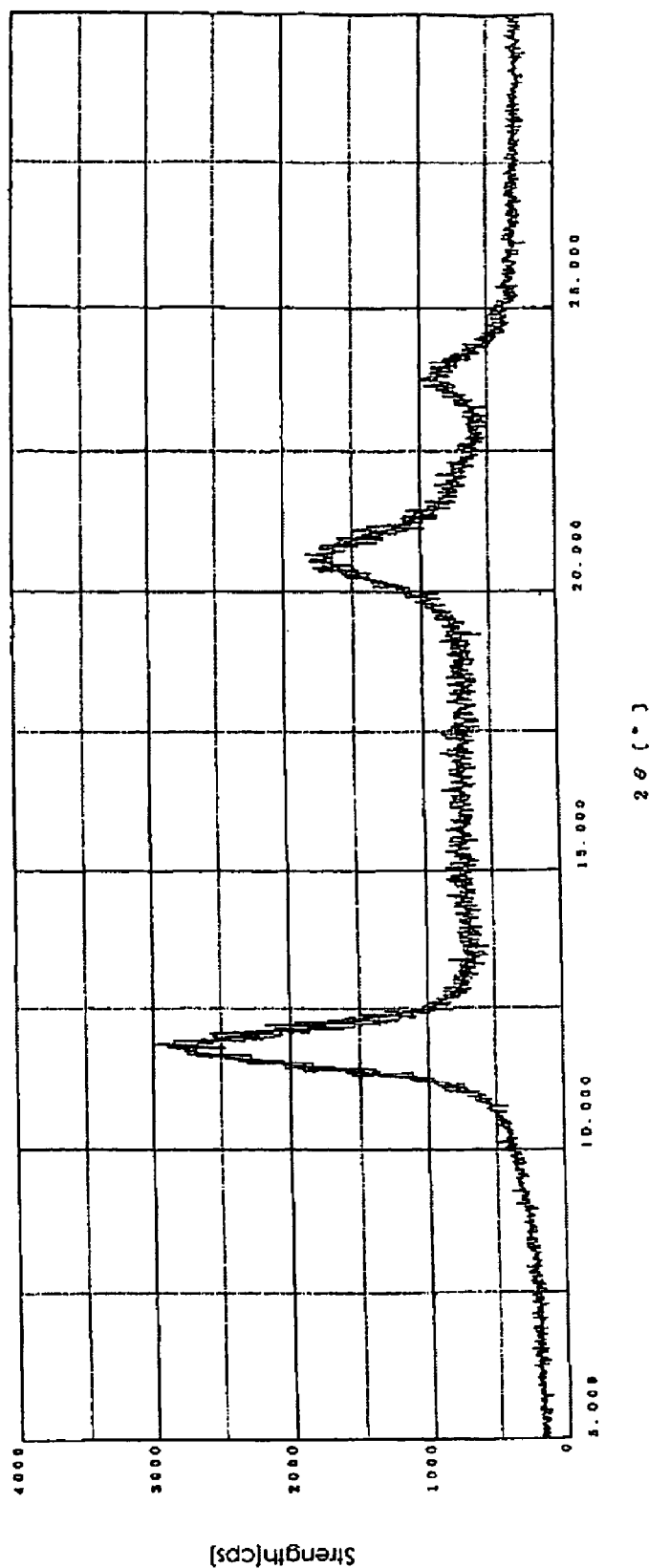
FIG. 59 is a diagram showing the wide-angle X-ray diffraction measurement results obtained for the stretched film of Example 3.
Figure 60:
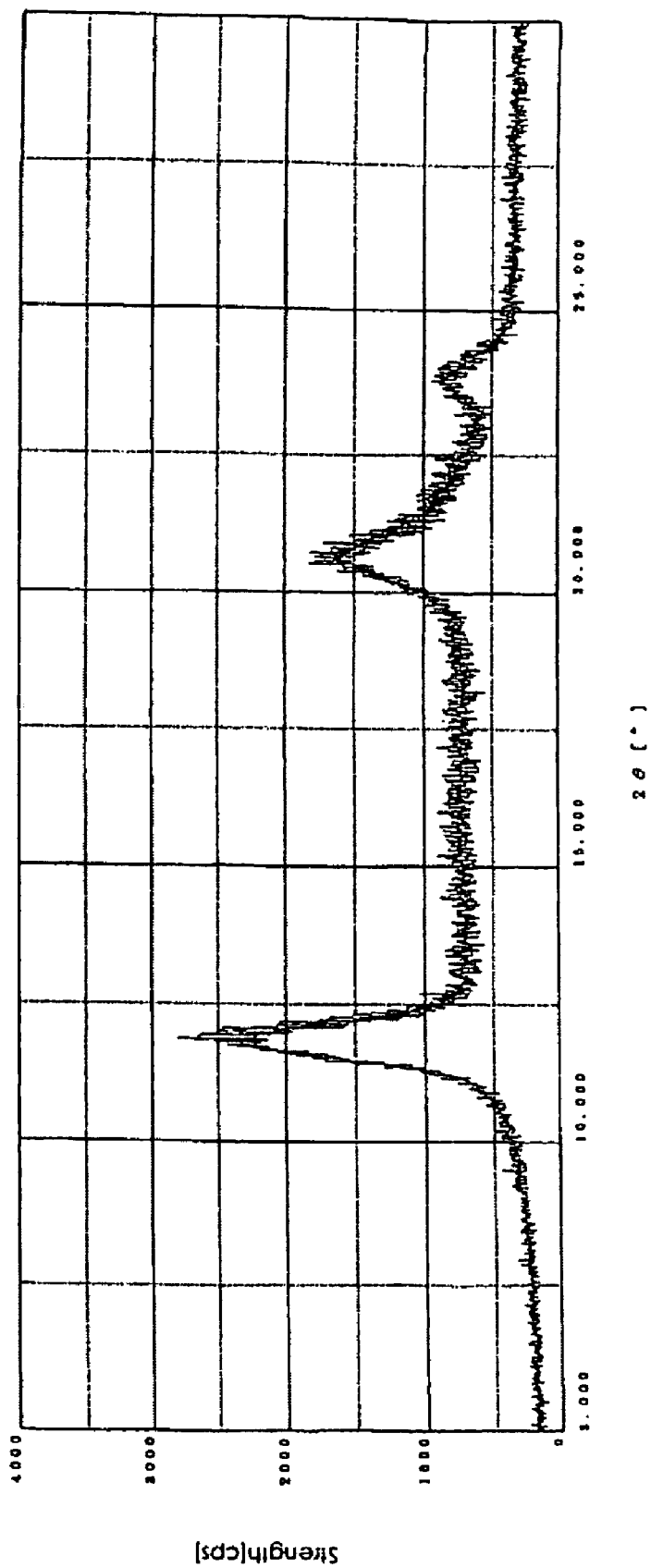
FIG. 60 is a diagram showing the wide-angle X-ray diffraction measurement results obtained for the stretched film of Example 4.
Figure 61:
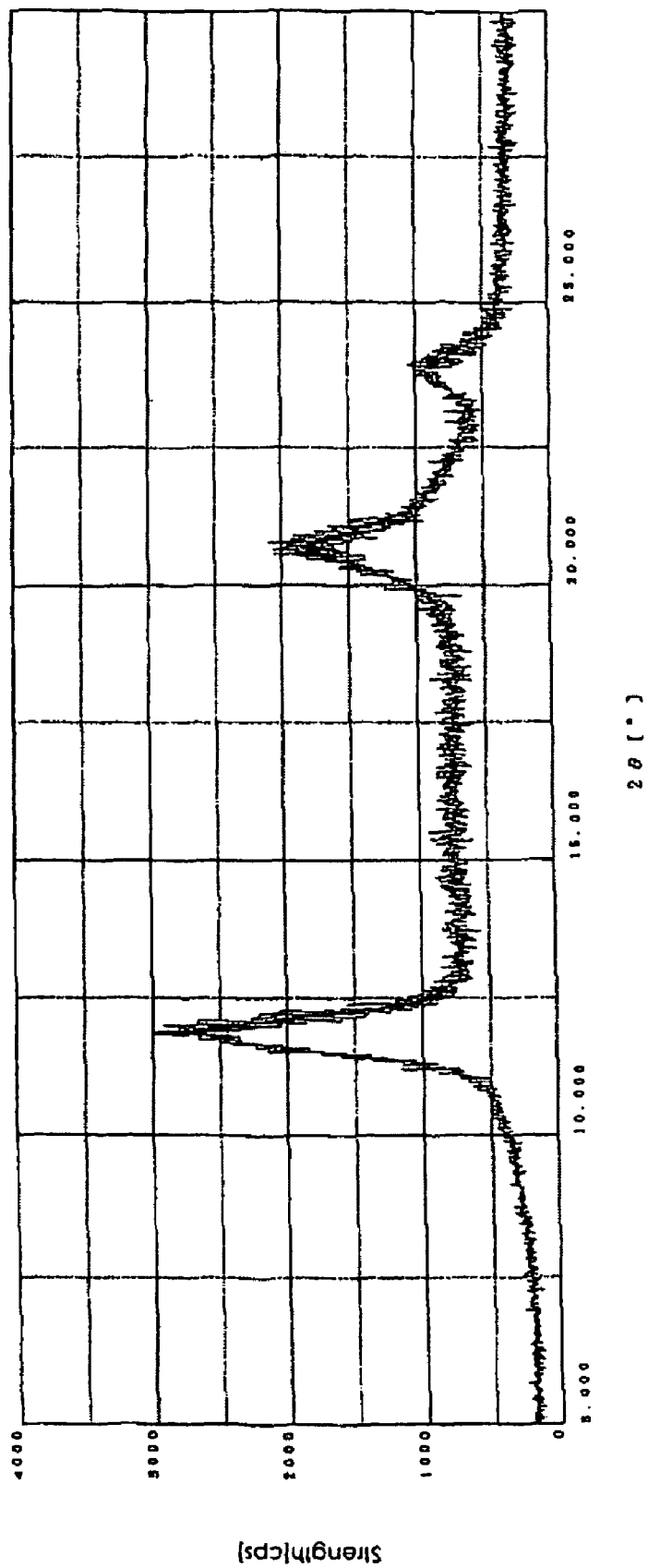
FIG. 61 is a diagram showing the wide-angle X-ray diffraction measurement results obtained for the stretched film of Example 5.
Figure 62:
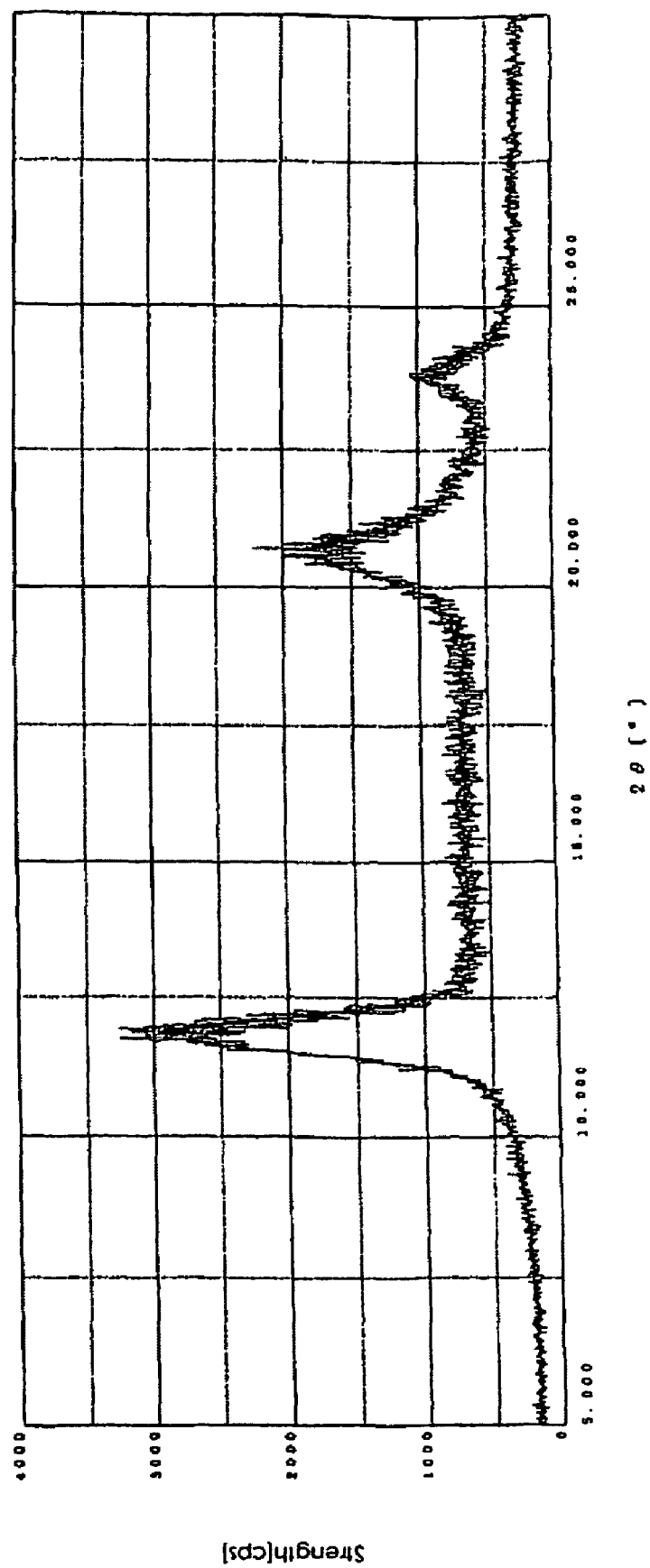
FIG. 62 is a diagram showing the wide-angle X-ray diffraction measurement results obtained for the stretched film of Example 6.

| Item | | Units | | | | | |
|---|---|---|---:|---:|---:|---:|---:|
| 205 to 250° C. | | | 0.737 | 0.508 | 0.915 | 0.686 | 0.746 |
| Peak ratio | | (—) | 0.03 | 0.05 | 0.07 | 0.30 | 0.18 |
| Molecular weight | Mn | (g/mol) | 53,000 | 60,000 | 58,000 | 55,000 | 52,000 |
| | Mw | (g/mol) | 108,000 | 129,000 | 124,000 | 112,000 | 113,000 |
| Dispersion degree | | (—) | 2.03 | 2.13 | 2.13 | 2.04 | 2.18 |
| Mp | | (g/mol) | 76,000 | 86,000 | 86,000 | 77,000 | 79,000 |
| 2. Evaluation of stretched film | | | | | | | |
| 1st heating | | | FIG. 13 | FIG. 18 | FIG. 23 | FIG. 28 | FIG. 33 |
| ΔHm 150 to 200° C. | | (J/g) | 4.1 | 8.1 | 8.3 | 12.0 | 18.3 |
| ΔHm 205 to 240° C. | | (J/g) | 45.0 | 62.4 | 54.3 | 57.9 | 55.8 |
| Peak height in 1st heating | | (W/g) | | | | | |
| 150 to 200° C. | | | 0.085 | 0.047 | 0.061 | 0.102 | 0.122 |
| 205 to 240° C. | | | 0.508 | 0.807 | 0.692 | 0.732 | 0.692 |
| Peak ratio | | (—) | 0.17 | 0.06 | 0.09 | 0.14 | 0.18 |
| 1st cooling | | | FIG. 14 | FIG. 19 | FIG. 24 | FIG. 29 | FIG. 34 |
| ΔHc | | (J/g) | 46.1 | 62.6 | 71.2 | 56.7 | 71.4 |
| 2nd heating | | | FIG. 15 | FIG. 20 | FIG. 25 | FIG. 30 | FIG. 35 |
| ΔHm 150 to 200° C. | | (J/g) | 0.0 | 2.3 | 0.0 | 2.9 | 0.0 |
| ΔHm 205 to 240° C. | | (J/g) | 45.6 | 59.9 | 62.5 | 59.4 | 66.4 |
| Peak height in 2nd heating | | (W/g) | | | | | |
| 150 to 180° C. | | | 0.000 | 0.025 | 0.000 | 0.025 | 0.000 |
| 200 to 250° C. | | | 0.671 | 1.068 | 0.839 | 0.966 | 0.814 |
| Peak ratio | | (—) | 0.000 | 0.023 | 0.000 | 0.026 | 0.000 |
| Wide-angle X-ray diffraction | | | FIG. 58 | FIG. 59 | FIG. 60 | FIG. 61 | FIG. 62 |
| (1) Measurement result | Ssc | (mg) | 61 | 51 | 43 | 51 | 50 |
| | PPL | (mg) | 0 | 0 | 0 | 0 | 0 |
| Amorphous portion | | (mg) | 131 | 134 | 137 | 137 | 129 |
| (2) Ratio | Ssc | (%) | 32 | 28 | 24 | 27 | 28 |
| | PPL | (%) | 0 | 0 | 0 | 0 | 0 |
| Amorphous portion | | (%) | 68 | 72 | 73 | 73 | 72 |
| 3. Film properties Transparency | | | | | | | |
| HZ | | (%) | 3.0 | 4.2 | 9.9 | 2.6 | 3.9 |
| PT | | (%) | 89.3 | 88.7 | 83.2 | 90.4 | 89.1 |
| Plane orientation degree | | (1/1000) | 8.0 | 6.0 | 7.0 | 7.5 | 11.5 |
| Surface roughness (SRa) | | (μ) | 0.08 | 0.04 | 0.10 | 0.08 | 0.05 |
| Tensile test | | | | | | | |
| Breaking strength | | (MPa) | 84 | 71 | 84 | 89 | 67 |
| Elongation at break | | (%) | 35 | 32 | 25 | 21 | 23 |
| Young's modulus | | (MPa) | 2632 | 2768 | 2644 | 2780 | 3180 |
| TMA elongation (%) | | 100° C. | 1.2 | 1.5 | 1.5 | 1.5 | 0.8 |
| | | 120° C. | 1.8 | 2.2 | 2.2 | 2.1 | 1.3 |
| | | 140° C. | 2.6 | 2.9 | 3.1 | 2.9 | 1.9 |
| | | 160° C. | 3.5 | 3.8 | 4.2 | 3.7 | 3.3 |
| | | 180° C. | 4.7 | 4.9 | 5.4 | 4.8 | 6.0 |
| | | 200° C. | 17.4 | 12.2 | 15.0 | 10.9 | 13.1 |
| | | 220° C. | Melted | Melted | Melted | Melted | Melted |

Figure 41:
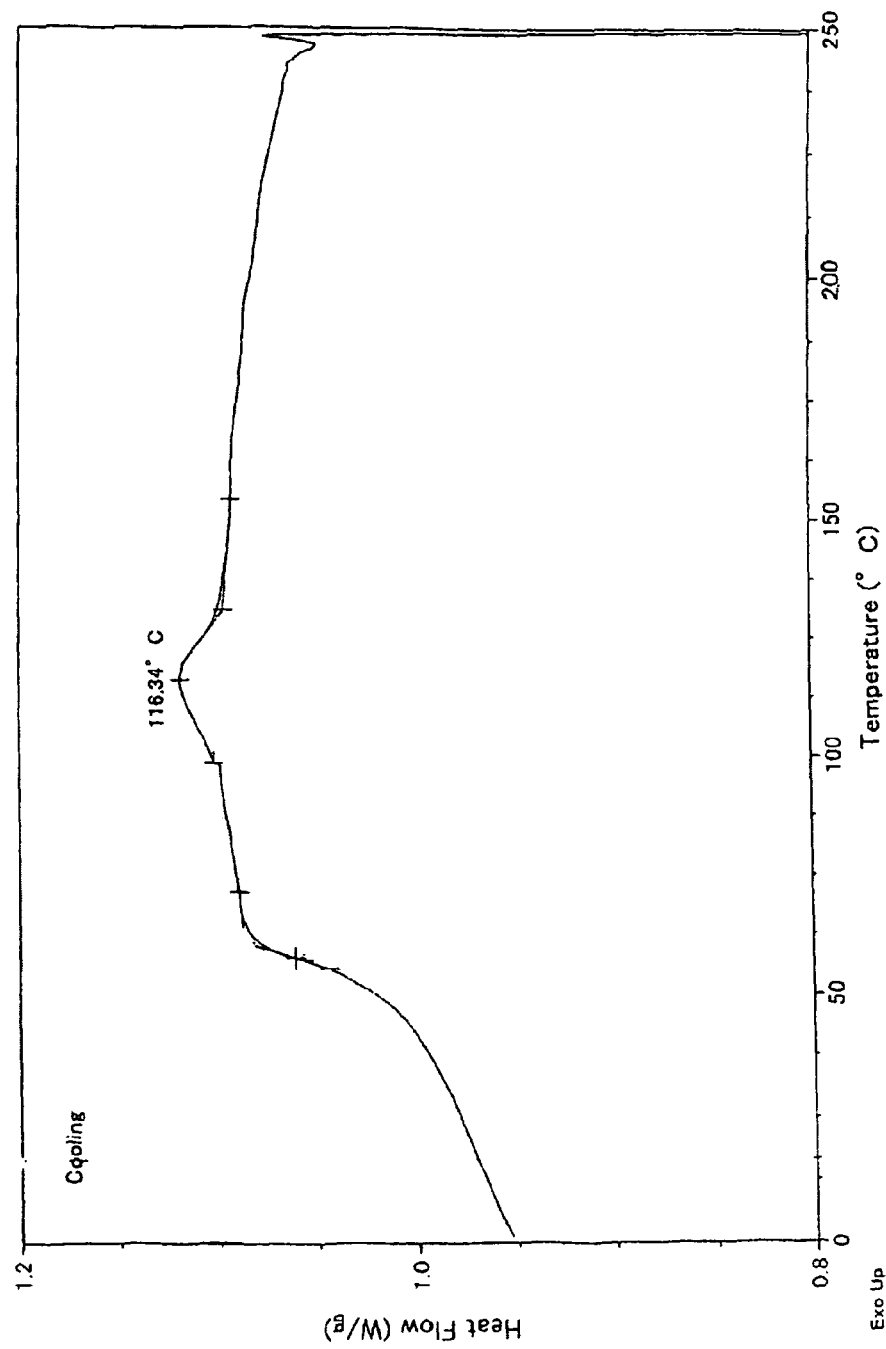
FIG. 41 is a diagram showing the first cooling DSC measurement chart of a sheet (unstretched) comprising the polylactic acid composition of Comparative Example 2.
Figure 42:
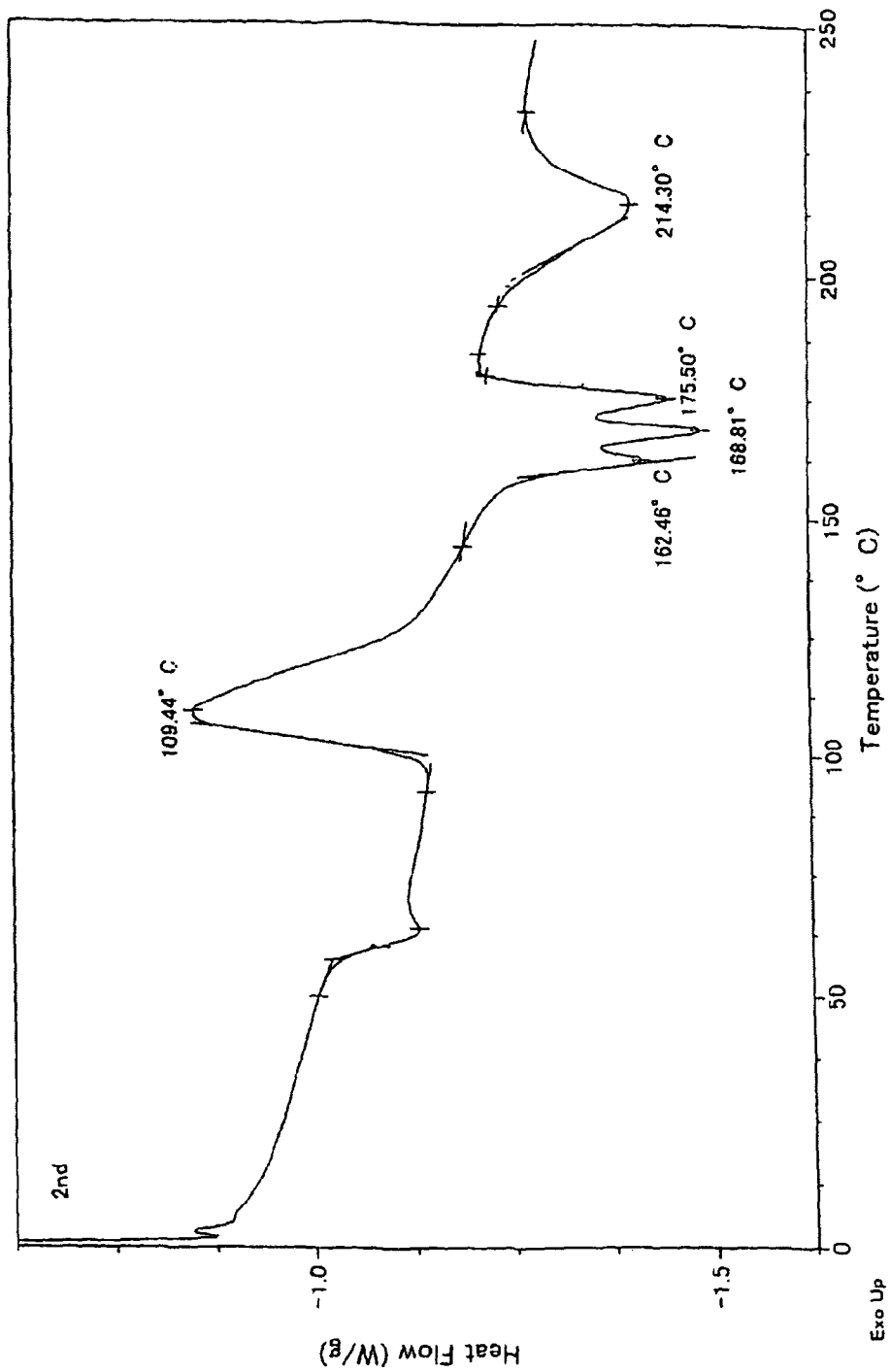
FIG. 42 is a diagram showing the second heating DSC measurement chart of a sheet (unstretched) comprising the polylactic acid composition of Comparative Example 2.
Figure 46:
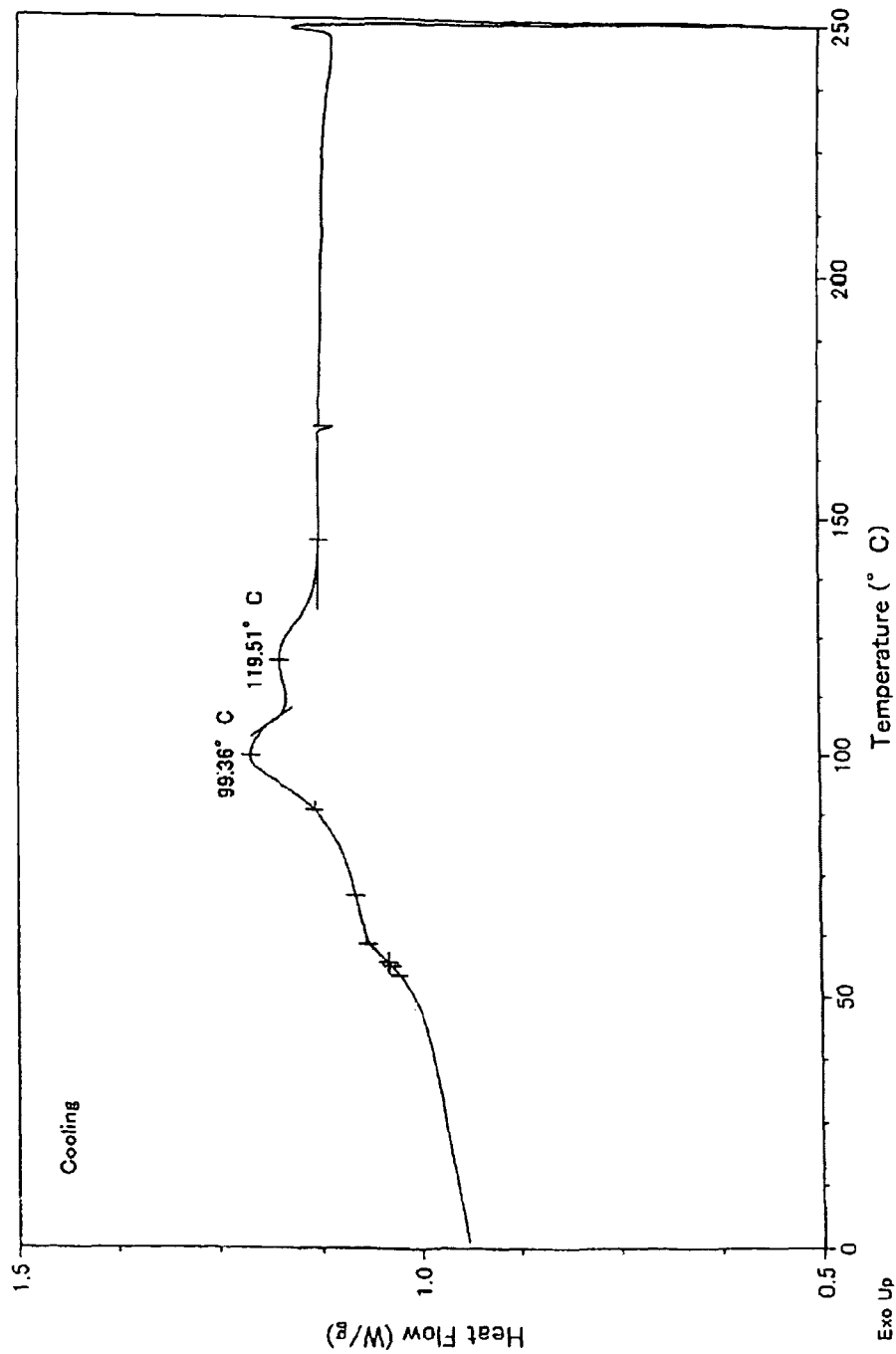
FIG. 46 is a diagram showing the first cooling DSC measurement chart of a sheet (unstretched) comprising the polylactic acid composition of Comparative Example 3.
Figure 47:
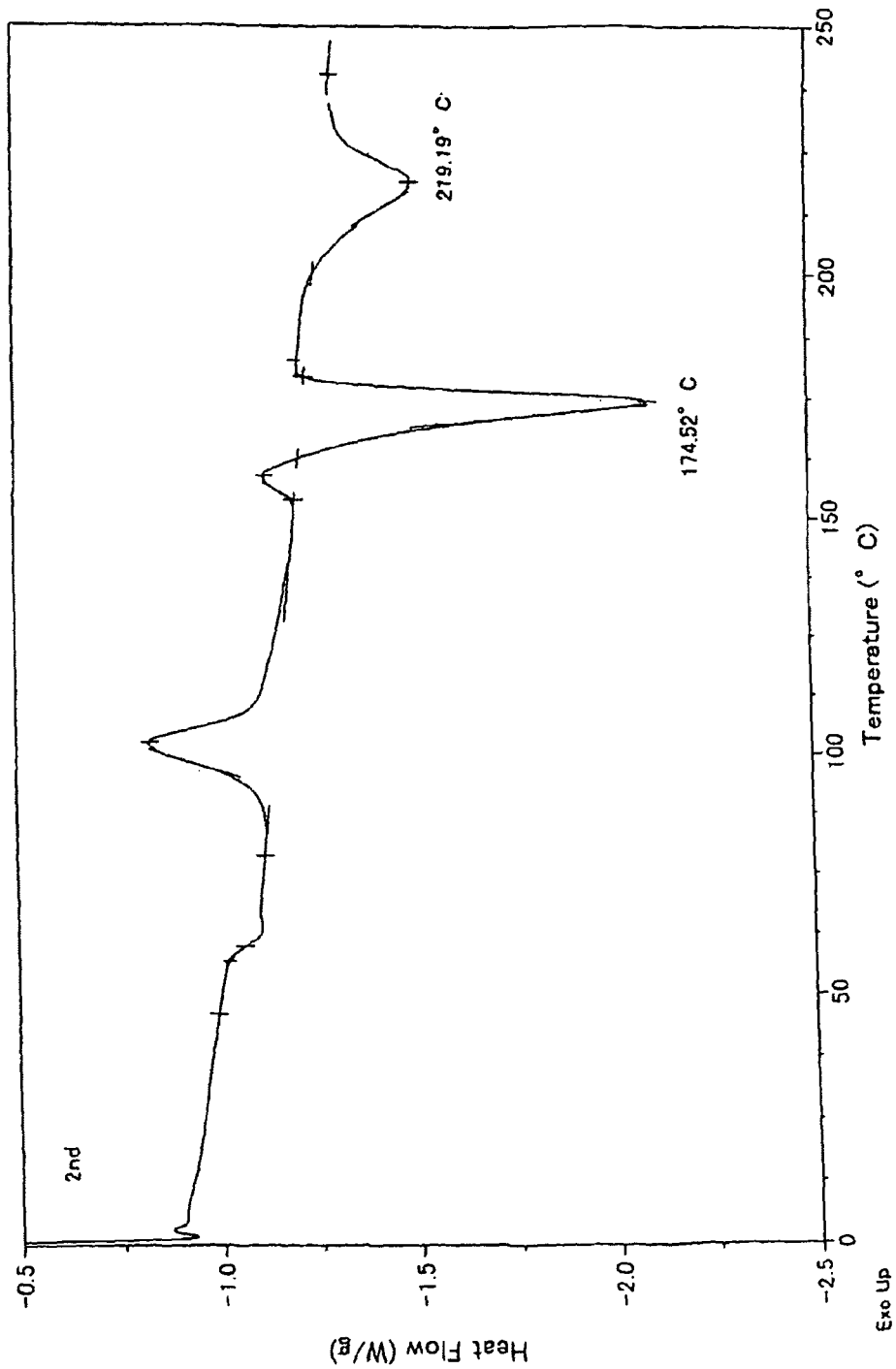
FIG. 47 is a diagram showing the second heating DSC measurement chart of a sheet (unstretched) comprising the polylactic acid composition of Comparative Example 3.
Figure 51:
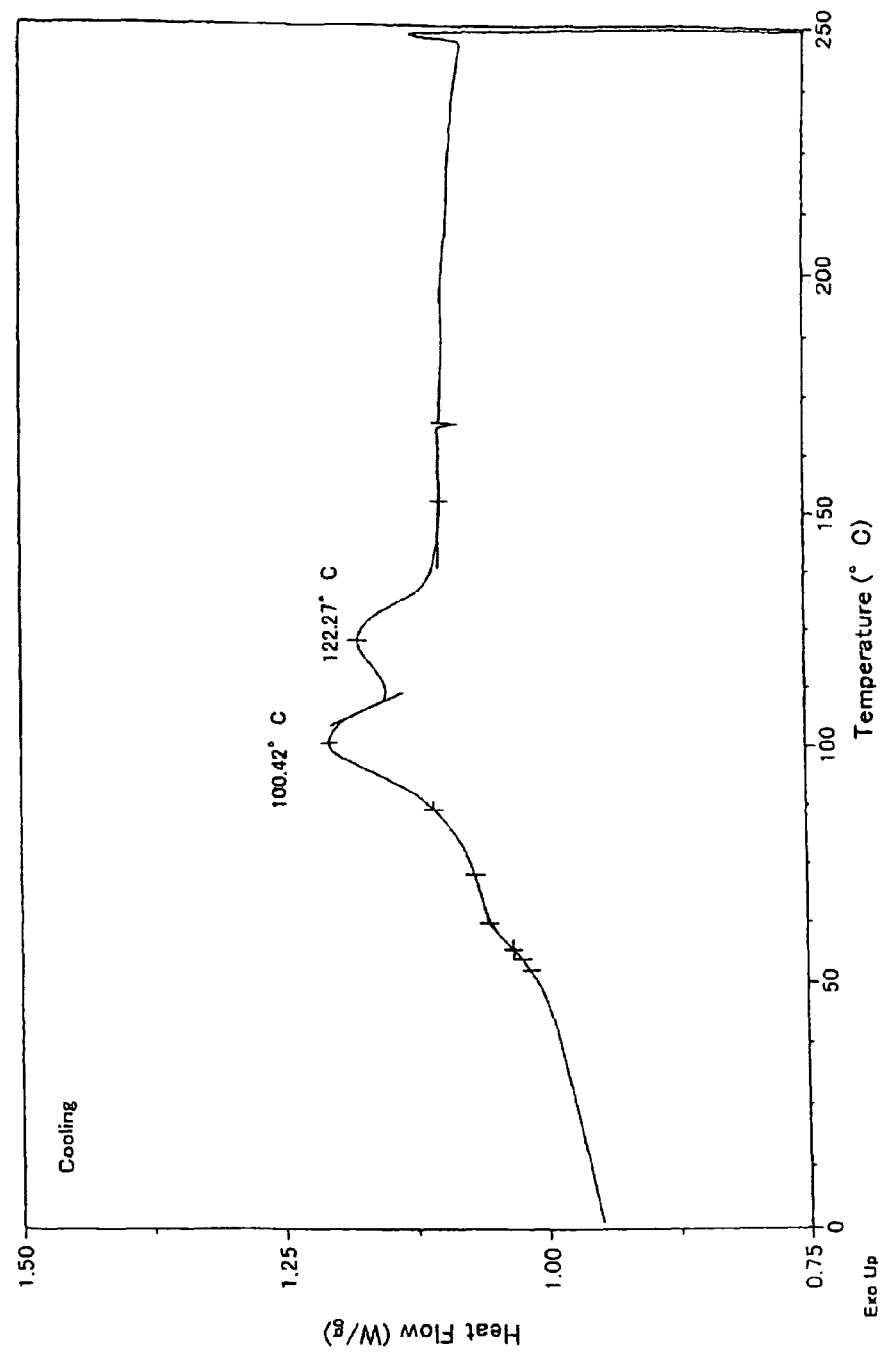
FIG. 51 is a diagram showing the first cooling DSC measurement chart of a sheet (unstretched) comprising the polylactic acid composition of Comparative Example 4.
Figure 52:
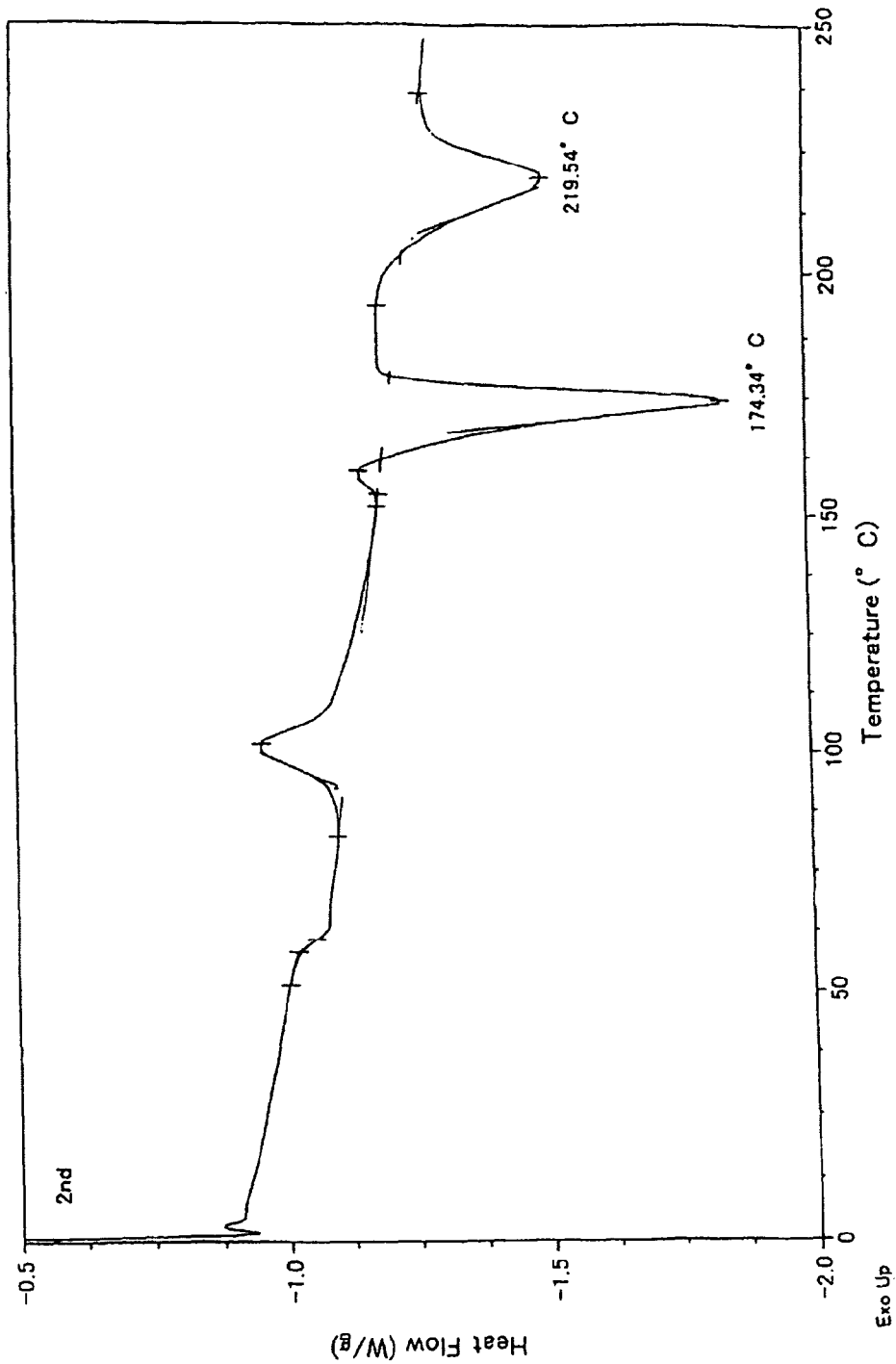
FIG. 52 is a diagram showing the second heating DSC measurement chart of a sheet (unstretched) comprising the polylactic acid composition of Comparative Example 4.
Figure 56:
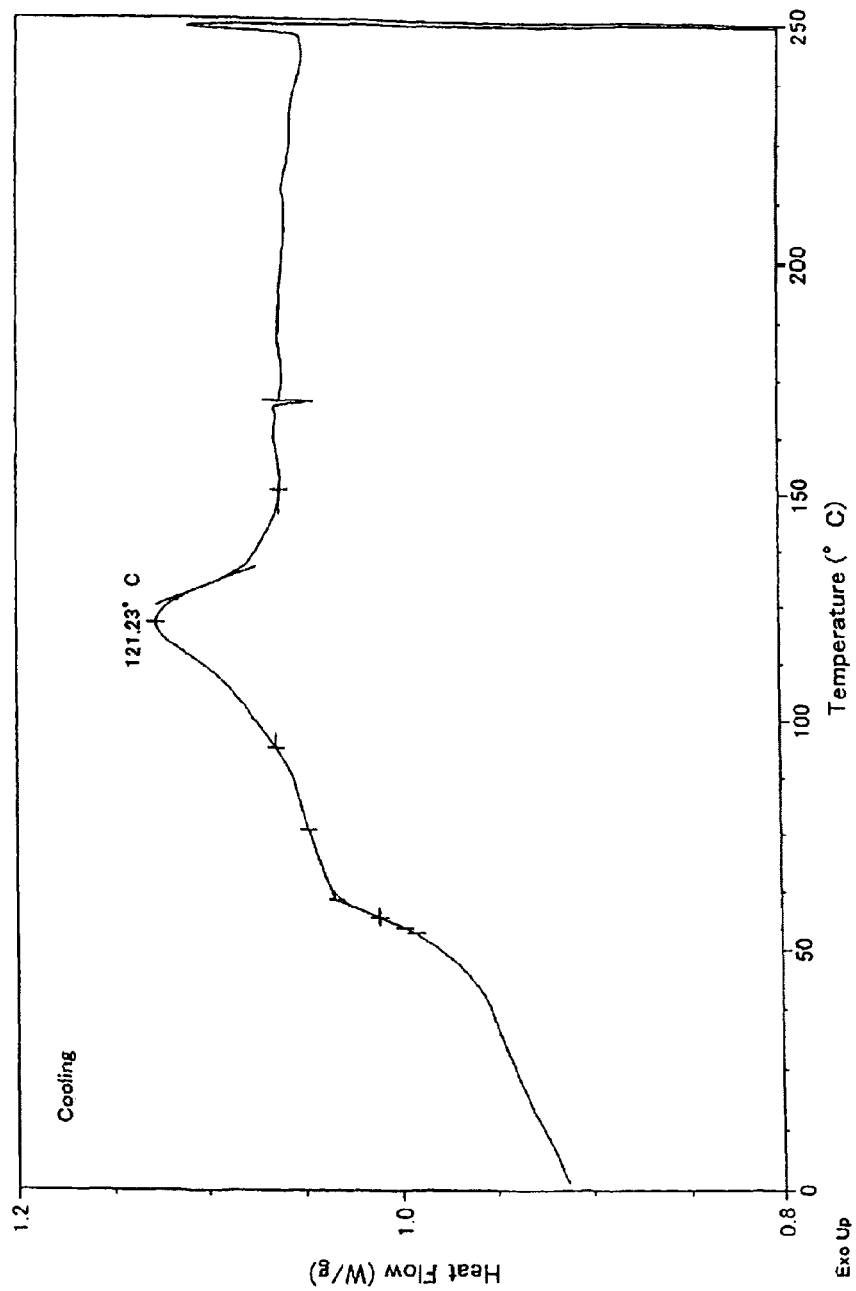
FIG. 56 is a diagram showing the first cooling DSC measurement chart of a sheet (unstretched) comprising the polylactic acid composition of Comparative Example 5.
Figure 57:
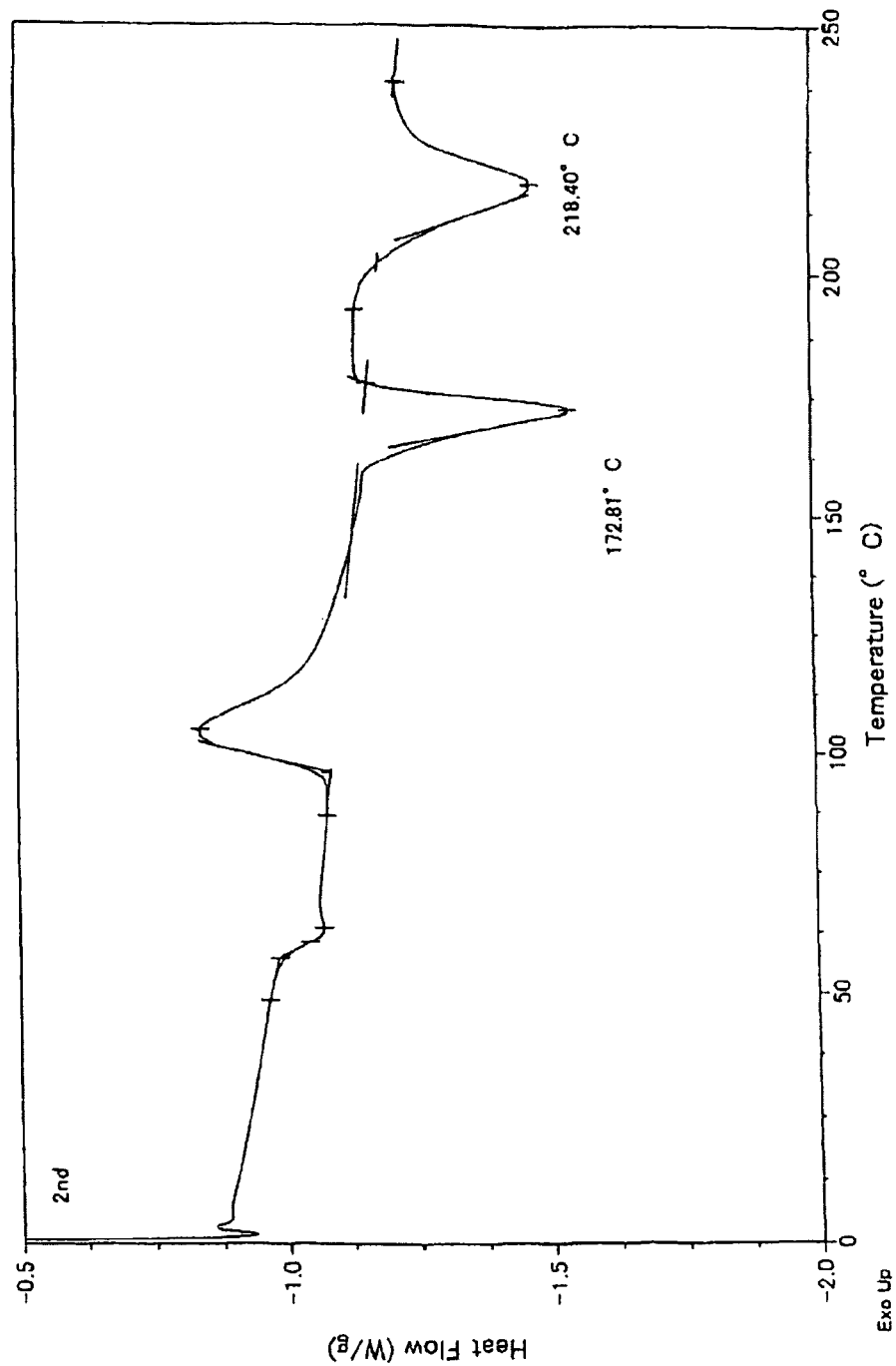
FIG. 57 is a diagram showing the second heating DSC measurement chart of a sheet (unstretched) comprising the polylactic acid composition of Comparative Example 5.

| Item | | Units | Comparative Example 2 | Comparative Example 3 | Comparative Example 4 | Comparative Example 5 |
|---|---|---|---:|---:|---:|---:|
| Starting material | | | | | | |
| PLLA-1 | | (%) | 50 | | | |
| PLLA-2 | | (%) | | | 50 | 50 |
| PLLA-3 | | (%) | | 50 | | |
| PDLA-1 | | (%) | | 50 | | 50 |
| PDLA-2 | | (%) | 50 | | 50 | |
| Kneading time | | (min) | 3 | 3 | 3 | 3 |
| 1. Evaluation of composition | | | | | | |
| 1st cooling | | | FIG. 41 | FIG. 46 | FIG. 51 | FIG. 56 |
| ΔHc | | (J/g) | 2.3 | 11.9 | 17.2 | 8.9 |
| 2nd heating | | | FIG. 42 | FIG. 47 | FIG. 52 | FIG. 57 |
| ΔHm 150 to 200° C. | | (J/g) | 23.9 | 38.3 | 29.4 | 20.1 |
| ΔHm 205 to 240° C. | | (J/g) | 14.9 | 20.2 | 19.5 | 23.0 |
| Peak height in 2nd heating | | (W/g) | | | | |
| 150 to 200° C. | | | 0.244 | 0.881 | 0.636 | 0.381 |
| 205 to 250° C. | | | 0.137 | 0.220 | 0.244 | 0.254 |
| Peak ratio | | (—) | 1.78 | 4.00 | 2.61 | 1.50 |
| Molecular weight | Mn | (g/mol) | Measurements are | Measurements are | Measurements are | Measurements are |
| | Mw | (g/mol) | | | | |

TABLE 2-continued

Figure 38:
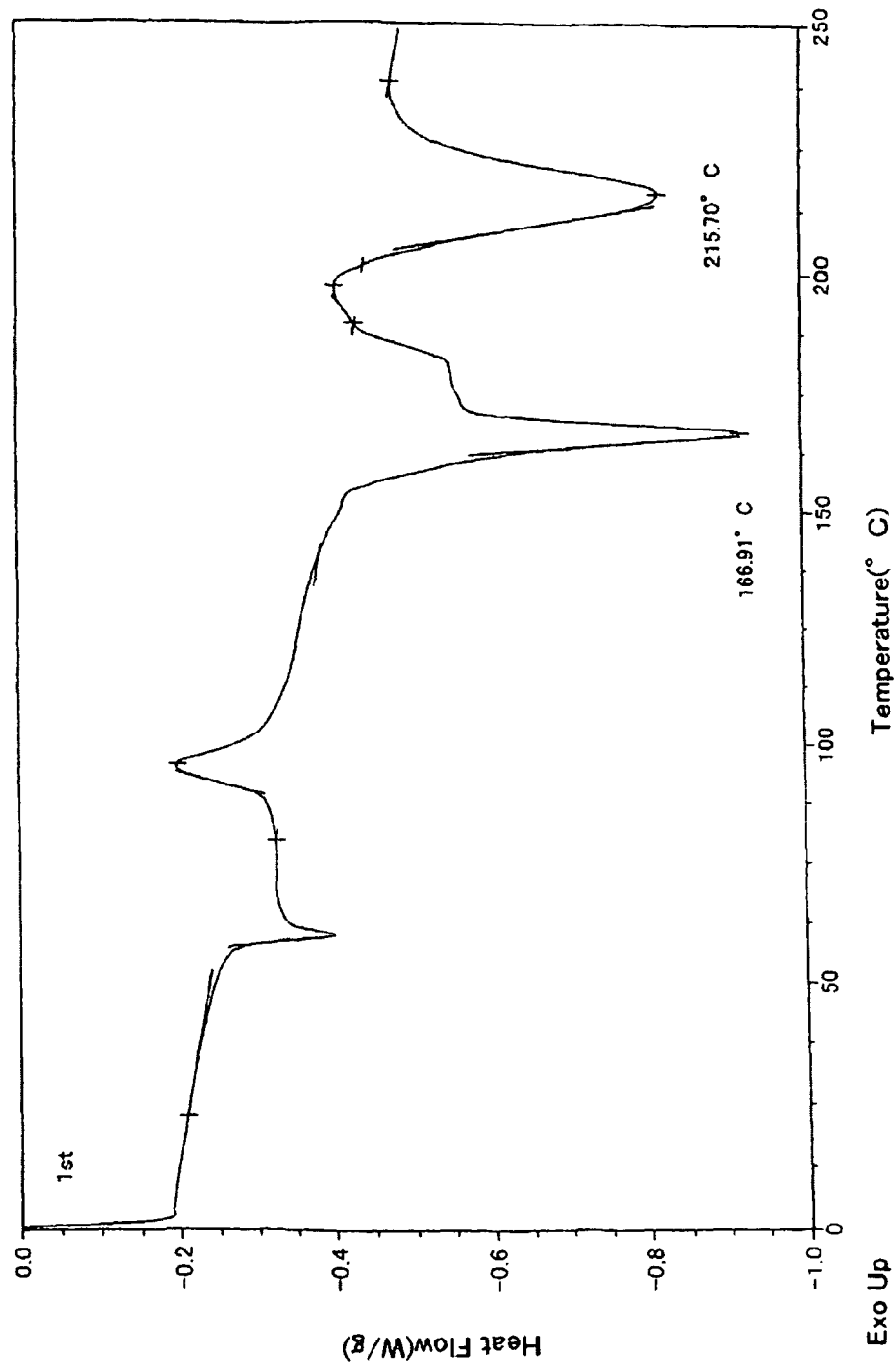
FIG. 38 is a diagram showing the first heating DSC measurement chart of the stretched film of Comparative Example 2.
Figure 39:
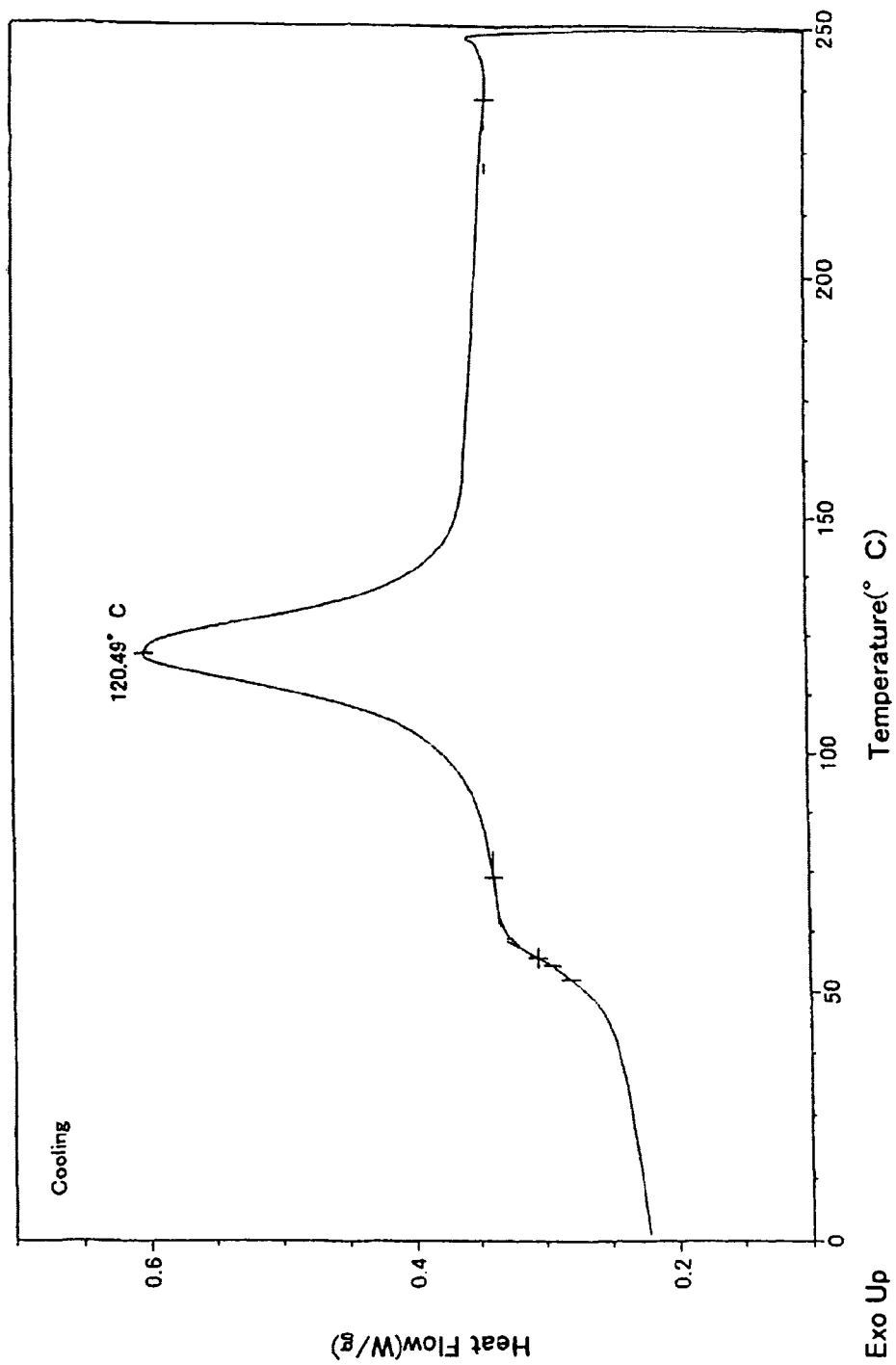
FIG. 39 is a diagram showing the first cooling DSC measurement chart of the stretched film of Comparative Example 2.
Figure 40:
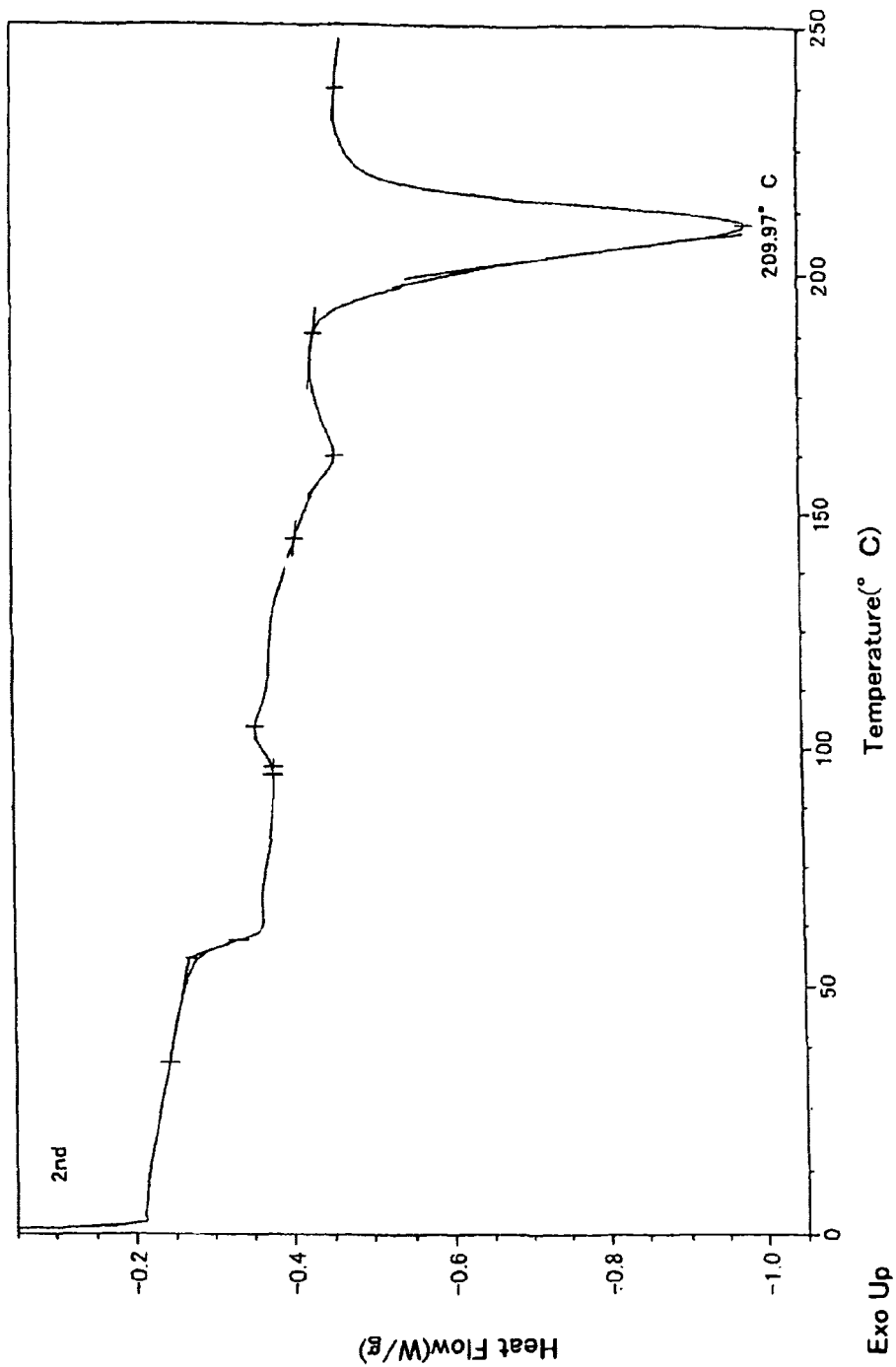
FIG. 40 is a diagram showing the second heating DSC measurement chart of the stretched film of Comparative Example 2.
Figure 43:
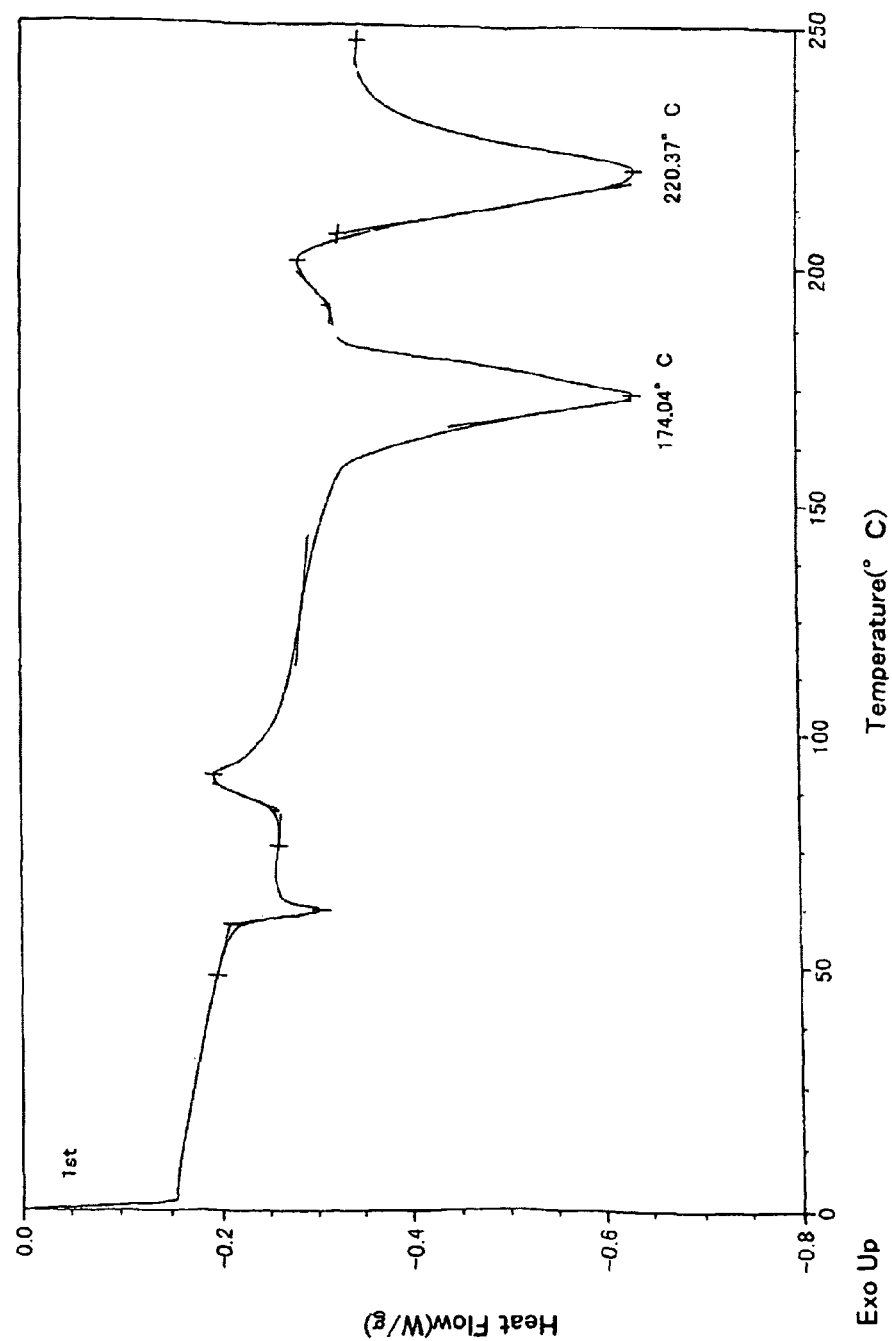
FIG. 43 is a diagram showing the first heating DSC measurement chart of the stretched film of Comparative Example 3.
Figure 44:
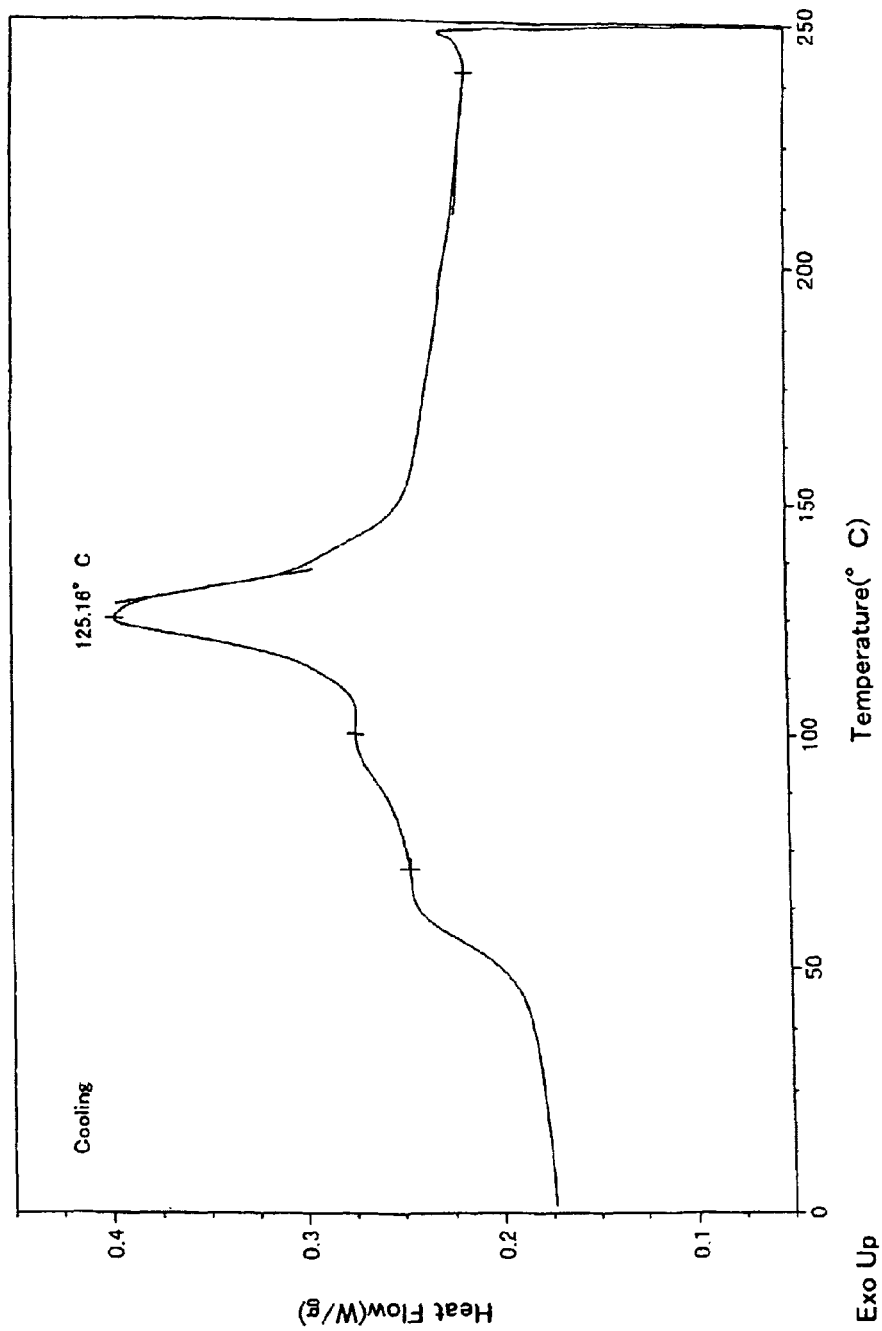
FIG. 44 is a diagram showing the first cooling DSC measurement chart of the stretched film of Comparative Example 3.
Figure 45:
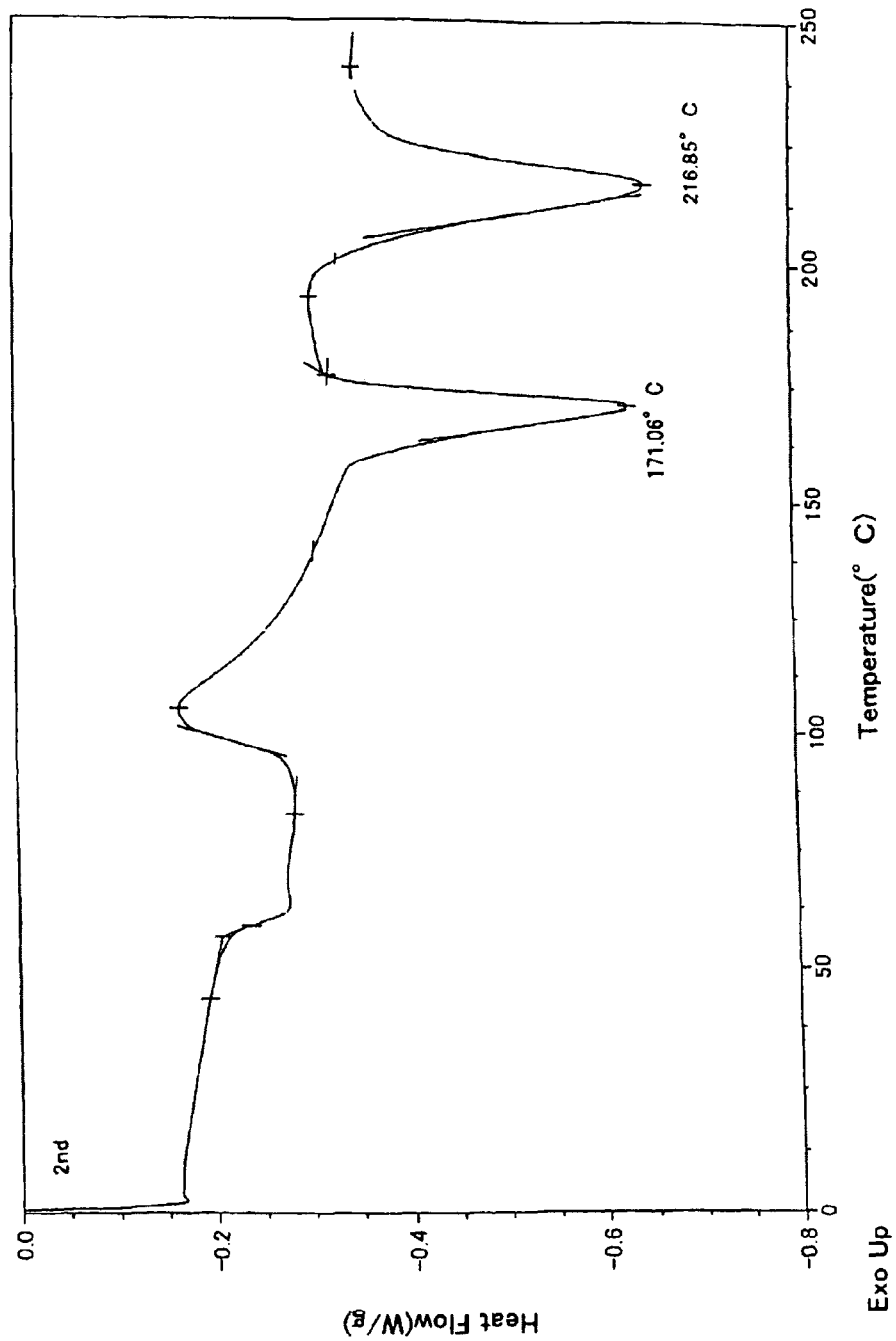
FIG. 45 is a diagram showing the second heating DSC measurement chart of the stretched film of Comparative Example 3.
Figure 48:
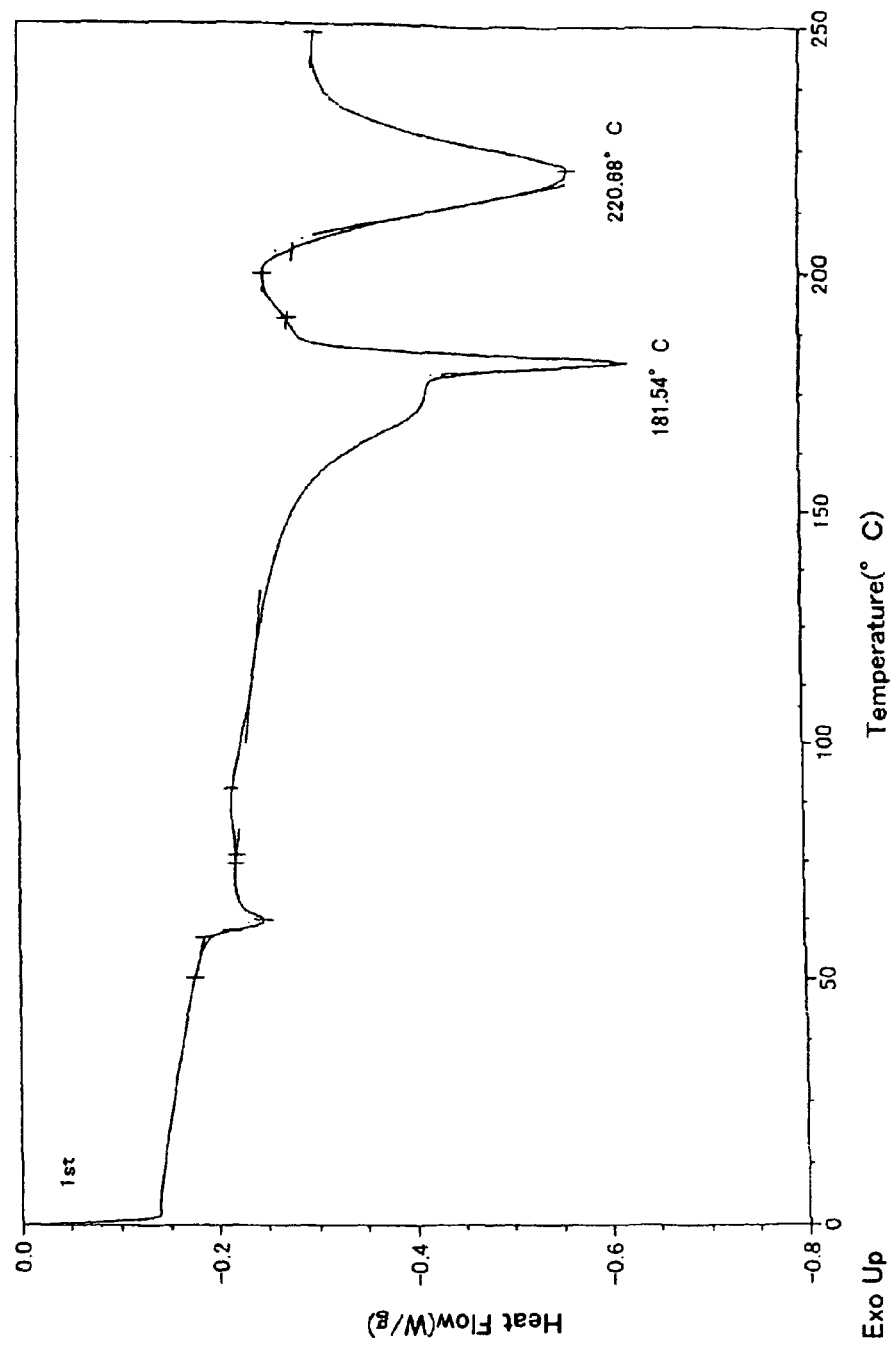
FIG. 48 is a diagram showing the first heating DSC measurement chart of the stretched film of Comparative Example 4.
Figure 49:
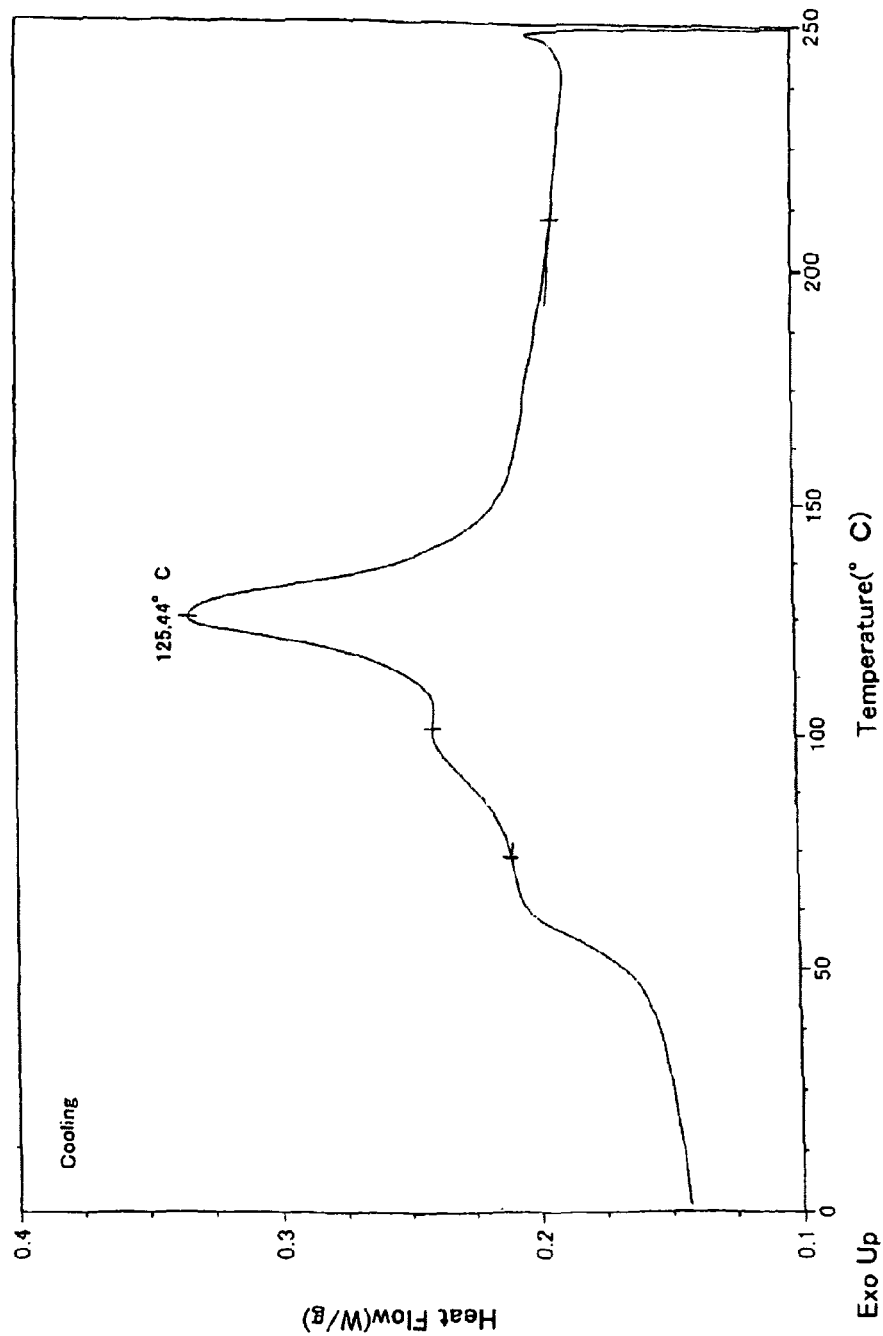
FIG. 49 is a diagram showing the first cooling DSC measurement chart of the stretched film of Comparative Example 4.
Figure 50:
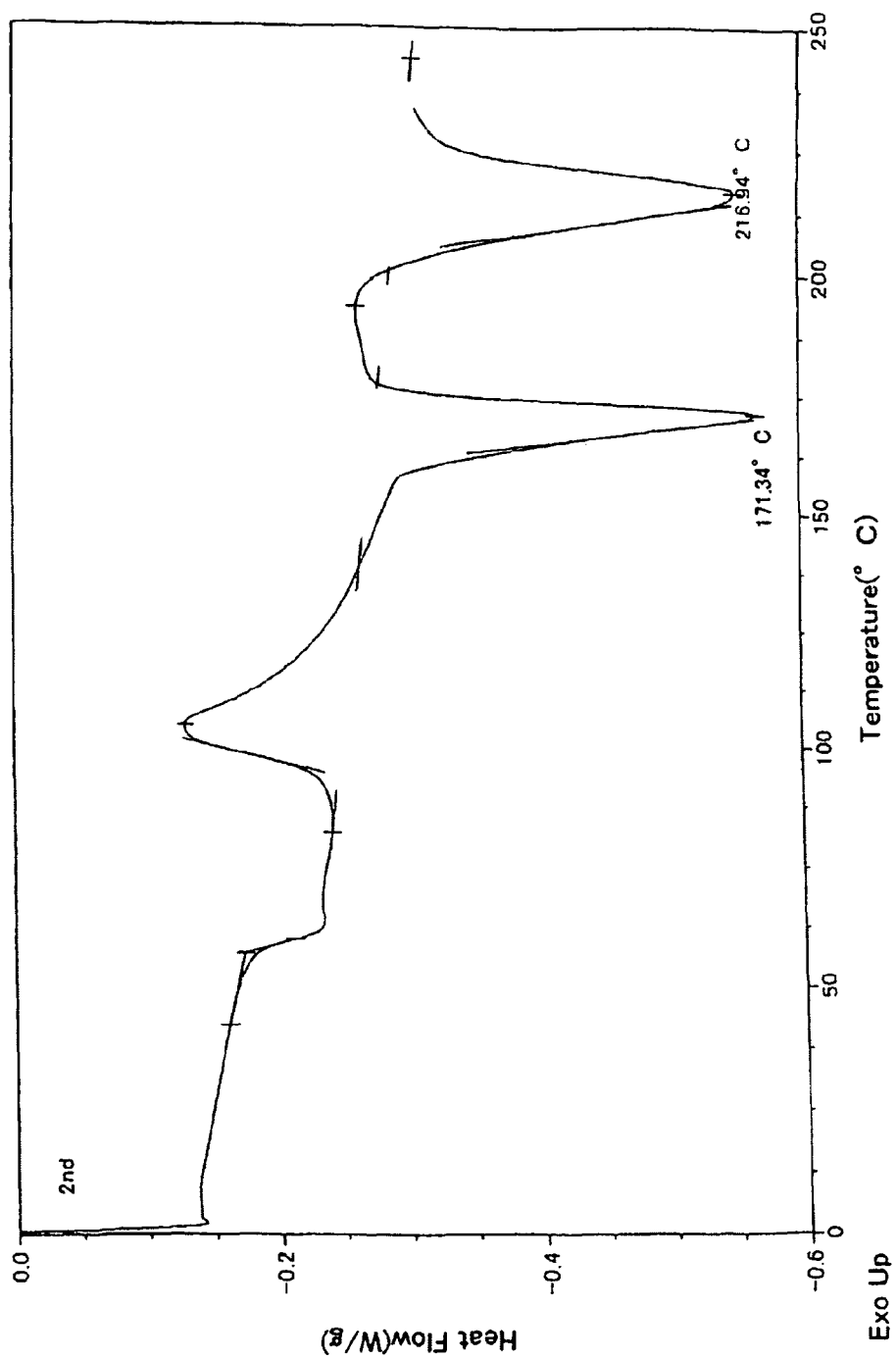
FIG. 50 is a diagram showing the second heating DSC measurement chart of the stretched film of Comparative Example 4.
Figure 53:
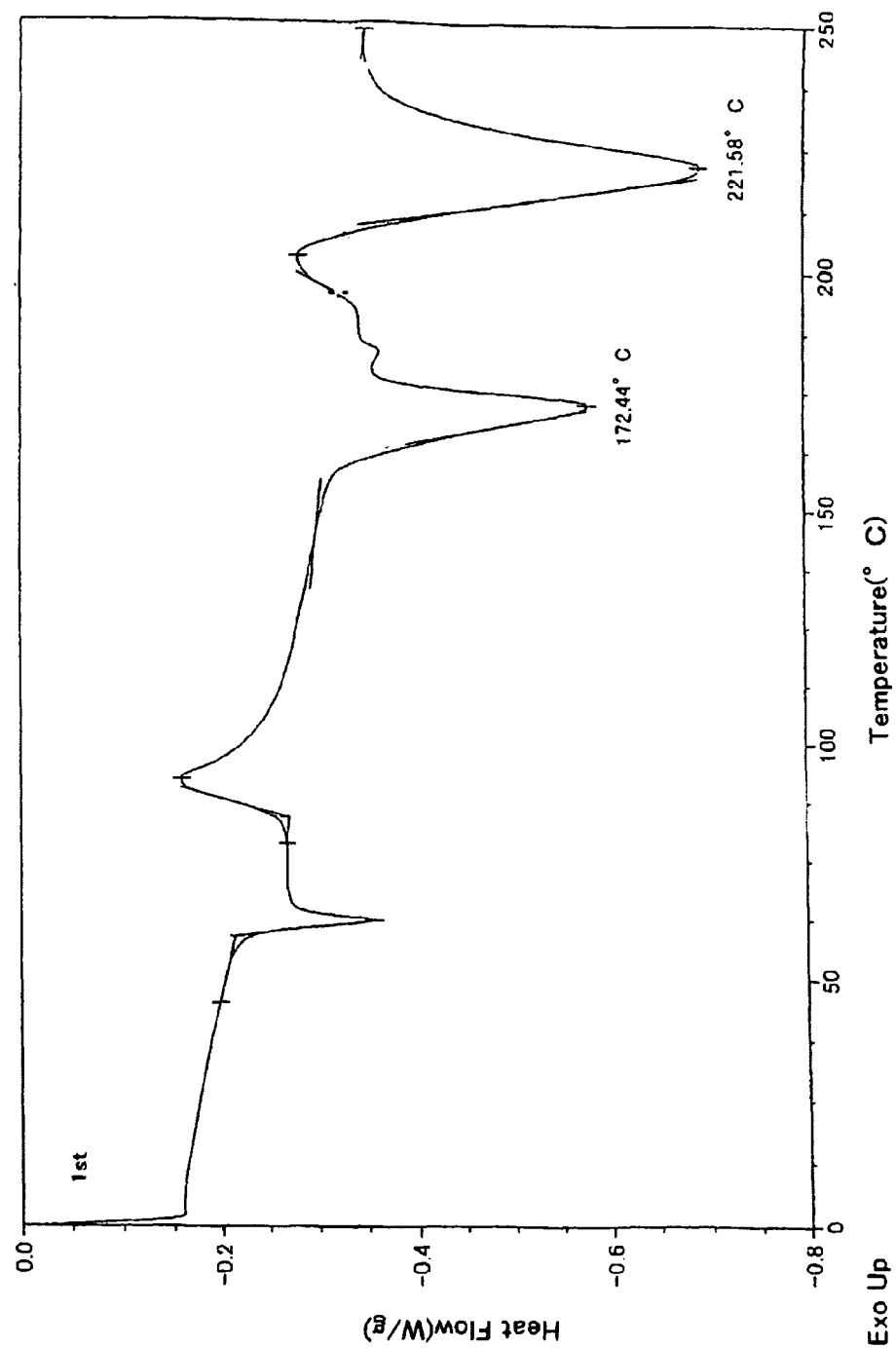
FIG. 53 is a diagram showing the first heating DSC measurement chart of the stretched film of Comparative Example 5.
Figure 54:
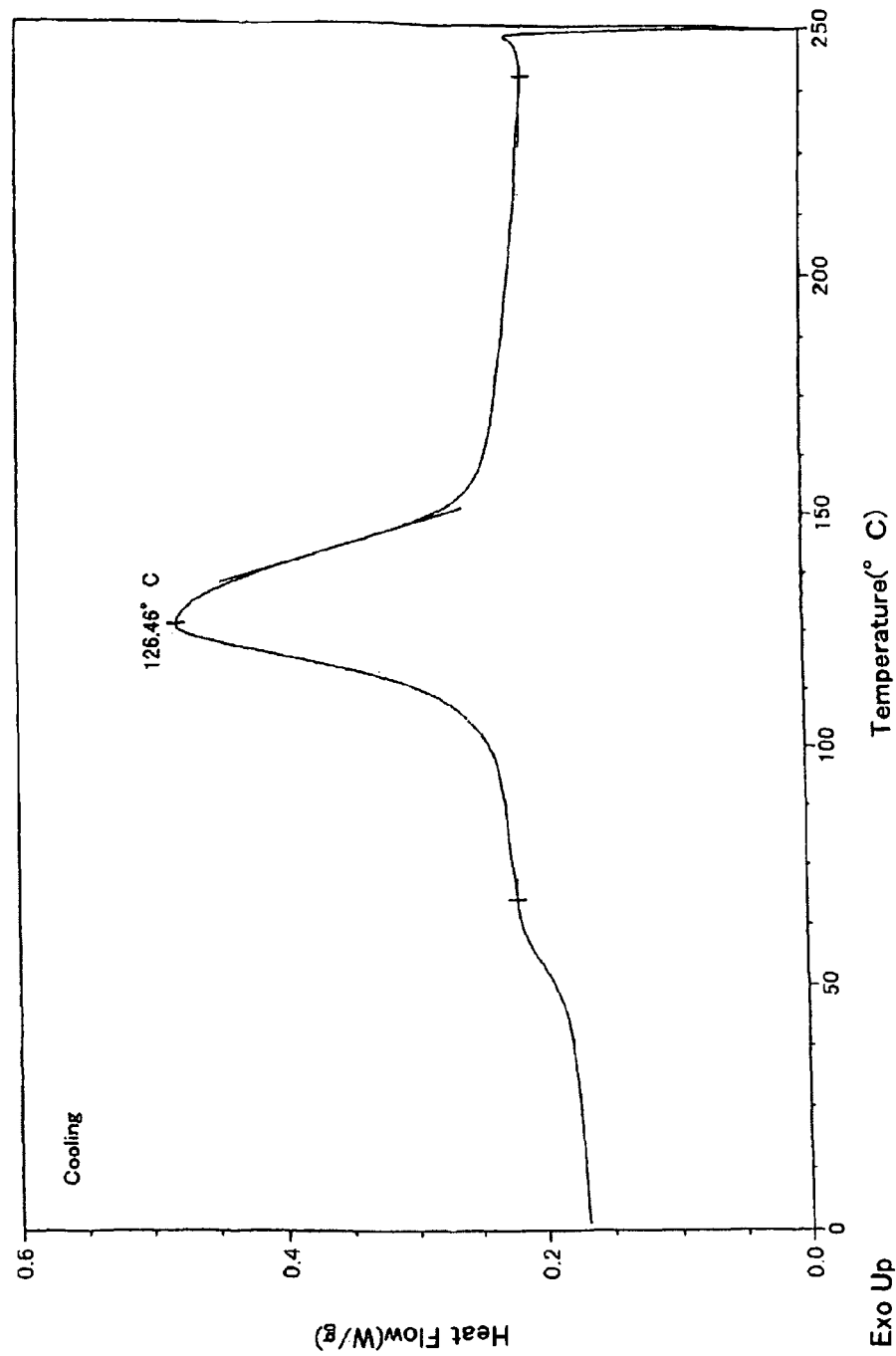
FIG. 54 is a diagram showing the first cooling DSC measurement chart of the stretched film of Comparative Example 5.
Figure 55:
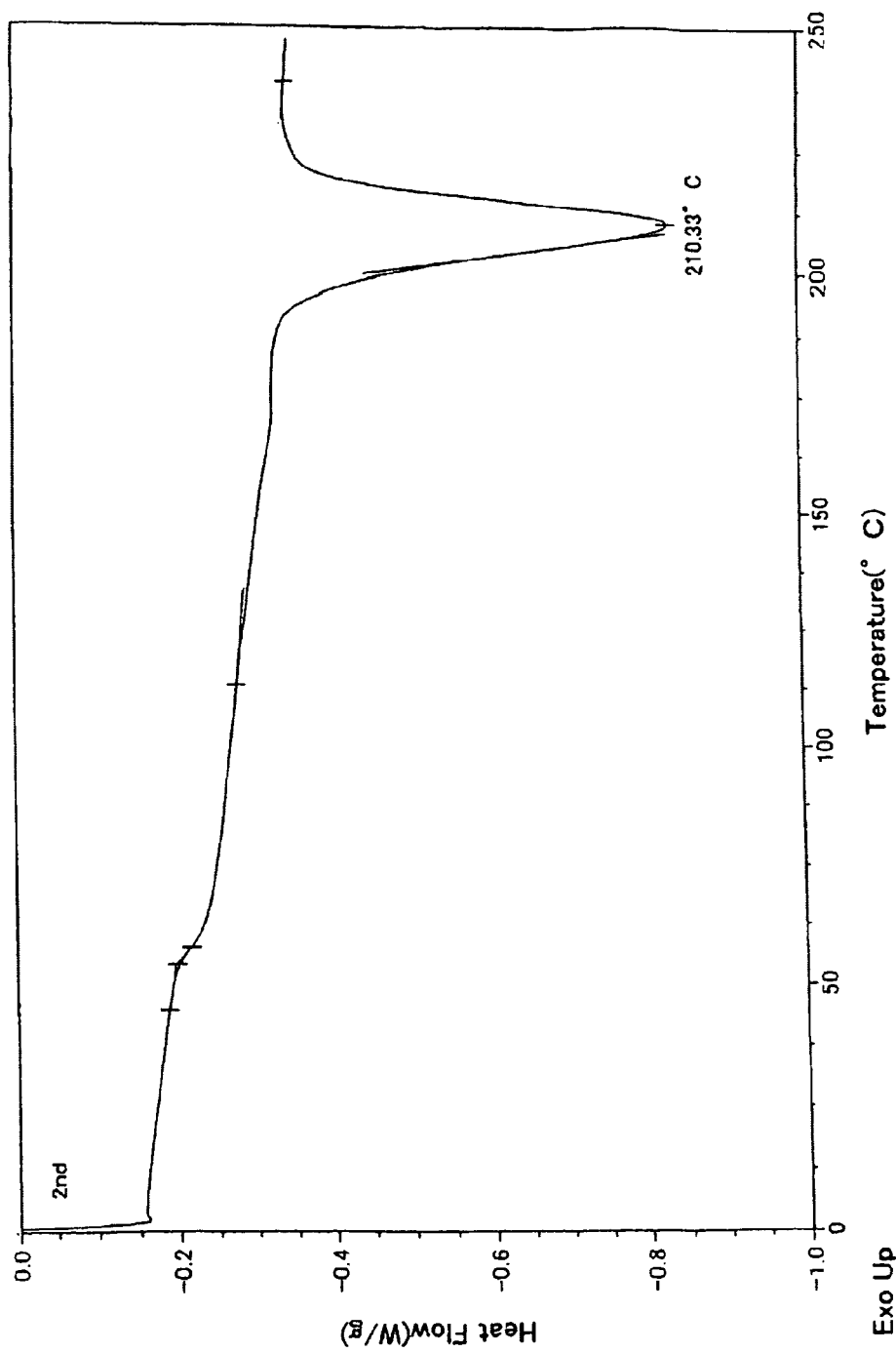
FIG. 55 is a diagram showing the second heating DSC measurement chart of the stretched film of Comparative Example 5.
Figure 63:
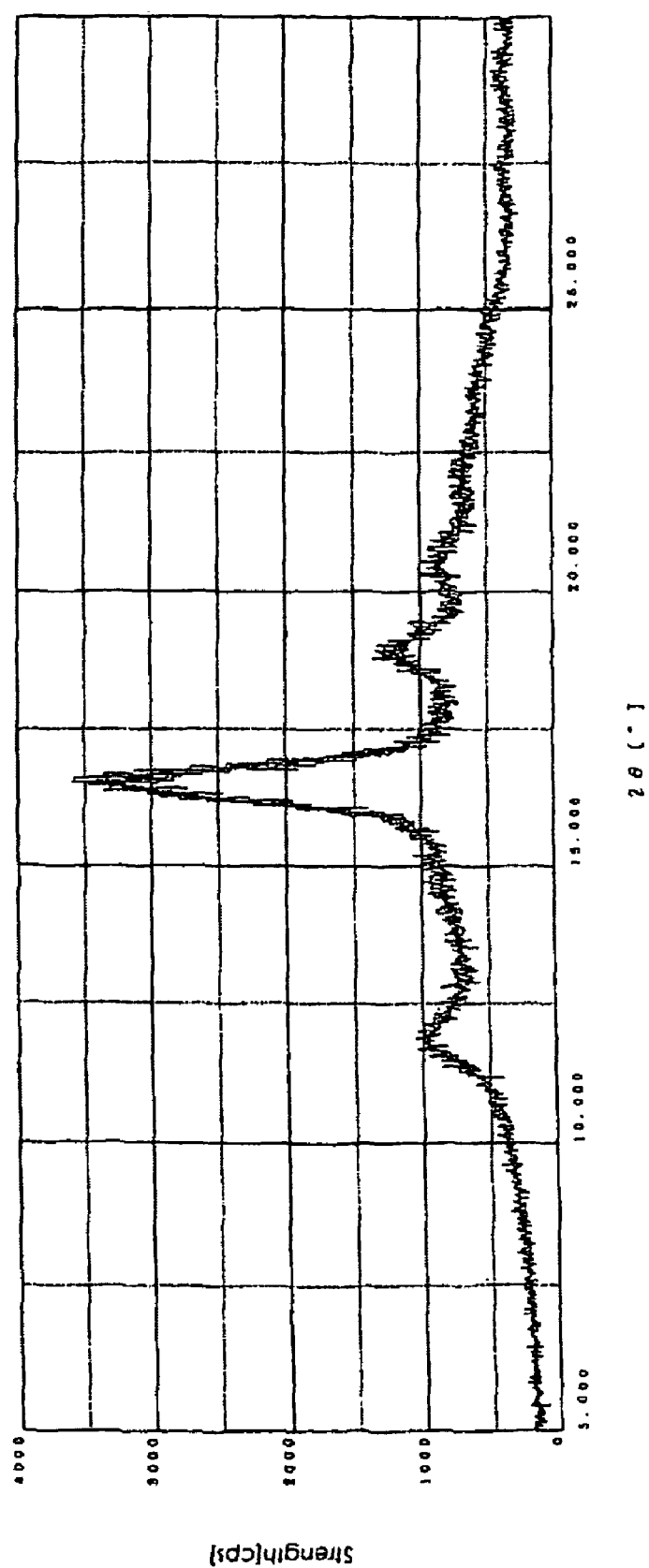
FIG. 63 is a diagram showing the wide-angle X-ray diffraction measurement results obtained for the stretched film of Comparative Example 2.
Figure 64:
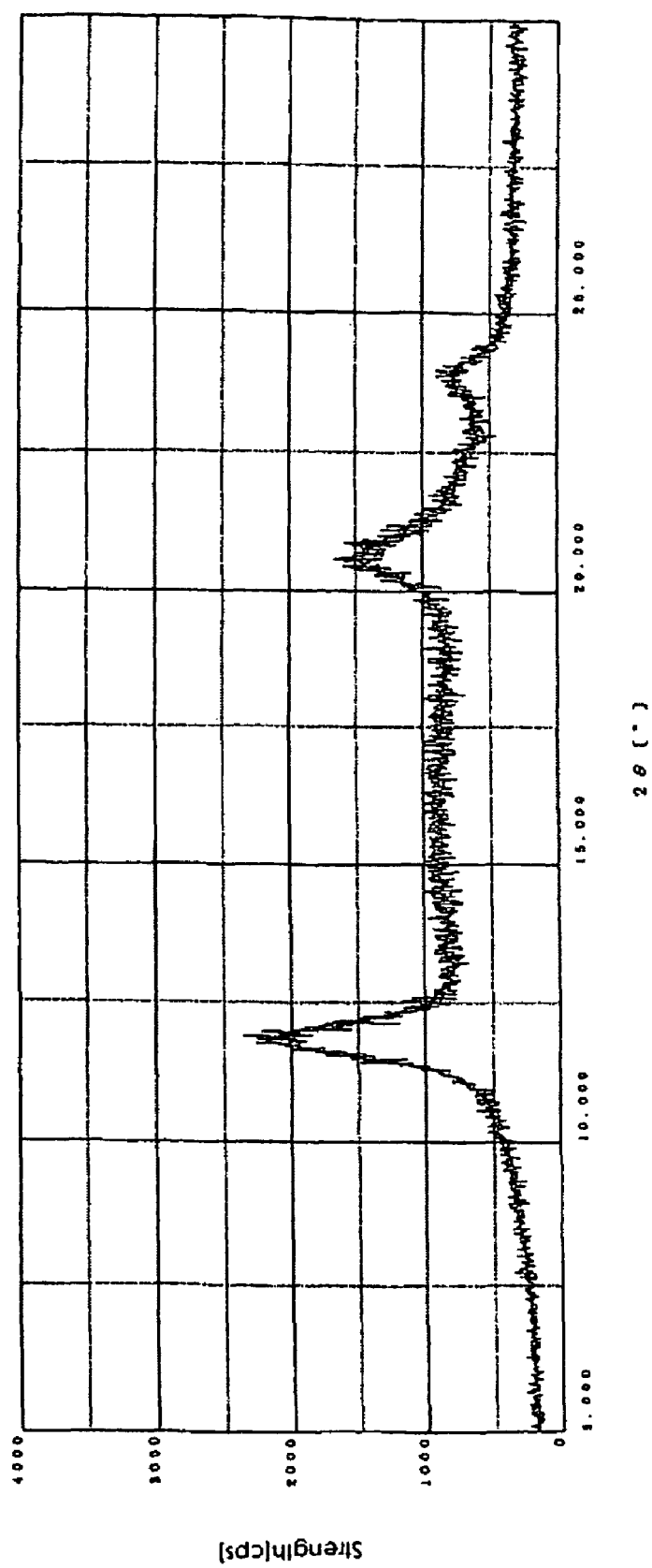
FIG. 64 is a diagram showing the wide-angle X-ray diffraction measurement results obtained for the stretched film of Comparative Example 3.
Figure 65:
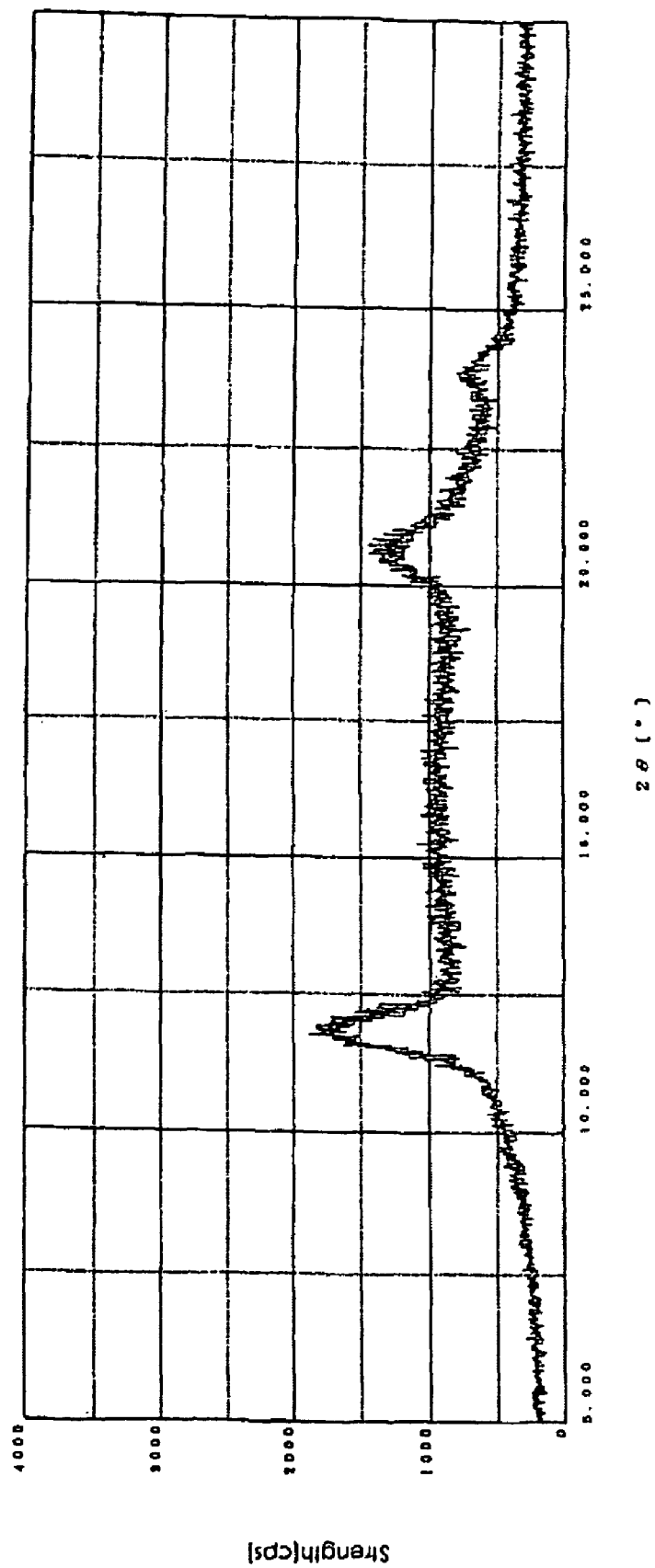
FIG. 65 is a diagram showing the wide-angle X-ray diffraction measurement results obtained for the stretched film of Comparative Example 4.
Figure 66:
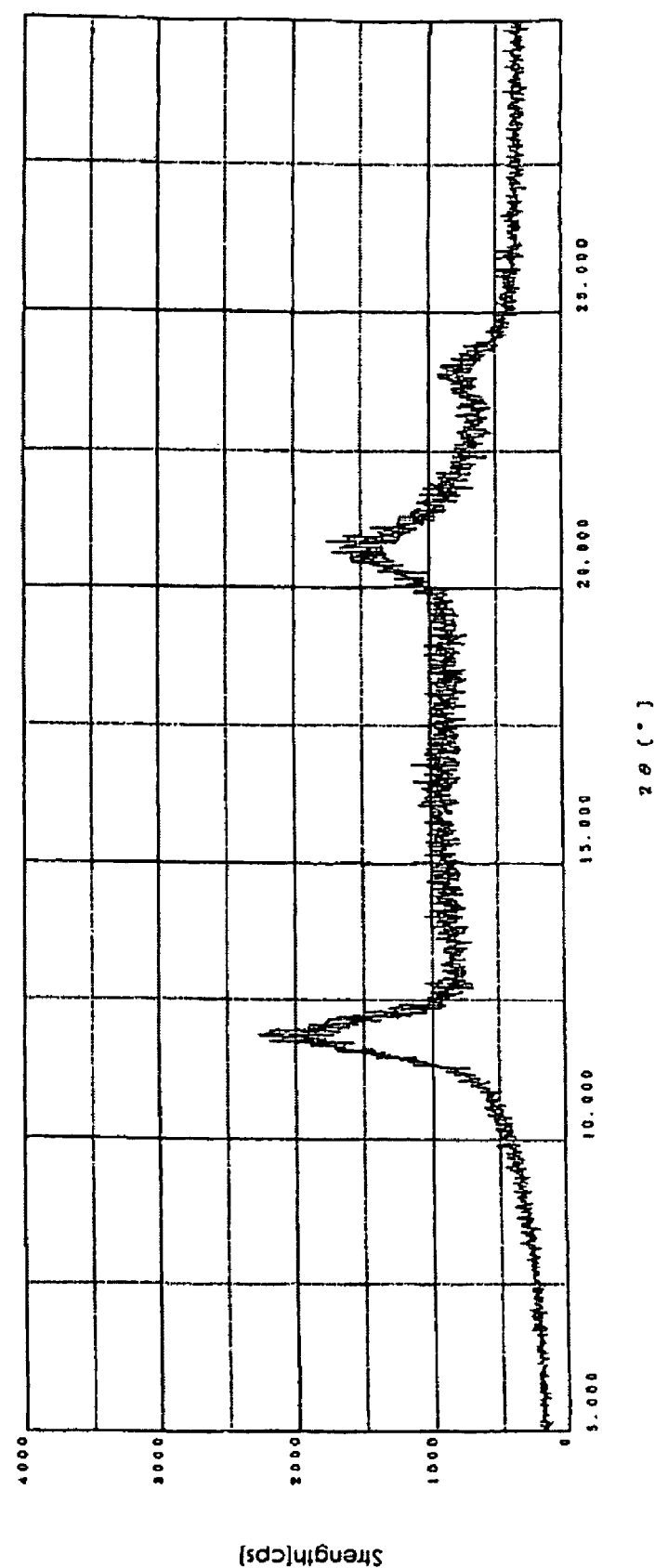
FIG. 66 is a diagram showing the wide-angle X-ray diffraction measurement results obtained for the stretched film of Comparative Example 5.

| | | | | | |
|---|---|---|---|---|---|
| Dispersion degree | (—) | impossible | impossible | impossible | impossible |
| Mp | (g/mol) | 140,000 | 146,000 | 150,000 | 139,000 |
| 2. Evaluation of stretched film | | | | | |
| 1st heating | | FIG. 38 | FIG. 43 | FIG. 48 | FIG. 53 |
| ΔHm 150 to 200° C. | (J/g) | 36.8 | 28.5 | 26.2 | 19.9 |
| ΔHm 205 to 240° C. | (J/g) | 31.6 | 27.7 | 26.6 | 31.3 |
| Peak height in 1st heating | (W/g) | | | | |
| 150 to 200° C. | | 0.508 | 0.325 | 0.353 | 0.258 |
| 205 to 240° C. | | 0.365 | 0.298 | 0.271 | 0.353 |
| Peak ratio | (—) | 1.39 | 1.09 | 1.30 | 0.73 |
| 1st cooling | | FIG. 39 | FIG. 44 | FIG. 49 | FIG. 54 |
| ΔHc | (J/g) | 43.9 | 27.1 | 22.6 | 52.6 |
| 2nd heating | | FIG. 40 | FIG. 45 | FIG. 50 | FIG. 55 |
| ΔHm 150 to 200° C. | (J/g) | 3.9 | 19.3 | 17.4 | 0.0 |
| ΔHm 205 to 240° C. | (J/g) | 43.9 | 25.3 | 21.0 | 48.1 |
| Peak height in 2nd heating | (W/g) | | | | |
| 150 to 180° C. | | 0.051 | 0.312 | 0.285 | 0.000 |
| 200 to 250° C. | | 0.525 | 0.298 | 0.254 | 0.508 |
| Peak ratio | (—) | 0.097 | 1.047 | 1.122 | 0.000 |
| Wide-angle X-ray diffraction | | FIG. 63 | FIG. 64 | FIG. 65 | FIG. 66 |
| (1)    Ssc | (mg) | 9 | 37 | 24 | 30 |
| Measurement PPL | (mg) | 34 | 0 | 0 | 0 |
| result Amorphous | (mg) | 144 | 153 | 164 | 166 |
| | portion | | | | |
| (2) Ratio   Ssc | (%) | 5 | 19 | 13 | 15 |
|          PPL | (%) | 18 | 0 | 0 | 0 |
| Amorphous | (%) | 77 | 81 | 87 | 85 |
| | portion | | | | |
| 3. Film properties | | | | | |
| Transparency | | | | | |
| HZ | (%) | 63.6 | 17.2 | 11.3 | 8.0 |
| PT | (%) | 33.6 | 75.3 | 81.9 | 84.8 |
| Plane orientation degree | (1/1000) | 4.0 | 6.0 | 4.5 | |
| Surface roughness (SRa) | (μ) | 0.23 | 0.12 | 0.11 | 0.14 |
| Tensile test | | | | | |
| Breaking strength | (MPa) | 72 | 91 | 87 | 60 |
| Elongation at break | (%) | 22 | 21 | 22 | 21 |
| Young's modulus | (MPa) | 2402 | 2379 | 2871 | 2538 |
| TMA elongation (%) | 100° C. | 2.7 | 2.7 | 1.4 | 3.4 |
| | 120° C. | 3.6 | 3.6 | 2.1 | 4.4 |
| | 140° C. | 4.5 | 4.6 | 2.8 | 5.5 |
| | 160° C. | 5.7 | 6.2 | 3.6 | 7.2 |
| | 180° C. | 6.6 | 8.4 | 4.2 | 8.6 |
| | 200° C. | 20.8 | 20.2 | 9.1 | 22.0 |
| | 220° C. | Melted | Melted | Melted | Melted |

As shown in Examples 2 to 6 in Table 2, in all the polylactic acid stretched films in accordance with the present invention, a peak ratio (peak 1/peak 2) of a maximum endothermic peak (peak 1) of endothermic peaks within a range of 150 to 200° C. to a maximum endothermic peak (peak 2) of endothermic peaks within a range of 205 to 240° C. in DSC measurements is 0.06 to 0.18, that is, less than 0.2, the endothermic amount of endothermic peaks within a range of 205 to 240° C. is 45.0 to 62.4 J/g, that is, more than 40 J/g, and the exothermic amount during cooling is 46.1 to 71.4 J/g, that is, more than 40 J/g, and the films excel in heat resistance. Furthermore, it is clear that in order to obtain a polylactic acid stretched film having these thermal melting properties, it is preferred that the exothermic amount during first cooling of the polylactic acid composition be large and that a polylactic acid composition be used in which a peak ratio (peak 10/peak 20) of a maximum endothermic peak (peak 10) of endothermic peaks within a range of 150 to 200° C. during second heating to a maximum endothermic peak (peak 20) of endothermic peaks within a range of 205 to 240° C. be equal to or less than 0.5.

Furthermore, in Examples 2 to 6, a peak area ($S_{SC}$) in the vicinity of 12 degrees, 21 degrees, and 24 degrees in wide-angle X-ray measurements is 24 to 32%, that is, more than 20%, based on the entire area and a peak area ($S_{PL}$) in the vicinity of 20 of 17 degrees and 19 degrees is 0.0%, that is, less than 5%, based on the entire area. Therefore, it is clear that the crystallized portion is a stereocomplex structure and the fraction ratio thereof is large.

Although the stretched films of Comparative Examples 2 to 5 use poly-L-lactic acid and poly-D-lactic acid having the same mixing ratio as that in Examples 2, 4, 5, and 6, a peak ratio (peak 1/peak 2) of a maximum endothermic peak (peak 1) of endothermic peaks within a range of 150 to 200° C. to a maximum endothermic peak (peak 2) of endothermic peaks within a range of 205 to 240° C. in DSC measurements is 0.73 to 1.39, that is more than 0.2, and the films have poor heat resistance. Furthermore, a peak ratio (peak 10/peak 20) of a maximum endothermic peak (peak 10) of endothermic peaks within a range of 150 to 200° C. during second heating to a maximum endothermic peak (peak 20) of endothermic peaks within a range of 205 to 240° C. of a mixture (press sheet) used as a base material for the stretched films of Comparative Examples 2 to 4 is 1.50 to 4.00, that is, above 0.5.

In addition, in Comparative Examples 2 to 5, a peak area ($S_{SC}$) in the vicinity of 12 degrees, 21 degrees, and 24 degrees in wide-angle X-ray measurements is 5 to 19%, that is, less than 20%, based on the entire area and a peak area ($S_{PL}$) in the vicinity of 2θ of 17 degrees and 19 degrees is 18%, that is, more than 5% in Comparative Example 2 and 0% in Comparative Examples 3 to 5, based on the entire area. Therefore, it is clear that the crystallized portion was not sufficiently converted into a stereocomplex structure or was converted, but at a small fraction ratio.

INDUSTRIAL APPLICABILITY

The composition in accordance with the present invention has specific thermal properties. This is apparently because a stereocomplex structure is formed selectively and uniformly in a simple manner. For this reason, the present stretched film is superior in heat resistance and toughness and also superior in surface smoothness, transparency, and thermal stability to the conventional molded products such as polylactic acid stretched films.

This is because a stereocomplex structure is selectively formed during crystallization from an amorphous state. Furthermore, with the composition in accordance with the present invention, crystallization treatment can be easily performed.

The invention claimed is:

1. A polylactic acid stretched film comprising a polylactic acid composition containing poly-L-lactic acid and poly-D-lactic acid, wherein a peak ratio between a peak height (peak 1) of a maximum endothermic peak among endothermic peaks within a range of 150 to 200° C. and a peak height (peak 2) of a maximum endothermic peak among endothermic peaks within a range of 205 to 240° C. in DSC measurements is equal to or less than 0.2 (peak 1/peak 2), and the endothermic amount of the endothermic peaks within a range of 205 to 240° C. is 40 J/g or more.

2. The polylactic acid stretched film according to claim 1, wherein an amount of emitted heat is equal to or greater than 40 J/g after the endothermic peak measurement in DSC measurements.

3. The polylactic acid stretched film according to claim 1, wherein a sum total ($S_{SC}$) of area of peaks (2θ) in the vicinity of 12°, 21°, and 24° in wide-angle X-ray measurements is equal to or greater than 20% with respect to the entire area, and a sum total ($S_{PL}$) of area of peaks (2θ) in the vicinity of 17° and 19° is equal to or less than 5% with respect to the entire area.

4. The polylactic acid stretched film according to claim 1, that is obtained by stretching a polylactic acid composition in which an amount of emitted heat during cooling after 10 min at 250° C. in DSC measurements is equal to or greater than 20 J/g.

5. The polylactic acid stretched film according to claim 1, that is obtained by stretching a polylactic acid composition in which an endothermic amount of an endothermic peak within a range of 205 to 240° C. during second heating in DSC measurements is equal to or greater than 35 J/g.

6. The polylactic acid stretched film according to claim 1, wherein the polylactic acid composition comprising 75 to 25 parts by weight of poly-L-lactic acid and 25 to 75 parts by weight of poly-D-lactic acid (the sum total of the poly-L-lactic acid and the poly-D-lactic acid is 100 parts by weight).

7. The polylactic acid stretched film according to claim 2, wherein a sum total ($S_{SC}$) of area of peaks (2θ) in the vicinity of 12°, 21°, and 24° in wide-angle X-ray measurements is equal to or greater than 20% with respect to the entire area, and a sum total ($S_{PL}$) of area of peaks (2θ) in the vicinity of 17° and 19° is equal to or less than 5% with respect to the entire area.

8. The polylactic acid stretched film according to claim 2, that is obtained by stretching a polylactic acid composition in which an amount of emitted heat during cooling after 10 min at 250° C. in DSC measurements is equal to or greater than 20 J/g.

9. The polylactic acid stretched film according to claim 3, that is obtained by stretching a polylactic acid composition in which an amount of emitted heat during cooling after 10 min at 250° C. in DSC measurements is equal to or greater than 20 J/g.

10. The polylactic acid stretched film according to claim 2, that is obtained by stretching a polylactic acid composition in which an endothermic amount of an endothermic peak within a range of 205 to 240° C. during second heating in DSC measurements is equal to or greater than 35 J/g.

11. The polylactic acid stretched film according to claim 3, that is obtained by stretching a polylactic acid composition in which an endothermic amount of an endothermic peak within a range of 205 to 240° C. during second heating in DSC measurements is equal to or greater than 35 J/g.

* * * * *